United States Patent [19]

Poland

[11] Patent Number: 4,665,500
[45] Date of Patent: May 12, 1987

[54] MULTIPLY AND DIVIDE UNIT FOR A HIGH SPEED PROCESSOR

[75] Inventor: Sid Poland, Arlington, Tex.

[73] Assignee: Texas Instruments Incorporated, Dallas, Tex.

[21] Appl. No.: 598,941

[22] Filed: Apr. 11, 1984

[51] Int. Cl.[4] ............................................. G06F 7/52
[52] U.S. Cl. .................................... 364/760; 364/767
[58] Field of Search ............. 364/736, 754, 760, 761, 364/767

[56] References Cited

U.S. PATENT DOCUMENTS

| | | | |
|---|---|---|---|
| 3,293,420 | 12/1966 | Pitkowsky et al. | 364/767 |
| 3,761,698 | 9/1973 | Stephenson | 364/736 |
| 4,153,938 | 5/1979 | Ghest et al. | 364/760 |
| 4,238,833 | 12/1980 | Ghest et al. | 364/760 |
| 4,337,519 | 6/1982 | Nishimoto | 364/736 |

Primary Examiner—David H. Malzahn
Attorney, Agent, or Firm—Richard K. Robinson; Leo N. Heiting; Melvin Sharp

[57] ABSTRACT

A High Speed Multiplier/Divider for use with high speed processors that have dedicated adders, registers, controls and logic for performing a multiply operation, a multiply and add operation, and a divide operation. The multiply/divide circuit has capability of multiplying a 16 bit word times a 16 bit word that produces a 32 bit product with divide being the inversed of the multiplication operation and may use signed or unsigned multiply/divide. A Booth algorithm is used to implement the multiply operation and the multiply/divide operations are operating asynchronous, that is, at the completion of one set of operations, the next set is implemented.

6 Claims, 28 Drawing Figures

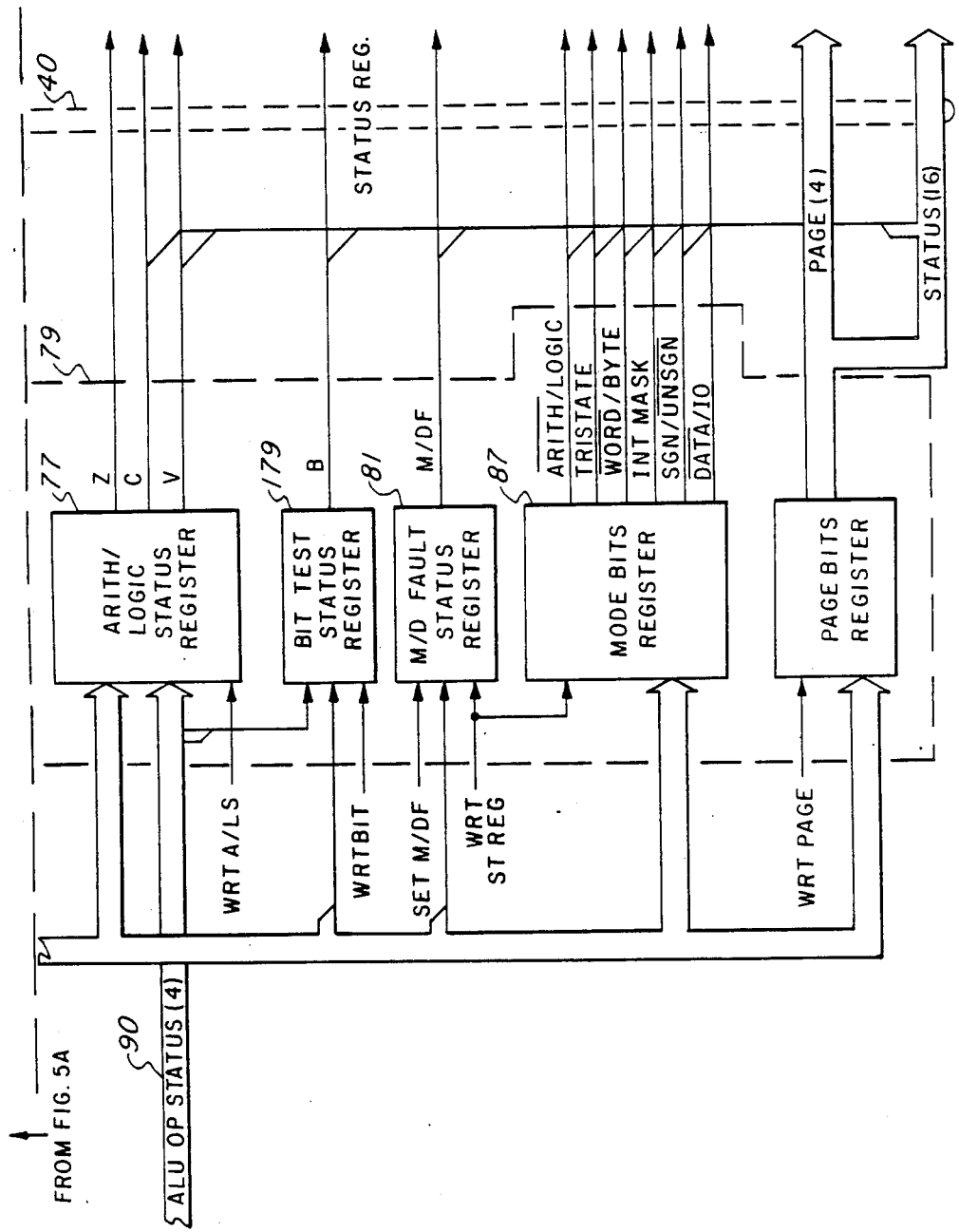

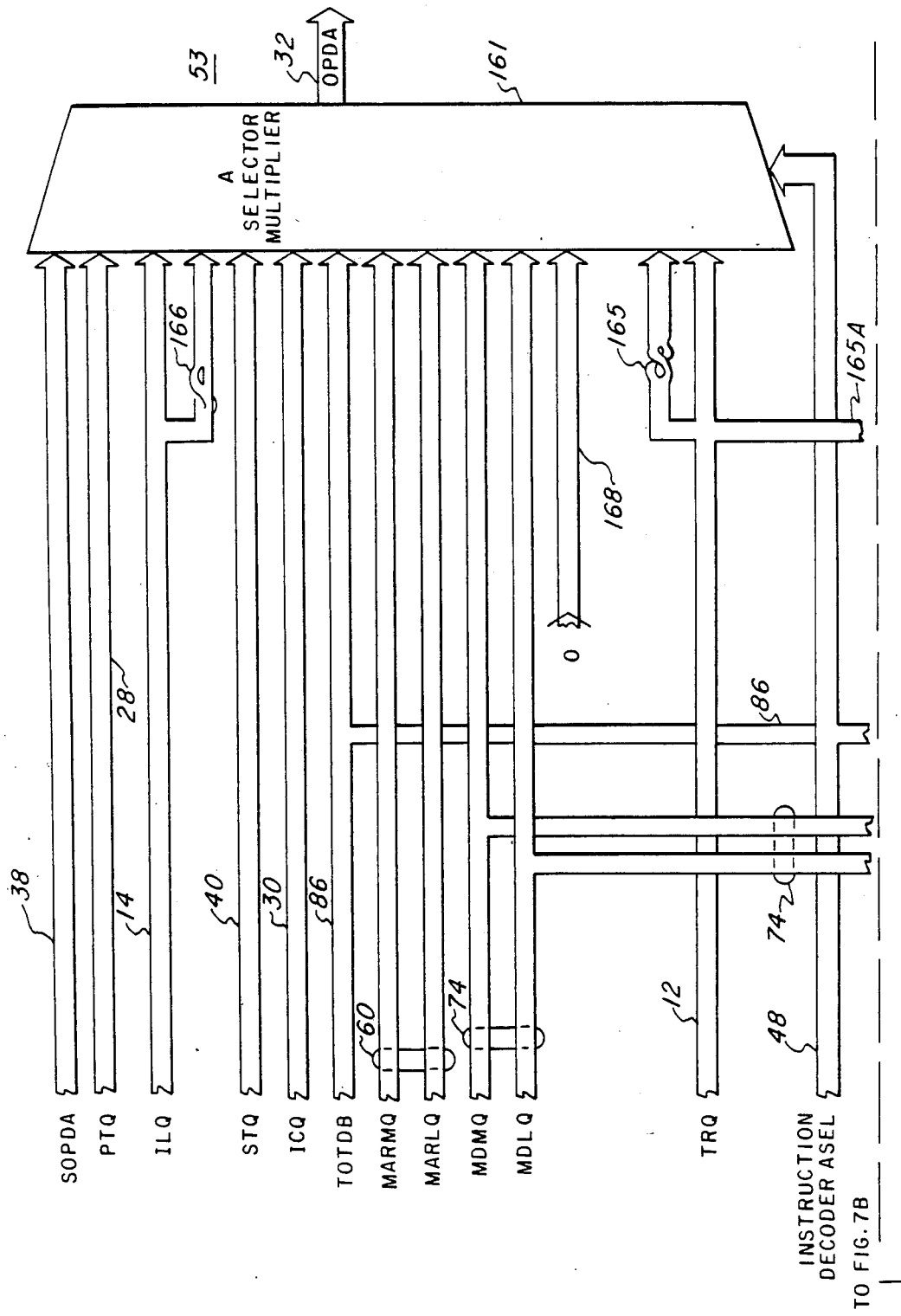

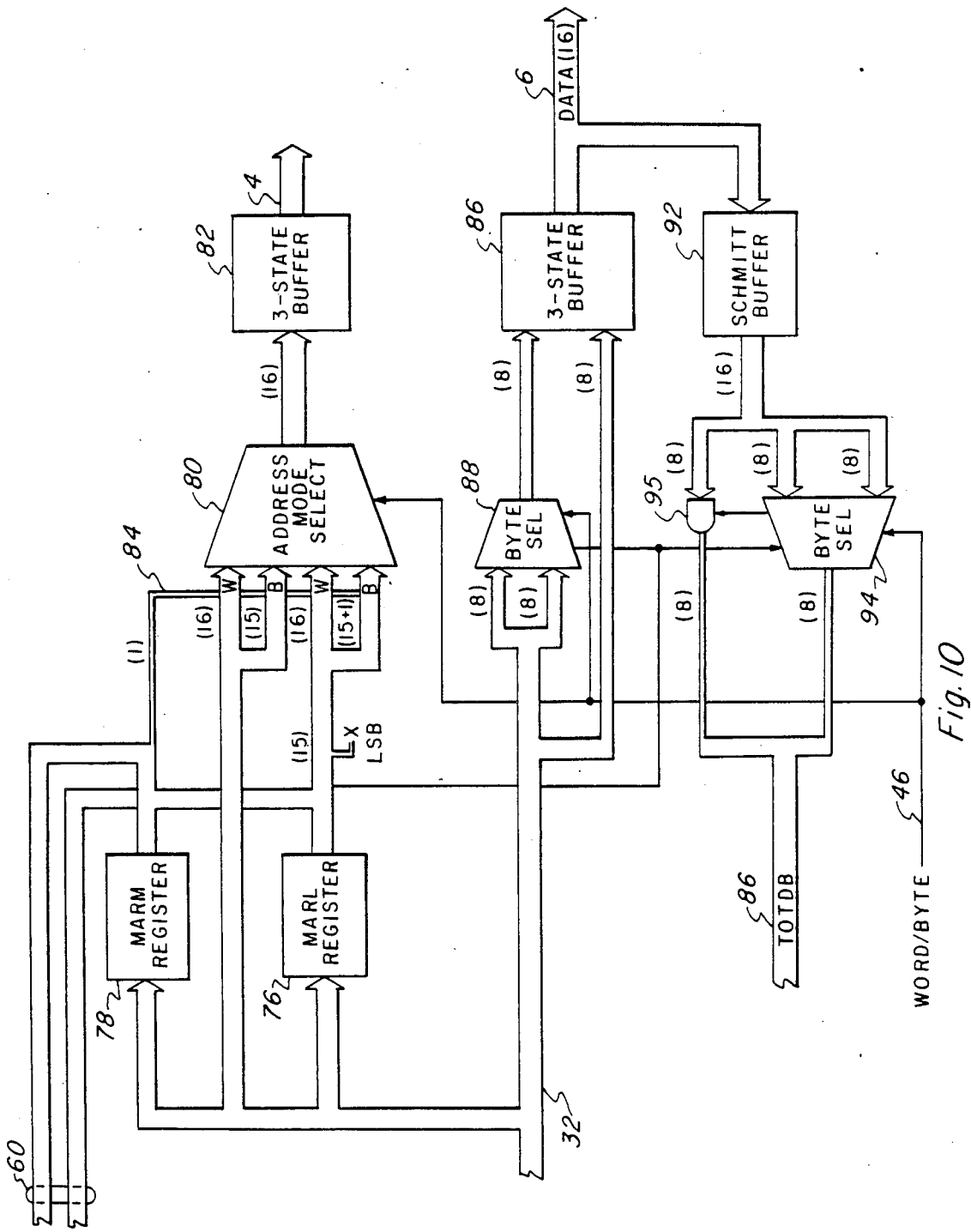

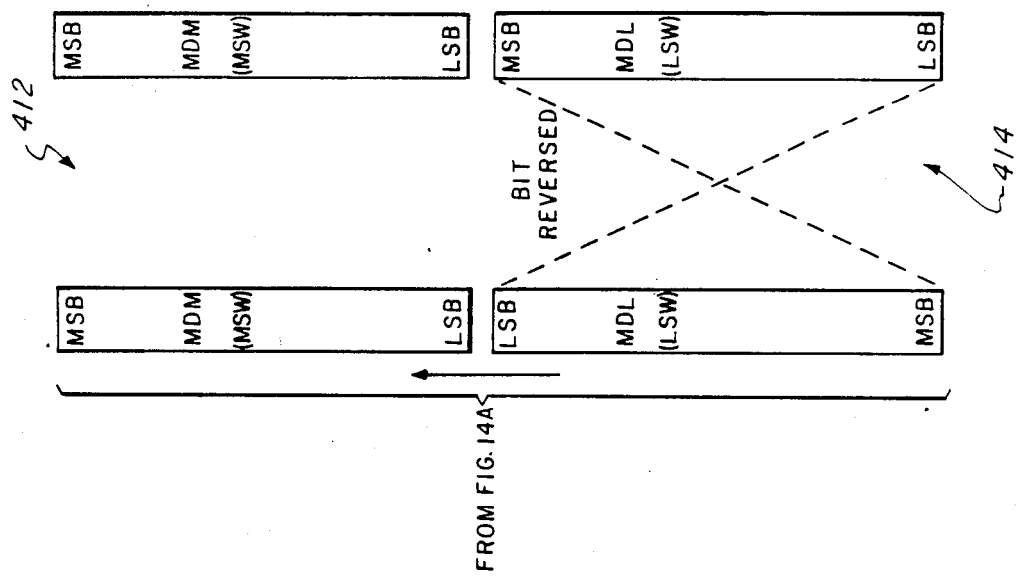

MULTIPLY AND DIVIDE UNIT FOR A HIGH SPEED PROCESSOR

RELATED APPLICATIONS

Related U.S. Patent applications incorporated herein by reference and assigned to the Assignee of the present invention are Ser. No. 598,940, Ser. No. 598,911, Ser. No. 598,938, Ser. No. 598,939, and Ser. No. 598,946.

BACKGROUND OF THE INVENTION

This invention relates to data processors containing separate multiply/divide logic such as those that are contained in calculators, microcomputers, minicomputers, and large scale computers generally, and more particular to high speed data processors with high speed multiply and divide circuits. This invention relates to, Ser. No 520,880 filed 8/5/83, and Ser. No. 538,634, filed 10/25/83.

The central theme for a high speed processor is speed. In the past, to implement the multiply and divide operation often required a large size of logic which was prohibited when implementing a single chip operation. Therefore, the processing units that were used to implement these functions were both large and costly.

Processing units, sometimes referred to as data processors, are very effective devices in the handling of menial and unimaginative tasks. These tasks typically require the monitoring of a physical phenomena or the brute force manipulation of data either in arithmatic or logical operation. The speed of the processing unit is determinative of its applicability and usefulness. Processors which are normally referred to as "slow", are generally unfeasible for certain tasks due to the time and/or cost restraints involved that result from the slow operation of a processing unit. Other processing units which are normally referred to as "fast" have traditionally been so expensive that they are impractical for certain applications.

Data processors are generally classified according to their size and ability. At the lowest end of the classification of the capability spectrum are the hand-held calculators which perform simple or routine operations; microcomputers are used in consumer and small business environments due to their moderate cost and somewhat slow computing speed; minicomputers have a larger memory and capability and are used in industrial, laboratory or in a medium business setting; and large scale computers range in size, depending on their specified task and typically handle large data bases and multiple users.

At the opposing ends of the classification spectrum, as discussed above, the hand-held calculators and giant computers, do not meet the demands or constraints of the average users. A balancing of costs points the average user to the micro or minicomputer which, because of the low cost, the user is willing to accept slow computing speeds.

The ability of a data processor to operate in a real time environment or mode is very advantageous. Real time operation allows task execution prioritizing which permits a higher priority task to be performed by interrupting a low priority task. To perform the higher priority task, the criteria and state of the lower priority task are temporarily placed in memory so that the data processing unit may, at a later date retreive this data and continue the task where it was prematurely terminated. The amount of time that the data processor takes to dump the material associated with a lower priority task into a section of memory reserved for this purpose and then retrieve it determines if the use of the interrupts and change to a higher priority task is impractical. If a disproportional amount of time is devoted to dumping or retrieving data, obviously the efficiency of the processor suffers dramatically.

The architecture of a processing unit pertains to the various components parts of the processor and the interconnection between them. A data processor typically uses a Central Processing Unit (CPU) as the control means for the other component parts. The CPU is generally interfaced to or includes an Arithmetic Logic Unit (ALU).

The ALU is a device which accepts data and performs certain operations thereon. These operations are generally grouped as either arithmetic or logical in nature. The CPU controls the data delivered to and selects the operation of the ALU. One interface of a CPU to an ALU is illustrated in U.S. Pat. No. 3,761,698 issued Sept. 25, 1973.

The Arithmetic Logic Unit (ALU) performs an operation on the actual bit structure of the data so as to implement the desired function. Acceptance of data may be either sequential by bit, byte, data word or/and multiple or submultiple or above via a data buss. The data is stored within the CPU or alternatively in memory in the form of data words. The length of the data word is used to describe the data processor since the length is directly related to the precision of the data processor. A 16-bit data word processor has the capability of defining the number with much more precision than a four-bit data word processor.

The processor accepts data, manipulates it using an Arithmetic Logic Unit, and places it in an inactive state such as retaining it in a memory until the data is later needed. A communication channel electrically connects the CPU and the memory. Examples of the memory includes such devices as a Random Access Memory (RAM), a Read Only Memory (ROM), or a Magnetic Storage Device such as a magnetic tape or disk. An example of the interconnection between a processor and ROM or RAM is illustrated in U.S. Pat. No. 4,064,554 issued Sept. 20, 1977 to Tubbs.

The CPU responds to instruction storage as machine language. Machine language is instructions, coded into a word of the same length as the data word. The instructions are stored in the memory and are retrieved by the CPU according to locations code which may be a sequential location that are sequentially addressed by the CPU.

Since the memory contains both data and instructions for the processor, some flag or signal is used to keep the processor from confusing what it is receiving from the memory. A Von Neumann architecture provides for flagging of the data and instructions stored in memory. This arrangement allows the processor to perform tasks according to prioritization. When a high priority task interrupts a lower priority task, then the lower priority task operation is halted and the data in the processor and the status information relating to the lower task is stored in a memory until the higher priority task is completed. Once completed, the processor is set at the state where the lower priority task was interrupted.

The ability to dump data into memory and then to retrieve it at a later time is an important advantage for the data processor since multiple terminals or tasks are thereby serviced in line with their priority.

The structure of a memory into words, pages and chapters allows the processor more flexibility in its operation in that the data may be easily stored or retrieved through a word, page and chapter address.

Data processors generally act in conjunction with other data processors and exchange data and information to accomplish a particular goal. An example of such an application is U.S. Pat. No. 3,700,866 issued Oct. 24, 1972 to Taylor et al. In the Taylor patent cascading processors are used to achieve a minimum of uncertainty in the output signal. Typically a system of processors are arranged heirarchically so that data shifts through the lower levels to the higher level processors.

It should be noted, that the dimensions of Stephenson, Tubbs and Taylor, as referenced above, do not achieve a speed commensurate with the modern demands on a processing unit. Their basic handling of instructions, architecture structure and manipulation of data prevents them from achieving a high speed.

The time used by the processor to complete a single instruction, a single clock cycle, or the time between the rising edge of a single clock pulse to the rising edge of a falling clock pulse, is referred to as instruction or cycle time. Each device utilizes varying cycle times and sometimes it may take more than one cycle for a particularly involved operation to be performed.

In order to streamline or improve the cycle time on a processor, a method known as "look ahead" or "prefetch" has emerged. In a prefetched operation the next sequential instruction is obtained and decoded so that when the current instruction is completed, the next instruction is ready for operation. Since each instruction may be decoded prior to use, this technique eliminates the idle time experienced by the processor until that instruction is decoded by the processor. One such "look ahead" or "prefetch" method is described in U.S. Pat. No. 3,573,853 issued Apr. 6, 1971 to Watson et al.

To achieve prefetching, the appropriate timing of the instructions and data along the common bus must be maintained so as not to confuse the processor. Once the processor becomes confused as to whether it is receiving data or instructions, all further operations will only result in unintelligilble data being generated.

Prefetching along, though, will not transform a "slow" processor into a "fast" processor which is defined as a processor with a cycle time of approximately 200 nano-seconds. Economical speed is the key. A low-cost, high-speed processor does not yet exist in the art; such a device will open new areas of application and permit the utilization of such a device in areas which are presently economically prohibitive and/or required great speed.

SUMMARY OF THE INVENTION

A High Speed Multiplier Divider for use with a high speed processor that has dedicated adders, registers, controls and logic for performing a multiply operation, a multiply and add operation, and a divide operation. The multiply/divide circuit has capability of multiplying a 16-bit word times a 16 bit word that produces a 32 bit product with divide being the inverse of the multiplication operation and may use signed or signed multiply/divide. A Booth algorithm is used to implement the multiply operation and the multiply/divide operations are implementing asynchronous, that is, at the completion of one set of operations, the next set is implemented.

The multiplication operation on the high speed processor is a 16 bit by 16 bit word that produces a 32 bit product. The divide operation is the inverse of the multiplication operation and thus the multiplication operation discussed above has a 32 bit product that is divided by a 16 bit denominator to produce a 16 bit quotient and a 16 bit remainder. Both multiplication and divide may be signed (S) or unsigned (U) as controlled by a status bit called signed multiply/divide. If this bit is zero, the operation is unsigned, if this bit is one, the operation is signed as the name implies.

In the embodiment discussed, multiplication is implemented to provide a 32 bit product that occupies a dedicated 32 bit multiply/divide register (MDM and MDL). The multiply/divide register as indicated above is divided into two portions, a most significant half, MDM, and a least significant half, MDL. In the case of the multiply operation, the multiply and divide registers and a spillover register is reset to zero upon entry. The spillover register in the embodiment described can be from four to eight disks.

In performing a multiply and add operation, 32 bits of the multiply/divide register and the bits of the spillover register are added to the 32 bit product and the resulting sum placed in the multiply/divide register and the spillover register. The spillover register will hold the carry out from the multiply/divide register. This represents partial sum overflow and when doing a series of multiply and add operations, such as that encountered during digital filtering, multiple precision multiply or divide, this data is not truncated and is lost. Should the final result exceed the contents of the mutiply/divide register, a status bit is set indicating this occurrance.

In the embodiment discussed above, the 32 bit numerator occupies the same dedicated 32 bit multiply/divide register called MD. The MD is augmented by a spillover register (SPOV) which is approximately between 4 to 8 bits as in the embodiment discussed above. SPOV is zeroed for unsigned operation and agrees with the multiply/divide register bit of signed operation.

When the divide operation is implemented, the quotient (16 bits as discussed above) is returned and stored in the least significant bit multiply/divide register MDL, and the remainder (16 bits) in the embodiment discussed above, is stored in the most significant bit multiply/divide register MDM. The spillover register is zero for unsigned and the remainder signed for sign. If the magnitude of the spillover register plus the most significant multiply/divide register is greater than (or equal to) the magnitude of the divisor, a divide fault is signaled to the status register. On equality, if the signs are alike, a signal fault is indicated, otherwise the divide operation is okay and of course a status fault is indicated when an attempt is made to divide by zero.

If the final quotient exceeds the 16 bit least significant bit multiply/divide register, a status bit named multiply/divide fault, is set to logic one. Otherwise, this fault is set to zero.

The status fault is set or reset only when the most significant register is referenced by another multiply request, a multiply add request, or a divide operation request. The high speed processor associated with the multiply/divide operation checks for any fault before proceeding with the secondary multiply/divide operation.

If the arithmetic logic unit requests a multiply/divide operation or tries to start a multiply, multiply/add, or division operation, the arithmetic logic unit is inhibited until an in-process multiply, multiply/add, or divide operation has been completed.

BRIEF DESCRIPTION OF THE FIGURES

The invention may be really understood from a reading of the description of the preferred embodiment incorporated with the drawings in which:

FIGS. 5A and 5B are a block diagram of registers illustrated in FIG. 2;

FIGS. 7A and 7B are a block diagram of the operand selector of FIG. 2;

FIG. 10 is a block diagram of the Memory Address register of FIG. 2;

DETAILED DESCRIPTION OF THE PREFERRED EMBODIMENTS

Figure 1A:
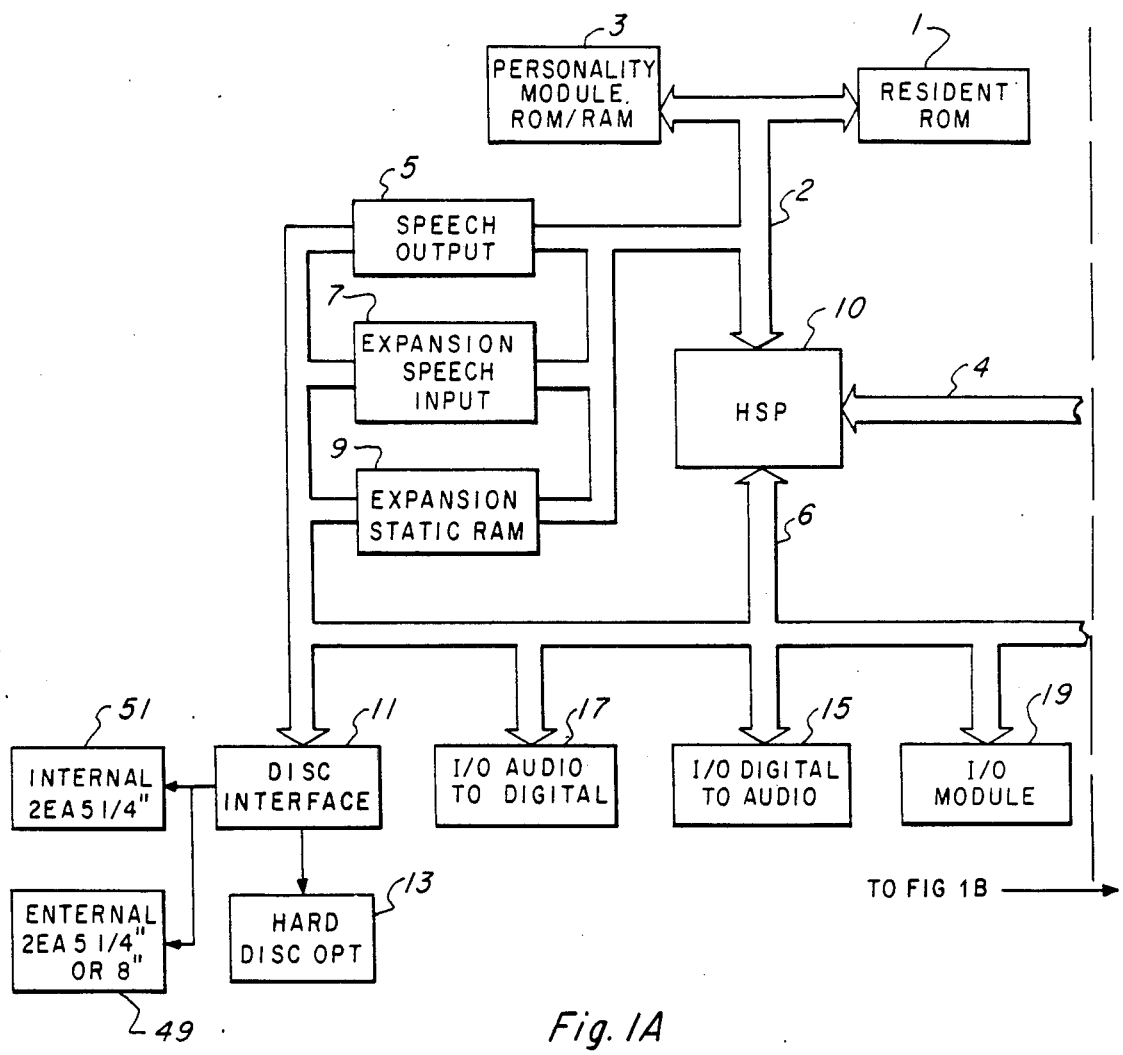
FIGS. 1A and 1B are a block diagram of a computing system utilizing the high speed processor of the invention.
Figure 1B:
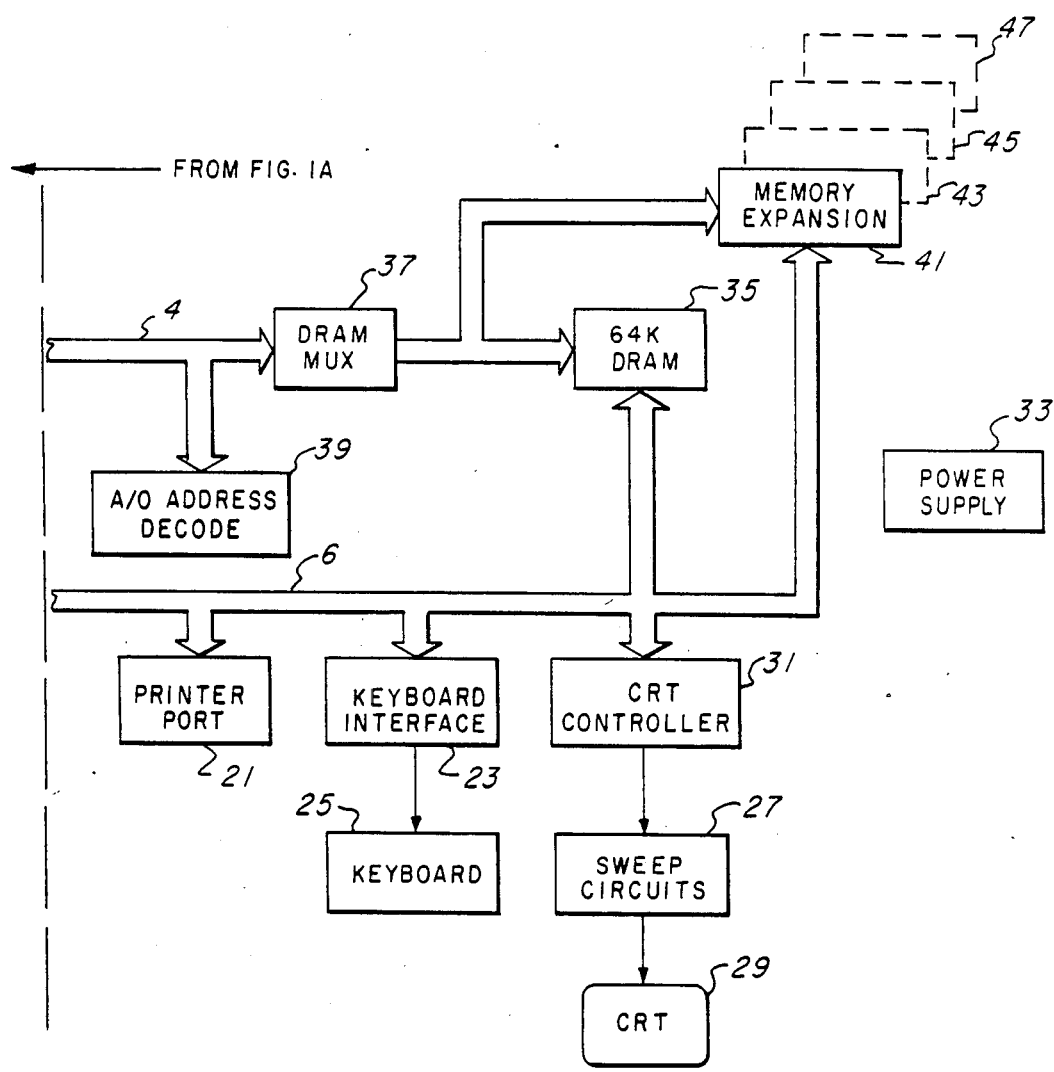

In FIG. 1, to which reference should now be made, there is shown a computer system 100 incorporating a high-speed processor 10 according to the invention. The high-speed processor 10 processes data from a data random access memory or "DRAM" which in the case of the embodiment of FIG. 1 is a 64 kiloword (16 bit) DRAM 35. There are provisions made for memory expansion through the addition of memory expansion modules 41, 43, 45, and 47. A memory multiplexer which in the embodiment of FIG. 1 is referred to as a DRAM mux 37, multiplexes the data to the high-speed processor 10 from either a 64K DRAM or one of a memory expansion modules 41, 43, 45 or 47. The high-speed processor 10 will process the data according to program instructions provided it by data bus 2 from one of the many program sources. A unique feature of the computing system 100 is not only the different means of storing of the instructions to operate on the data but the type of instructions available for operation on the data by the high-speed processor 10. A resident ROM 1 contains the core routine for the operation of the high-speed operation. However, the high-speed processor 10 may assume the personalities of other types of microprocessors through the modification of the core routine addressed in ROM with the contents of the personality module ROM/RAM which can be a ROM and RAM combination. The personality module ROM/RAM 3 will cause the high-speed processor 10 to look like a selected type of processor that is based upon the program that is contained within the personality module ROM/RAM 3. Additionally, as will be discussed later, the high-speed processor 10 is capable of accepting verbal commands and instructions and responding in a verbal manner. The software code for performing these verbal portion is contained within an expansion speech output module 5 and an expansion speech input module 7.

An expansion status RAM 9 provides other optional input/output capabilities to the high-speed processor 10 and to the programs or core routines stored within the personality module ROM/RAM 3 and the resident ROM 1. Data bus 6 is used to interface the input/output (I/O) modules ports to the high-speed processor 10, the memory units including the 64K DRAM 35 and the memory expansion modules 41, 43, 45 and 47 as well as to the expansion static RAM 9, the expansion speech input module 7 and the expansion speech output modules 5. The I/O ports or terminals include a disk interface unit 11 which connects to disk type memories for providing both program instructions and data to the high-speed processor 10.

In the embodiment shown in FIG. 1, the disk interconnect unit 11 is connected to a hard disk 13 as well as to two internal 5¼ inch disks 51 and to two external 8 inch disks 49. As was discussed earlier, the speed output module 5 is connected to an I/O module 15 which in the case of the embodiment of FIG. 1 is a digital-to-audio converter 15 which converts audio signals to digital signals which may be processed by the high-speed processor 10 in conjunction with the algorithms contained within the expansion speed output module 5. In a similar but obviously contrafashion, the I/O module 17 which in the embodiment of FIG. 1 is a digital to audio converter converts the digital signals that are applied thereto from the high-speed processor 10 which processes the digital signals in a manner dictated by the algorithms contained within the expansion speech input module 7. An optional I/O module 19 is provided which may, depending upon the application be used in conjunction with the algorithms contained within the expansion static RAM 9. Additionally, hard copies of the inputs and outputs to the high-speed processor 10 is provided to a printer, not shown, via a printer port 21. Manual entry to the high-speed processor 10 is provided via a keyboard 25 and a keyboard interface 23.

Visual display is provided to the operator through a CRT 29 which is controlled by a CRT controller 31 and the sweep circuits 27 which causes the CRT 29 to provide readable information via the CRT screen to an operator.

Figure 2A:
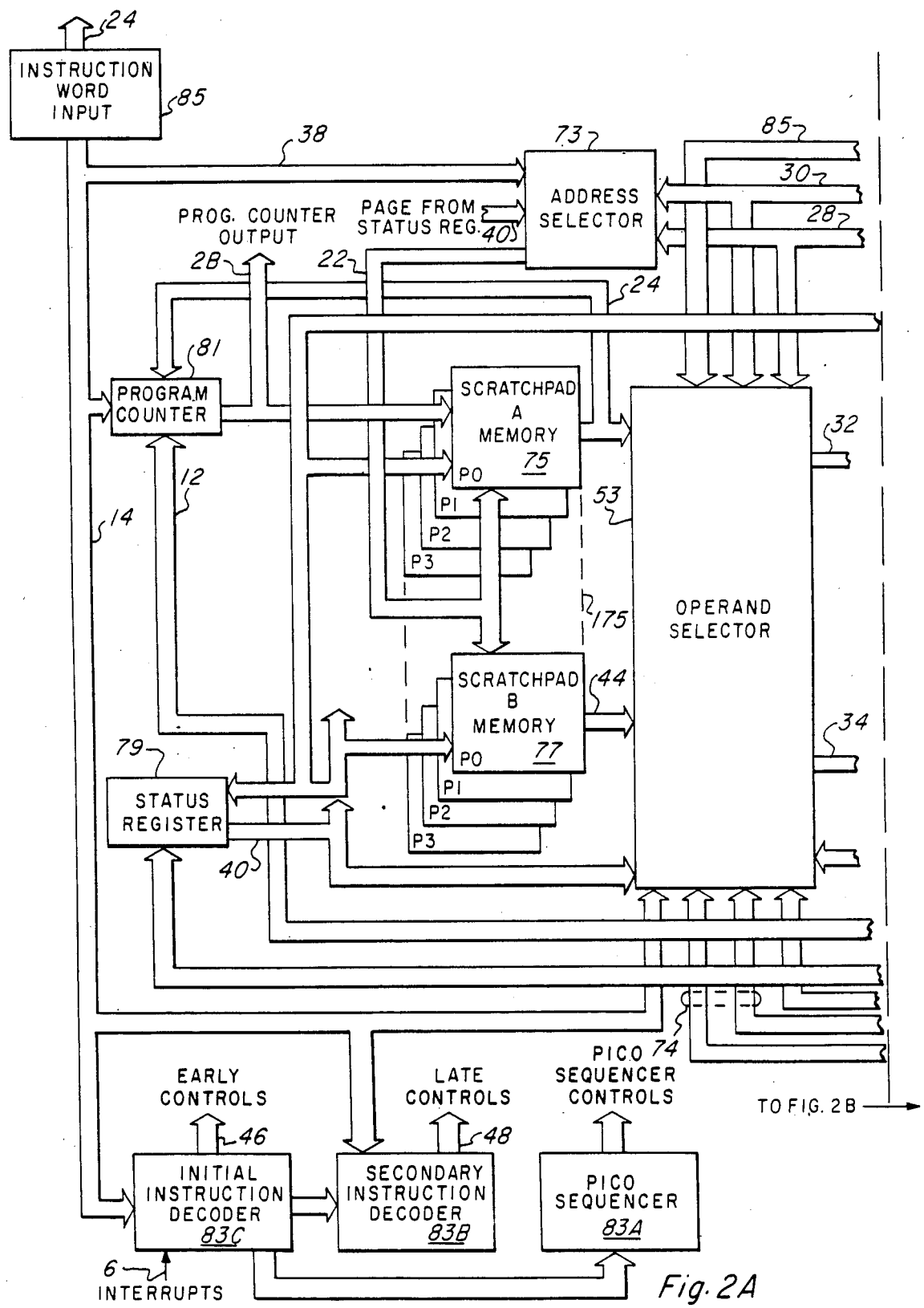
FIGS. 2A and 2B are a block diagram of the high speed processor according to the invention.
Figure 2B:
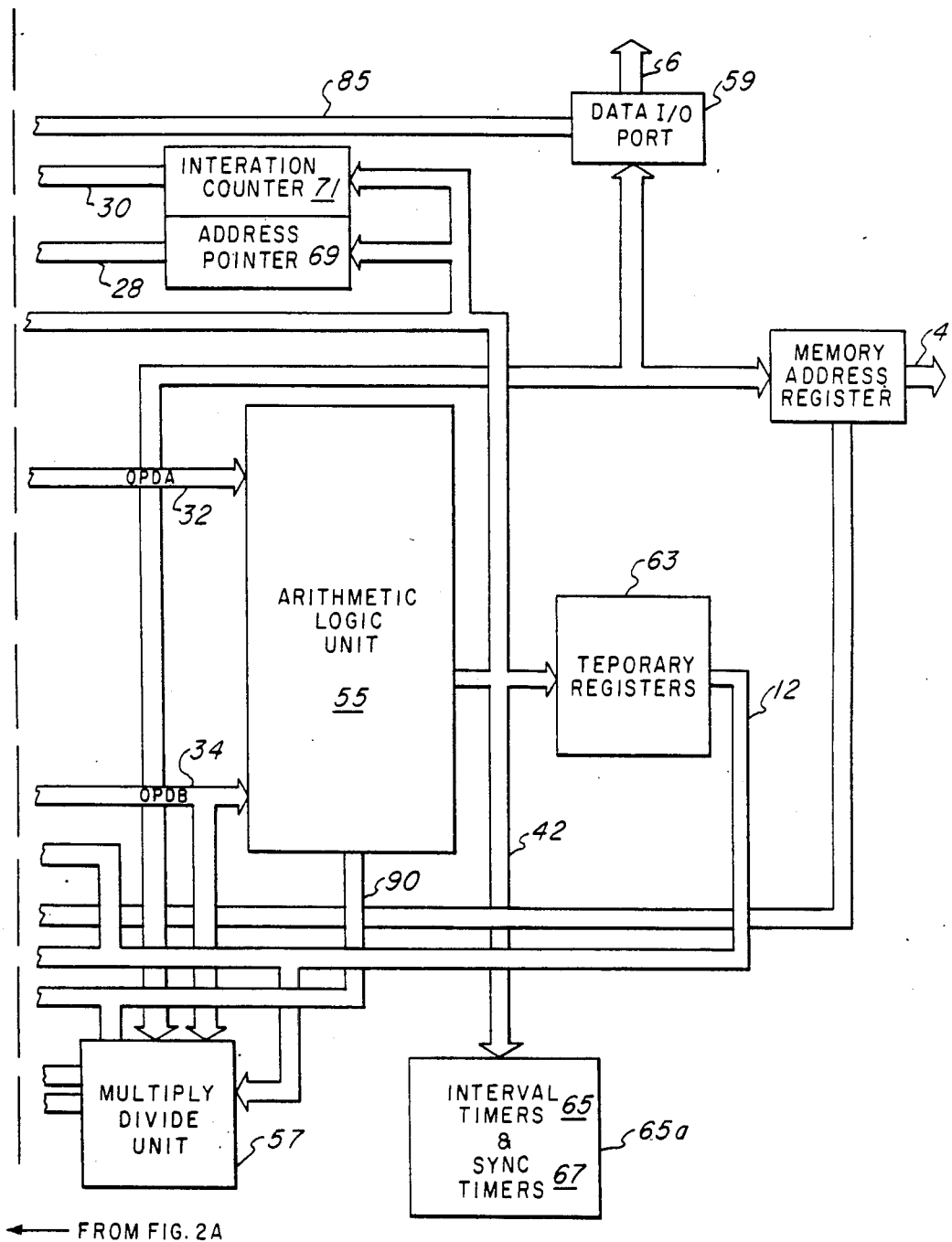

In FIG. 2, to which reference should now be made, there is shown a block diagram of the high-speed processor 10 according to the invention.

Figure 12:
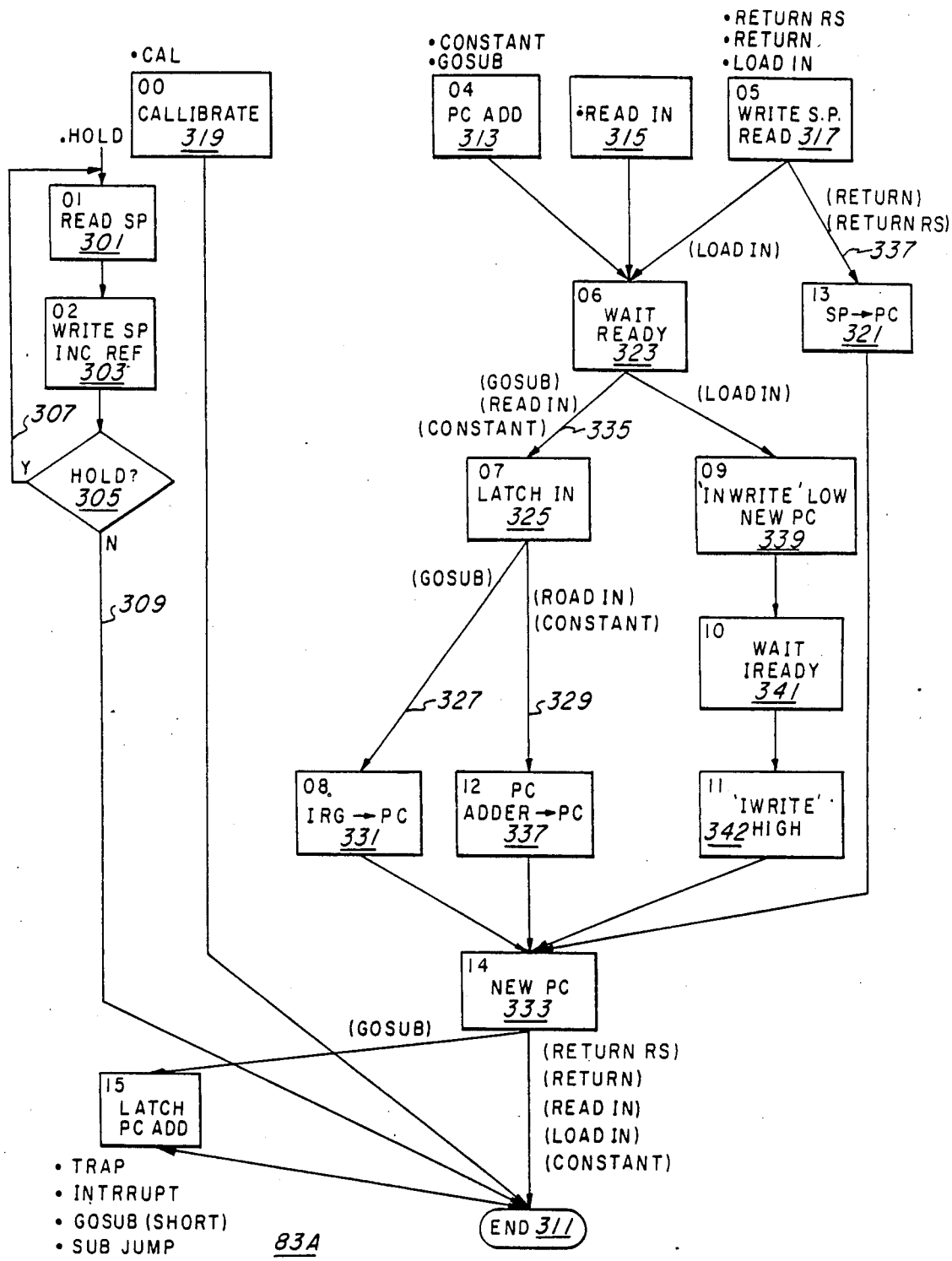
FIG. 12 is a state diagram of the picosequencer logic of FIG. 2.

Instruction words are applied via the instruction word input 85 to an address selector 73 via data bundle 26 and to the program counter 81, the operand selector 53 and the instruction decoder 83 via data bundle 14. The instruction decoder 83 decodes the instruction words, which in the embodiment of FIG. 2 are 16 bit instructions, producing control and timing signals for the other functional blocks of the high-speed processor 10. The instructions are executed in one clock cycle, so in essence the decoder generates a large set of control signals which are valid during an instruction cycle. The exceptions to these general cases are handled by a pico sequence logic 83a. The pico sequence logic 83 is used in the executions of instructions that cannot be executed by a simple, straight path through the high-speed processor logic. The pico sequence logic 83a is a state machine with several transition paths through it that depend on the state of the external control signals as well as on the instruction being executed. FIG. 12 is a state diagram of the pico sequence logic 83a. In addition to the pico sequencer logic 83a, there are two other types of instructions that are decoded by the decoder 83 which include a secondary instruction decoder 83b which decodes late control instructions and initial instruction decoder 83c which decodes early decode instructions. Late control instructions are defined as those control signals needed late in the computer cycle (e.g. scratch pad write select) and early control instructions are defined as those signals which must control logic early in the computer cycle (e.g. branch logic, scratchpad read select). The instructions from the instruction decoder 83 are routed to the different blocks of the high speed processor 10 and are used to provide control to the different blocks as will be explained in conjunction with the discussion of the instruction set contained in tables I and II.

The instructions are also applied to the program counter 81 which addresses the programmed memories that include the memories that are connected to conductor bundle 2 as was discussed in conjunction with FIG. 1 during each sequence of program instructions. The program counter is updated after initial decode of an instruction, such that the next instruction is fetched concurrently with execution of a current instruction. Its sequential operation may be modified by 10, 12, or 16 bit jump operations, 12 and 16 bit subroutine calls and subroutine returns, and exception traps to predefine instruction memory locations. A pointer 69 is, in the embodiment shown of FIG. 2, an 8 bit register and is primary used as a stack pointer maintaining program linkage for subroutines and exception traps. Stack push operations are performed by incrementing the pointer at the beginning of an instruction and using the result as an indirect write address into both the scratch pad A memory 75 or the scratch pad B memory 77 via the address selector 73 and the data bus 22 at the end of an instruction cycle. The scratch pad A&B memories 75 and 77 pop (remove from top of stack, an orderly arrangement of memory in a last in first out (lifo) arrangement) operations are performed by using the pointer as an indirect address for a scratch pad memory read at the beginning of an instruction, followed by a pointer decrement at the completion of the read operation. The address selector 73 is used to select the address source for a scratch pad memory access, either scratch pad A memory 75 or scratch pad B memory 77. Either the scratch pad A memory 75 or the scratch pad B memory 77 or both may be accessed as source operands for a single instructions. An instruction result may be written to either the scratch pad A memory 75 or the scratch pad B memory 77. In the case of a subroutine or a machine exception, both the scratch pad A memory 75 and the scratch pad B memory 77 are written into simultaneously, with the return address being written to only the scratch pad A memory 75 and the current processor status being written to only the scratch pad B memory 77. Address sources include as was discussed above: the pointer 69; interation counter 71; a refresh counter which is implemented through software iteration; and one of three fields within the instruction words which will be discussed in conjunction with the scratch pad A&B memories 175.

The scratch pad A&B memories 175 which (if not evident) includes two memories, scratch pad A memory 75 and the scratch pad B memory 77 that have an architecture which provides capabilities in the embodiments shown in FIG. 2 for two 256 word by 16 bit register arrays. Either the scratch pad A memory 75 or the scratch pad B memory 77 may be addressed in a single instruction and are addressed in one or two ways; indirect and page.

The indirect method of addressing the scratch pad memories 175 is performed by the output of the address pointer 69 which in the case of FIG. 2 is 8 bits or the lower 8 bits of the iteration counter 71 is used as an address into a 256 word block of either the scratch pad A memory 75 or the scratch pad B memory 77.

The page method in the embodiment of FIG. 2 includes 4 bits from a status register 79 which are used to select one 16-word page from within each scratch pad memory block P0–P3.

An iteration counter 71 is used as a 16 bit loop counter and as an 8 bit address pointer into the scratch pad A memory 75. A loop control instruction is provided via data bundle 42 from the arithmetic logic unit 55 which decrements the iteration counter 71, tests for 0, and performs a relative branch using the remaining 10 or 12 bits of the instruction as a relative address if the test result is nonzero. When the iteration counter 71 is used as an indirect address register, the least significant 8 bits of the 16 bit address become an address into the scratch pad A memory 75. In the embodiment shown in FIG. 2, only 6 bits of the 8 bit address pointer 69 are used.

An operand selector 53 provides 1 or 2 operands to be executed by the arithmetic logic unit 55 dependent on the instruction being executed from either the iteration counter 71, the address pointer 69 or the data I/O port 59. Operation of the operand selector 53 is invisible to the user of the high speed processor 10 as the selection is performed by the instruction decoder 83 dependent on the instruction being executed. The operands are presented either to the arithmetic logic unit 55, a multiply divide unit 57 or to a data I/O port 59.

The arithmetic logic unit 55 receives its operand instructions from the operand selector 53 via data bundle 32 and 34 and provides a means for multiple precision arithmetic and shift operations for lengths to 16 words (256 bits). The operations provided are data movement operations-logic operations including AND, OR, and EXCLUSIVE OR-shift operations including combinations of left, right, logical, arithmetic, and circular,—arithmetic operations including add, subtract, increment, and decrement—bit operations that include set bit, reset bit, and test bit and byte operations including versions of most 16 bit instructions, move operations and swap operations.

As background information, the timing of which will be discussed later, status and multiple precision functions are discussed. Status is recorded for logic, arithmetic and bit test instructions. Three bits are provided for arithmetic logic operations. They are, carry, zero, and overflow. These bits are tested singly and in combination to perform conditional branch operations which are 16 bit branch, 12 bit branch and 10 bit branch. See Instruction Set of Table I for definitions. A test bit is provided for a test bit operation. Testing bit 15 (in the embodiment of FIG. 2 the sign bit) provides a test for negative values.

Figure 6A:
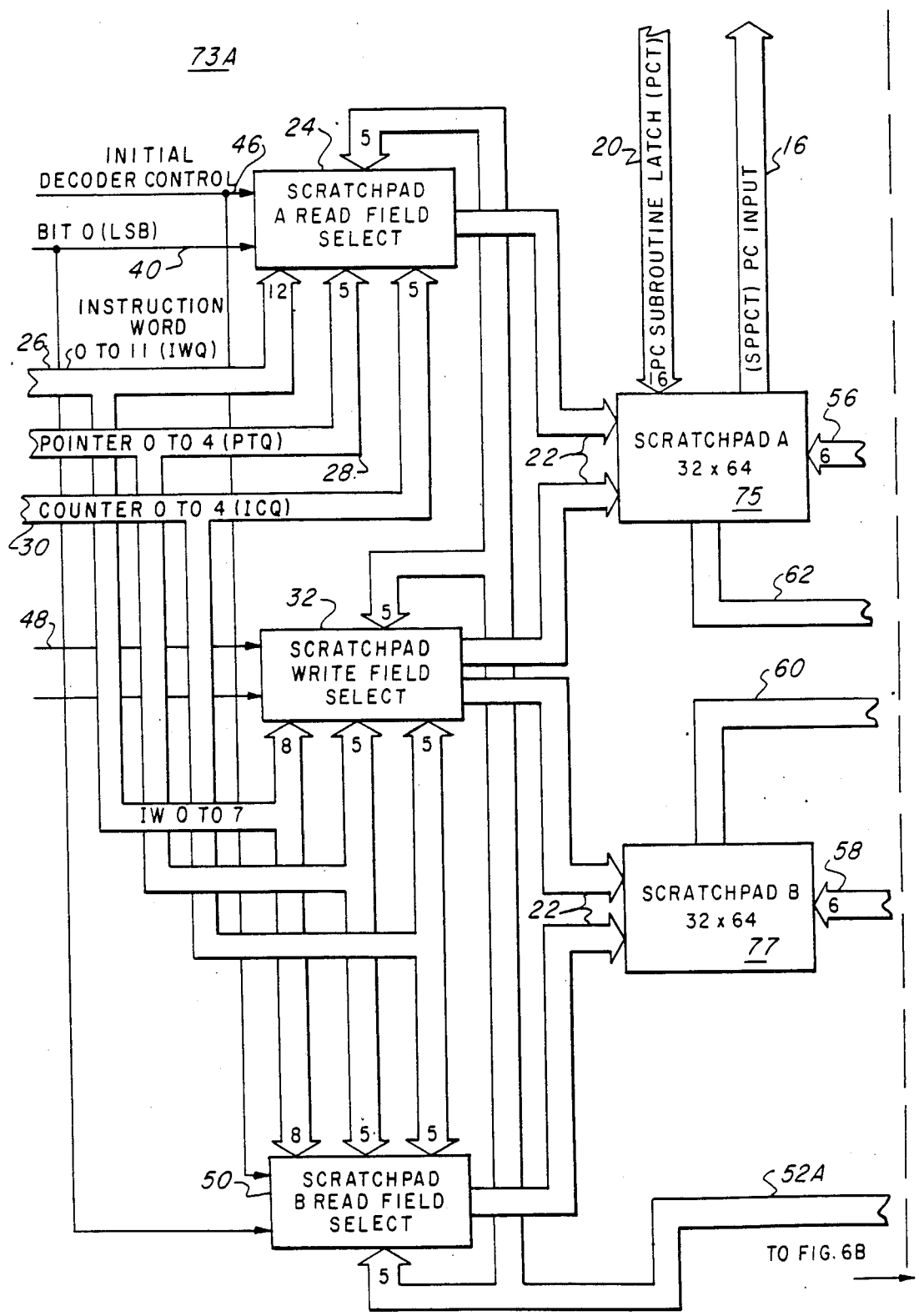
FIGS. 6A and 6B are a block diagram of the address selector of the scratch pad memories of FIG. 2.
Figure 6B:
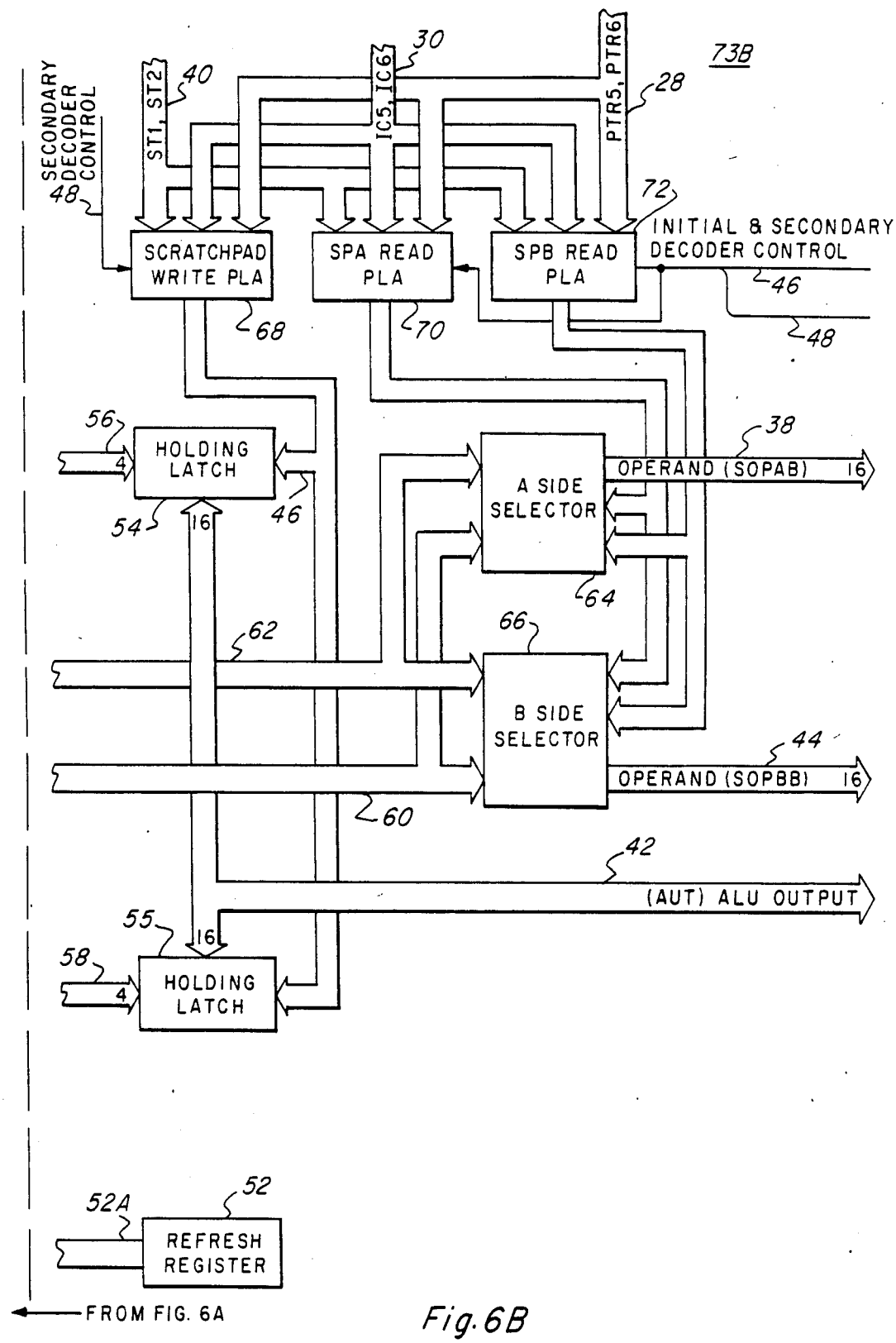

In the case of multiple precision, the multiple precision operations are performed using a four bit multiple precision counter that is illustrated in FIG. 6. Normally, the carry into the arithmetic logic unit 55 is in a non asserted state, and add, subtract, and shift operations are performed on 16 bit words. When the multiple precision counter is set to a non zero value, the carry out for an operation becomes the carry in to the next operation. This will be discussed in greater detail in the discussion of FIG. 8. However, the carry out becomes an intermediate carry for arithmetic instructions and a shift bit saved for shift bit operations. As each operation is performed, the multiprecision counter is decremented. When the count again reaches zero, the carry linkage terminates and the ALU reverts to its normal mode of operation.

A temporary register 63 provides temporary storage of the results from the arithmetic logic unit 55 for further processing or for use as a jump address. This does not imply that the register must be used as an accumulator. The instruction set provides ample means for register to register or memory to register operation. The temporary register 63 is also used heavily in byte operations, as it is the means provided for byte swap and byte load instructions.

A multiply/divide unit 57 performs multiply, divide and multiply/accumulate operations using either signed or unsigned arithmetic. Multiplication are performed using two 16 bit operands. This will be discussed in greater detail in conjunction with FIG. 9. However, both operands are specified in a single multiply or multiply and accumulate instruction. An 8 bit spill over register is used during multiply and accumulate instructions to allow accumulations of results greater than 32 bits. The spill over is loaded, cleared and manipulated in a way consistent with its being an 8 bit extension of a 32 bit accumulator. Division is performed using a 32 bit dividend in the multiply/divide unit in a 16 bit divisor specified as a divide instruction. Once initiated, a multiply or divide operation is performed concurrently with following instructions in the main high speed processor 10 instruction stream. For many applications this provides an apparent multiply or multiply accumulate time of one simple type instruction or cycle time.

Timer 65A is the interval timer 65 and sync timer 67 and as indicated in the figure represents two timers. The first interval timer 65 is a 16 bit timer with a resolution of a hundred nanoseconds and a maximunm period of 6553.6 microseconds. When a zero is loaded into the timer, the timer is disabled. When a non zero value is loaded into the timer via data bundle 42, the timer begins counting down toward zero. When zero is reached, an interrupt is generated and conveyed to the status of register 79 and the timer reloads itself to its initial value and the process repeats. The second interval timer 67 is a 16 bit timer with a resolution of 500 nanoseconds and a maximum period of 32.768 milliseconds. The timer is normally disabled. When a non-zero value is loaded, the timer begins counting down towards zero. When zero is reached, an interrupt is generated and the timer halts. The intent of the first interval timer 65 is to provide a high resolution timing signal with no accumulative errror buildup. The second interval timer 67 provides the capability of timer single intervals of moderately long duration.

A memory address register 61 provides a 16 bit data memory address space. Two separate 16 bit registers are contained within the memory address register 61 and are manipulated by separate instructions. The most significant half (MARM) is contained inside the memory address register chip, and a register may be provided external to the high speed processor 10 for external access. The least significant half of the memory address register 61 (MARL) has its outputs available on the data memory address bus 4.

A data memory bus 6 is used to access to locally independent address space. The data space is addressed via the memory address register 61 described above. A separate I/O register space as 64K words may be accessed via the same data lines, the 64K DRAM of FIG. 1, but with an externally latch, independent 16 bit address. Selection of the I/O versus memory data is made with a status register bit that is stored within the status register 79. The data I/O port 59 is designed to facilitate interfacing with other devices such as the Motorola M6800 processors and support chips. Data transactions are performed logically the same as the M68000 scheme. A bus arbitration means is also provided within the data I/O port 59 and will be discussed in conjunction with FIG. 10 which allows the high speed processor 10 to act as a bus controller in a single processor scheme or as a bus master in a multiple master scheme.

The status register 79 performs three major functions. It stores the status of the last arithmetic logic unit 55 operation, defines the operating mode of the high speed processor 10 and defines the scratch pad page as being utilized within the scratch pad memories 175. Bit assignments and further definitions are given in the instruction set contained in Tables I and II. Additionally, the arithmetic logic unit 55 status is recorded at the end of most arithmetic, logic, and shift operations. Three status bits are recorded, zero, carry, and overflow. A fourth bit test is recorded by bit test instructions. Another bit records an overflow of the multiplier divider unit 57. There are additionally load bits set for several operating conditions which effect the high speed processor 10. These include: arithmetic/logic mode; data memory address/data output disable; word/byte mode; interrupt mask; signed/unsigned operation of multiplied/divider; and data memory space mode. A four bit field is defined which provides expansion to 16 pages (1024 bytes) of scratch pad memories 175 and is denoted as the page select field.

An instruction memory interface is utilized via the data I/O port 59 and provides only for input of the high speed processor instructions.

Although the subroutine handling is discussed in greater detail later in the specification, handling of subroutines from an architectural point of view in the features necessary to implement subroutine are discussed in conjunction with FIG. 2. When a subroutine jump instruction is encountered, the address pointer register 69 of the iteration counter 71 is incremented, then the address of the next sequential instruction and the current state of the status register 79 are written into the scratch pad memories 175 in particular the scratch pad A memory 75 at the location indicated by the content of the address pointer register 69. The return address is written into the scratch pad A memory 75 and the status is written into the scratch pad B memory 77. Thus, the processor state is saved and the jump is performed in a single scratch pad memory cycle.

A subroutine return is the inverse of a subroutine call. The return address and saving status are read from the scratch pad memories 175 at the location currently located by the address pointer 69. The address pointer 69 is then decremented. The return address and status are copied to the appropriate registers and the instructions at the return address are fetched for execution.

An additional feature is provided by the architecture of the high speed processor 10 and provides for exception handling. Exceptions are events which occur outside the normally expected flow of instruction execution. For the high speed processor 10, these are interrupts and instruction traps. The handling of the contents of the program counter 81 and the status register 79 is performed in a manner similar to subroutines, except that the branch is to a fixed memory location, dependent on the type of exception. A block of 16 instructions is provided via the instruction word input 85 to allow modification of the status register 79 or other activities to be performed locally beginning at the trap address.

The high speed processor 10 has self-timed logic incorporated therein as will be discussed later, and does not use a clock to control the timing of instruction execution. Instead, each major function block contains the logic required to monitor its own operation. This logic operates on the longest logical and physical path within the functional block so that its timing represents the worst case propagation delay through the block. A "completion" signal of a block becomes the "initiation" signal for the next sequential block. Within a block, operation may be considered to be synchronous, since execution begins on a transition of an input signal. Timing between blocks is essentially asynchronous since there is no overall timing signal connecting all blocks. The number of functional blocks (hence the number of interblock control signals) is quite small, so that the amount of asynchronous operations in connection is also small. This fact, and the fact that most of each instruction is executed serially by block, virtually eliminates the logic race and logic hazard concerns traditionally associated with asynchronous logic.

Instruction throughput is maximized since worst case determinations are made at a block level rather than at the processor level. In a conventional clock system, the shortest clock period can be no longer than that required by a block with the most delay through it. This leads to time latency during instruction phases which required less than the worst case time.

Since the self-timed logic delay logic is built in close proximity to the functional logic components and employs the same field effect transistor logic, the processor is self-adaptive to process variations. This means that a slice yield can be expected to be higher than typical for a bar of its size. The processor is also self-adapted to changes in operation conditions, which means that the parts can be expected to operate across wider environmental extremes.

Figure 3:
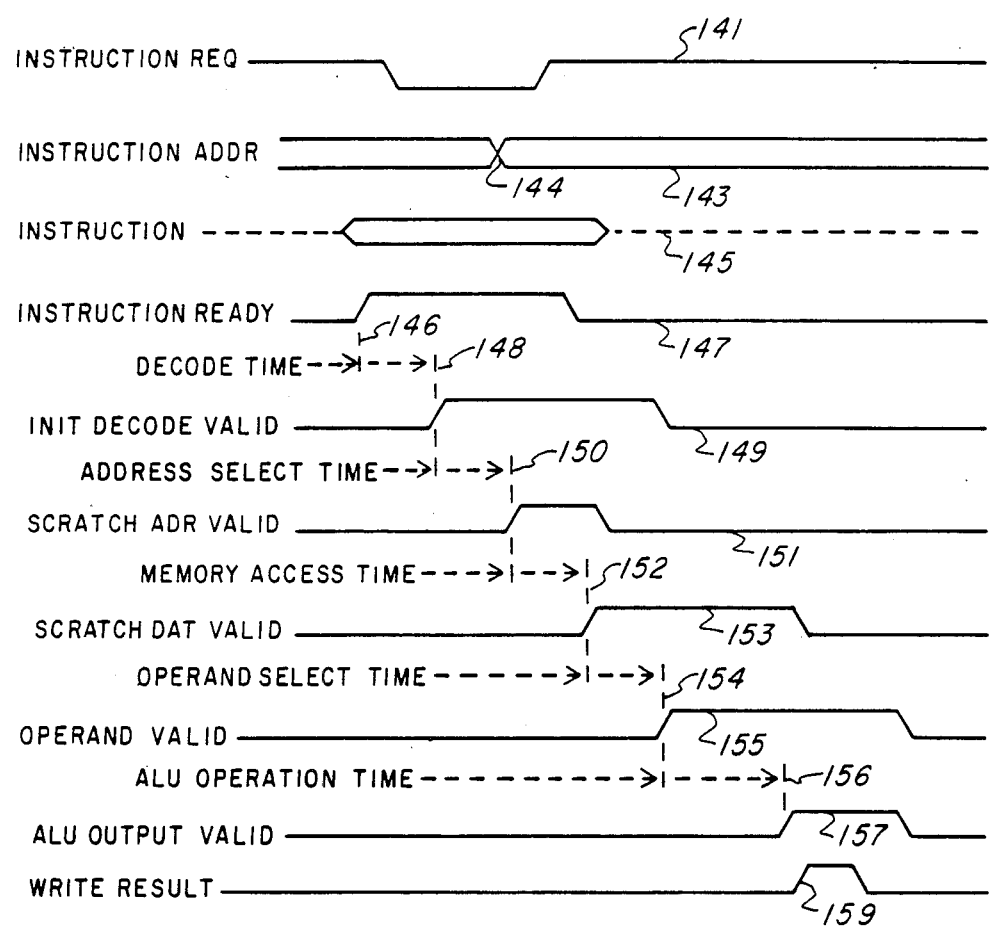
FIG. 3 is a waveform diagram illustrating an instruction execution.

The prefetching of instruction words and the asynchronous execution thereof by the high speed processor is provided in FIG. 3 which should be used in conjunction with FIG. 2. The instruction decoder 83 responds to the instruction word input 85 upon an instruction request that is represented by waveform 141 of FIG. 3. The program counter 81 provides on data bus 2b the instruction address that is represented by waveform 143. The instruction memory, which in the case of FIG. 1 is the resident ROM 1 provides the instruction ready signal, waveform 147, as well as the instructions waveform 145 to the high speed processor 10 via data bundle 2 and in particular to the instruction word input 85. The instruction ready signal causes the initial instruction decoder 83c to generate signals required near the beginning of the instruction execution sequence. The initial decoder 83c is optimized for speed, since the decode process must be completed before the next action or step can be defined. Instruction signal also initiates operation of the secondary instruction decoder 83b, which generates more signals that are not required until later into the instruction execution cycle. When the initial decoder 83c has completed its decoding of the instruction, it generates an initial decode valid signal which is represented by waveform 149 of FIG. 3 and also FIG. 3 illustrates the worst case decode time required to decode the instruction by dimension lines the length or time between 148 and 149. Simultaneously, with the decoding of the instruction by the initial instruction decoder 83, the program counter 81 begins operation. After the initial decode valid signal is received from the initial instruction decoder 83c, the program counter 81 generates the next instruction address and places this information on data bus 2b which is a portion of data bus 2 of FIG. 1. The next address may be an increment of the current address as will be discussed in conjunction with the program counter 81. The new address is placed on the data bus 2b following decoding of the current instruction. This transition occurs at point 144 of waveform 143. This action allows the next instruction request as indicated by waveform 141 to be concurrent with the execution of the current instruction. The initial decode valid signal, which is representative as discussed before by waveform 149, causes the scratch pad address selectors which are a portion of the scratch pad memories 175 to generate an address into the scratch pad memories 175. The source of this address is defined by the initial instruction decoder 83c. When the scratch pad address selector has completed its selection of the scratch pad address, it generates a scratch pad valid signal, which is represented by waveform 151. The time for this execution is illustrated by the distance between dimension lines 148 and 150.

The scratch pad address valid signal as represented by waveform 151 causes the scratch pad memories 175 to access the designated row and column within the scratch pad memories 175. When the scratch pad memories 175 has completed this access into the memory, it generates a scratch pad data valid signal that is represented by waveform 153. Dimension lines 152 represents the time in which the scratch pad data valid signal is initiated. The scratch pad data valid signal causes the operand selector 53 to place the scratch pad data onto one side of the arithmatic logic unit 55 and to place another operand onto the second side of the arithmetic logic unit 55. The placements or selections are defined by the secondary instruction decoder 83b. Within the arithmetic logic unit phase there may be several subphases dependent on the instruction being executed. At the completion of the arithmetic logic unit phase, the arithmetic logic unit 55 generates an ALU output valid signal that is represented by waveform 157 at the time that is represented by dimension line 156. The ALU output valid signal causes the arithmetic logic unit output to be written into the destination specified by the secondary instruction decoder 83b. This is indicated by wayform 159. The earliest a result is needed is in the scratch pad read phase of the next instruction. This occurs at the destination register of an instruction which is the source register of the following instruction since the write does not need to be complete for the next instruction decode to occur, ALU output valid causes the high speed processor to loop back to the instruction decode phase to await reception of the next instruction ready signal. Thus completing the instruction cycle.

In the event a scratch pad fetch is not required for an operand, (the instruction being executed does not require a scratch pad operand) the associated phases are not executed, thereby shortening the instruction cycle. Another example of an instruction phase shortening is in the arithmetic logic unit 55, where the time required to propagate through the arithmetic logic unit 55 is eliminated when the arithmetic logic unit 55 is not performing an add or subtract operation.

The common characteristic of all instructions is that they are executed in one pass through the processor logic (only one scratch pad memory read access is performed; only one ALU operation is performed). This limits the complexity of the actions which can be performed by one instruction, but simplifies the logic of the processor and enhances the speed at which they are executed. The only exception to the "one pass" characteristics are the two word instructions that load 16 bit constants and performs 16 bit programs functions. These executions only loop through part of the logic associated with instruction acquisition. The largest part of the data path is still passed through only once.

In FIG. 3 the dimension lines 146, 148, 150, 152, 154, and 156 illustrates how an event occurs at the completion of a preceding event. Copending U.S. application Ser. No. 598,592, filed Apr. 11, 1984, by reference here incorporated, discusses asynchronous operation of the high speed processor further.

Figure 4A:
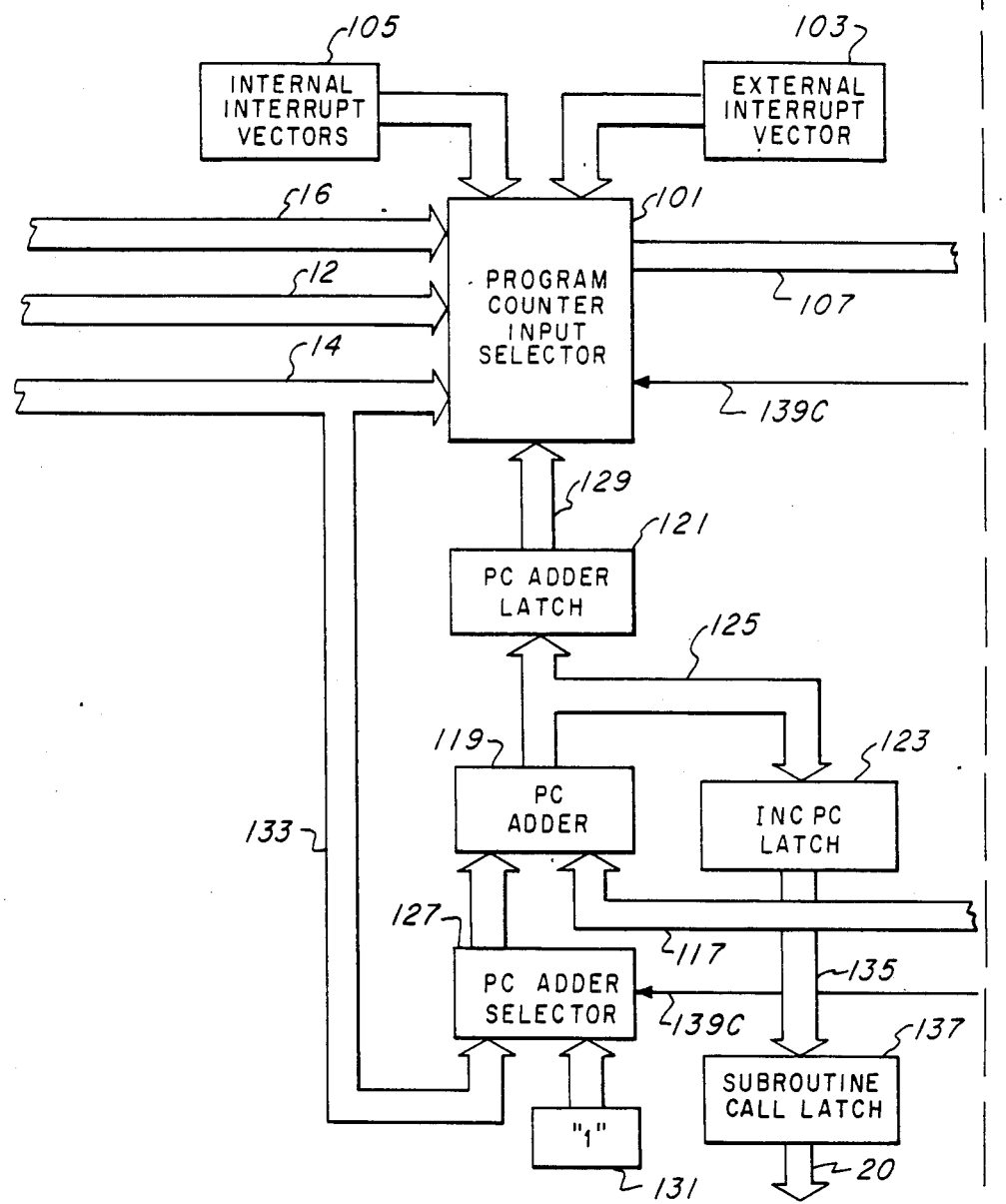
FIGS. 4A and 4B are a block diagram of the program counter of FIG. 2.
Figure 4B:
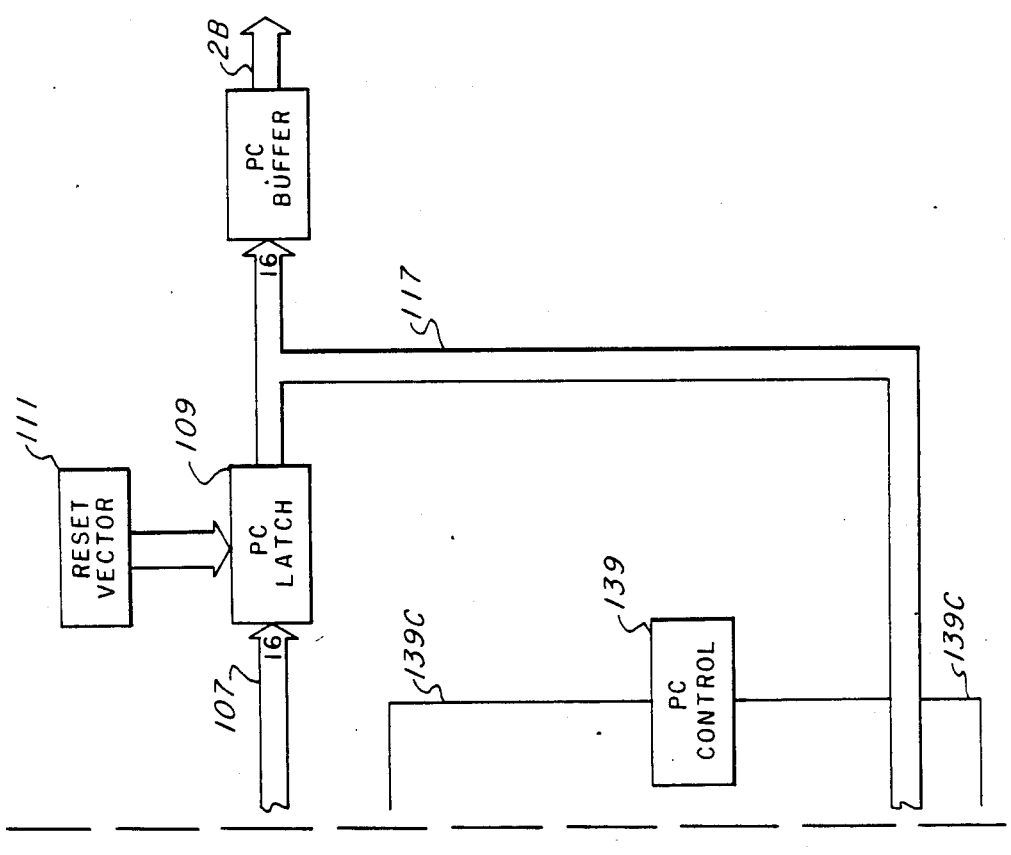

FIG. 4 is a block diagram of the program counter 81 of FIG. 2. A program counter input selector 101 receives inputs from the scratch pad A memory 75 by a data bus 16, outputs from the temporary register 63 by a data bus 12, and instruction word inputs from the instruction word input 85 by a data bus 14. The scratch pad A memory 75 output provides to the program counter input selector 101 "RETURN" and "RETURNS" instructions. The output of the temporary register 63 includes subroutine jump instructions "SUBJUMP", "JUMP" instruction, Ax(Bx) IW, IW Ax(Bx). (Refer to Tables I and II for explanation of this operation) The program counter input selector 101 handles the external interrupts from the external interrupt vectors or the interrupt caused by the interval timer 1, interval timer 2, or a trap interrupt by the internal interrupt vector 105. The output of the program input selector 101 is controlled by a program counter "PC" control 139. Program counter control 139 is applied to a "PC" latch 109 which is reset by a reset vector 111. The output of the PC latch 109 is applied to a PC buffer 115 and to the data bundle 2b. Additionally, the output of the PC latch is applied to the PC vector adder 119 where it is summed with the instruction word that is present on beta bundle 113 and includes branch instructions and short "GOSUB" subroutines. A PC adder-selector 121 selects either the instruction words or a bias logic 1 that is provided by the logic 1 circuit 131 which represents normal instructions, two-word instructions, Ax(Bx), IW, IW, Ax(Bx), GoSub, Subjump, internal interrupt, external interrupt, short "GoSub" Reference should be made to Tables I and II for the explanation of these routines. The selection of one of these routines, of course, is controlled by the PC control 139. The PC adder 119 combines the output of the PC adder-selector 121 with the output of the PC latch 109 and applies that to a PC adder latch 127 as well as an interrupt PC latch 123, which is connected to the PC adder 119 by data bundle 125. PC adder latch 127 holds the contents for application to the program counter input selections and PC program counter input select 101 selects the function on data bundle 129 for normal instructions, branches, two-word instructions, Ax(Bx), IW, and IW Ax(Bx). The output of the interrupt PC latch 123 is applied to a subroutine call latch 137 by a data bundle 135, the output of which is activated to execute "GOSUB", "SUBJUMP", internal interrupts, exteral interrupts.

Figure 5A:
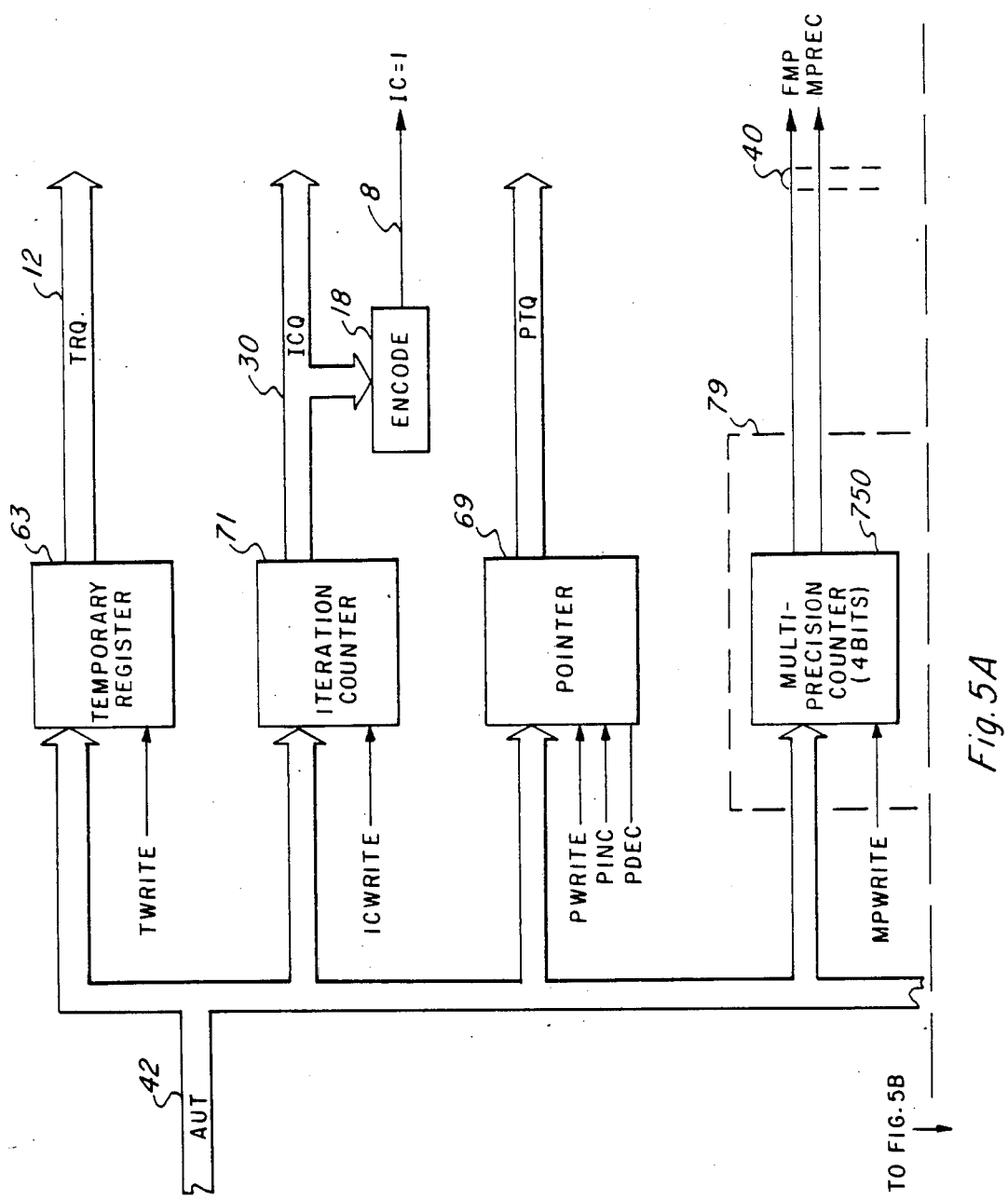

FIG. 5, to which reference should now be made, contains a block diagram of the registers that are illustrated in FIG. 2. In particular, the output or the arithmetic logic unit 55 is applied to the data bus 42 in which the signals are represented by the MNEMONIC, AUT, and are applied to the temporary register 63, the interation counter 71, the address pointer 69, as well as to the status register 79. The data is loaded in the temporary register 63 by the command to write, which originates from the instruction decoder 83, and in particular the secondary instruction decoder 83b. The iteration counter 71 also receives the output of the Arithmetic Logic Unit 55 and begins upon the currents of signal ICwrite, counting the operations necessary to perform the decoded instruction. The output of the iteration counter 71 is applied on data bundle 30 and also to an encode circuit 18 which provided as an output on conductor 8 as a status signal indicating that the contents of the iteration counter 71 is equal to one, when this is the case. Additionally, as was discussed in conjunction with FIG. 2, the output of the arithmetic logic unit 55 is applied to the address pointer 69 which under the control of the PWRITE command, PINC command and PDEC command. The address pointer 69 output is applied to data bus 28 for application to the address selector 73 and the operand selector 53. The control commands, of course, come from the secondary instruction decoder 83b.

The status register 79 consists of six independent registers which stores the status of the arithmetic logic unit 55, and the functions being implemented by the high speed processors during the execution of instructions provided to it by the instruction word input 85. These registers include a multi-precision counter 75, an arith/logic status register 77, a bit test status register 179, an M/D fault status register 81, a mode bit register 87 and a page bit register 89.

The multi-precision counter 75 is used to count the iteration, for performing the multiple precision operation and is controlled by the mnemonic MPWRITE and provides on its output the mnemonics EMP which is a status indicating the command to execute multiple precision and MPREC which is the mnemonic that indicates multiple precision operation is complete. In the embodiment shown in FIG. 5, the multiple precision counter 750 is a four-bit counter. Normally, the carry into the arithmetic logic unit 55 is a nonasserted state, and add, subtract and shift operations are performed on 16 bit words. When the multiple precision counter 750 is set to a nonzero value, the carryout from an operation becomes a carry in to the next operation. The carry-out thereby becomes an intermediate carry for arithmetic instructions and a shift bit saved for shift operation. As each operation is performed, the multiple precision counter 750 is decremented. When the count, as indicated by the mneumonic MPREC reaches zero, the carry linkage terminates and the arithmetic logic unit reverts to its normal mode of operation. This process will be discussed in greater detail in conjunction with FIG. 8, the block diagram of the arithmetic logic unit.

The arithmetic/logic status register 77 has three outputs. These are Z, C, and V and is controlled by the mnemonic WRT A/LS. The arithmetic/logic status register 77 stores the status of the arithmetic logic unit 55 under the control of the secondary instruction decoder 83b. These statuses include, as indicated above, the Z status or zero.

The Z bit is set if the result of an arithmetic, logic, or shift operation is zero. For a compare instruction, the Z bit indicates that the operands are equal.

The C bit is set if a carry-out of the most significant bit occurred during an arithmetic operation. For a shift operation, it is a copy of the bit that was shifted out of the operand in which case the Z bit is undefined on a logical operation.

The V bit is set if the result of an arithmetic operation could not be represented in a 16 bit two's complement location which, of course, indicates an overflow condition. For an arithmetic left shift operation, it indicates a change in sign of the most significant bit.

When a test is called for by the instructions that are applied to the instruction decoder 83, then a bit status register 179 stores the results of the test as indicated by the decoded instruction WRTBIT. The T-bit is modified by the test bit instruction, this state is a copy of the bit that is tested on the output of the arithmetic logic unit 55 and is contained on the data bus 42.

The M/D fault status register 81 indicates a fault in the multiply/divide operation of the multiply/divide unit 57 and stores a fault if the multiply/divide unit 57 provides the command set M/DF at the occurrence of the command WRT ST REG which is decoded by the secondary instruction decoder 83b. The M/DF bit is set by the multiply/divide unit 57 at the end of its operation if division by zero is attempted or if a multiplied and accumulated result cannot be represented by a 32 bit number.

The mode bit register 87 loads the status of the output of the arithmetic logic unit 55 on the command of the WRT ST REG from the secondary instruction decoder 83. These include the logic mode operation which is represented by the mnemonic, ARITH/LOGIC which indicates that certain op codes perform two distinct operations upon the state of the logic mode bit as represented by the above-referenced mnemonic which is set and reset by the processor program. The two operations use the same operand and store the results in the same locations. The differences in the operation, which switches between an arithmetic and a logic function. In general the switch is according to the "T@NEXT" command which is defined further in Tables I and II, that contains the detailed descriptions of the instructions. The setting of the logic mode bit to 1 will indicate the logic operation of (A and B), (A or B), (exclusive A Or B) and logic shift A. When the logic mode bit is set to zero, the mode bits indicate the arithmetic function of A plus B, A mius B, B minus A, and arithmetic shift A. The mnemonic, TRISTATE, is the output disable bit. When this bit is set by the high speed processor program, the data memory addresses that are connected to data bus 4 of FIG. 1 and the data bus drivers are disabled.

The WORD/BYTE indicates the byte or word mode operation. When the byte mode is set by the high speed processor program, the logical address in the memory address register 61 are used as byte addresses, and transactions with the data memory are performed with bytes. When this bit is reset, the logical operations in the memory address register 61 are used as 16 bit word addresses and transactions with the data entry are performed with 16 bit words. Memory references are always to 16 bit words, regardless of word or byte mode. When in the byte mode, only one byte is read or written from the address 16 bit word.

Interrupt mask is represented in FIG. 5 by the mnemonic, INT MASK, and is set by the high speed processor program when the interrupt input is disabled on data bus 6 of FIG. 1. The interrupt input is level triggered rather than edge triggered as is the case with most computer logic. If the interrupt line is asserted when the interrupt mask bit is set off, then interrupt sequence with be initiated.

Sign multiply function is indicated by the mode bit register 87 with the SGN/UNSGN mnemonic and when set by the high speed processor program, multiply and divide functions are performed as two's complement operations. When the bit is not set, these operations are performed unsigned. Data IO is the IO mnemonic and is set by the high speed processor program when references to external data memory buses are directed to the high speed processor IO addresses which are a 64 K block independent of the data memory. When this bit is not set, bus accesses are directed to data memory.

The page bit register 89 is controlled by the mnemonic WRT PAG which is decoded, of course, by the secondary instruction decoder 83b and provides a page select field that is used to select a 16 word page from the scratch pad memory 175. Direct scratch pad generation is performed by a four bit field from an instruction to the pad select field provided by the page bit register which is contained within the data bus portion 91 of the data bus 40. Both the scratch pad A memory 75 and the scratch pad B memory 77 addresses are generated from the same page select field. The four bit field that is contained within the data bus portion 93 of the data bus 40 provides a maximum capacity of 16 pages. This information will be discussed in conjunction with the addressing of the scratch pad memories 175.

FIG. 6, to which reference should now be made, is a block diagram of the address selector 73 and its connection to the scratch pad memory 175. The address selector is illustrated as two portions, 73a and 73b. Portions of 73a includes the scratch pad A read field selector 24, the scratch pad write field selector 32 and the scratch pad B read field selector 50. Whether or not there is a write or read operation is determined by the secondary decoder control that is provided on data bus 48 to the scratch pad write field selector as well as the initial decoder control tht is present on conductor 46 and provided to both the scratch pad A read field selector 24 and the scratch pad B read field selector 50. The least significant bit or bit zero from the status register 79 is provided to the scratch pad A read field selector 24, the scratch pad write field selector 32 and the scratch pad B read field selector 50 for indicating the necessary status for implementing a page read or write function. Each selector, read or write, A or B selects a portion of either the instruction word as present on data bus 26, the address pointer that is present on data bus 28 or the output of the iteration counter or a portion thereof that is present on data bus 30 for application to the scratch pad memories 175. Conductor or data bus 22 connects the scratch pad memories 175 to the address selector 73. The address in the scratch pad memories 175 is generally made up of two separate portions. Additionally, there are three scratch pads decoders which are implemented with programmable logic arrays and are denoted as the scratch pad write PLA 68, the SPA read PLA 70, and the SPB PLA 72. The scratch pad write PLA 68 is controlled by the secondary controls that are provided on data bus 48 from the secondary instruction decoder 83b and the SPA read PLA 70 and the SPB read PLA 72 are controlled by both the initial instructions that are decoded by the initial instruction decoder 83a and provided on data bus 46 as well as the late controls that are provided by the secondary instruction decoder 83b and applied to data bus 48. Each PLA decodes a combination of 3 signals, these include two of the status page bits ST 1 and ST 2 as well as two of the iteration counter bits that are present on data bus 30 and two of the pointer bits that are provided by the address pointer 69 of FIG. 2 which are used to either implement a write operation within the scratch pad memory or a read operation from the scratch pad memory by the control of an A side selector 64 and a B side selector 66.

The output of the scratch pad memories are denoted as SOPAB and is present on data bus 38 for application to the operand and selector 53 and SPOBB which is present on data bus 44 also for application to the operand selector 53. The output from the scratch pad write PLA 68 is applied to both an A holding latch 54 and a B holding latch 55. The A holding latch 54 is connected to the scratch pad A memory 75 by data bus 56 and provides the output of the arithmetic logic unit that is present on data bus 42 under the control of the output from the scratch pad write PLA 68 for loading into the scratch pad A memory 75 at the address that is present on data bus 22. In a similar fashion, the B holding latch 55 will provide to the scratch pad B memory 77 the data that is present on the output of the arithmetic logic unit that which is connected to data bus 42 via the data bus 58 under the control of the decoded instruction from the scratch pad write PLA 68. The read operation will cause the address that is present on data bus 22 that is generated in a manner that will be discussed later to apply the output of the scratch pad A memory on data bus 62 to the A side selector 64 as well as to the B side selector 66 and also apply the output of the scratch pad B memory on a B data bus 62 to both the A side selector 64 and the B side selector 66. The addresses for the scratch pad memories 175 are generated in both direct and indirect addressing modes. A direct address is generated by connecting the page select field of the status register 79 which was discussed earlier with a four bit field from an instruction word that is applied to the address selector via data bus 26.

The instruction field is always on a hexadecimal binary bit boundary. 1, 2 and 3 register instructions are provided. The status register in the direct mode provides four bits, the least significant bits are page information as was discussed in conjunction with the status register 79, and the instruction word provides four bits of address information which provides an 8-bit addressing of the scratch pad memories 175. However, in the embodiment shown in FIG. 6, only seven bits are used, being there are only six full pages provided in either the scratch pad A memory 75 and the scratch pad B memory 77. Additional addressing which explains the reason for the scratch pad A read field selector 24, scratch pad B read field selector 50 and the scratch pad write selector 32 is provided from the iteration counter and is an indirect means of addressing the scratch pad memories 175. The least significant 8 bits of the iteration counter 71 are used as addresses into the scratch pad memories. Selection of the A or B side of the scratch pad memories is determined by the instruction being executed as provided from the instruction decoders 83. As in the case of the direct addressing discussed above, only the least significant seven bits are implemented in the embodiment of FIG. 7. Additional indirect addressing is provided by the address pointer 69. In this mode, the contents of the pointer register is used as the address into the scratch pad memories 175. Selection of the A or B side of the scratch pad memories 175 is determined by the instruction being executed as is decoded by the secondary instruction decoder 83b. The pointer addressing, however, is limited since subroutines and interrupt linkage will be upset if the pointer address register is not maintained. The least significant bits from the pointer register 69 is used in the embodiment of FIG. 6. The scratch pad A read field selector 24, scratch pad write field selector 32, and scratch pad read field selector 50 are updated by a refresh register 52.

Figure 7B:
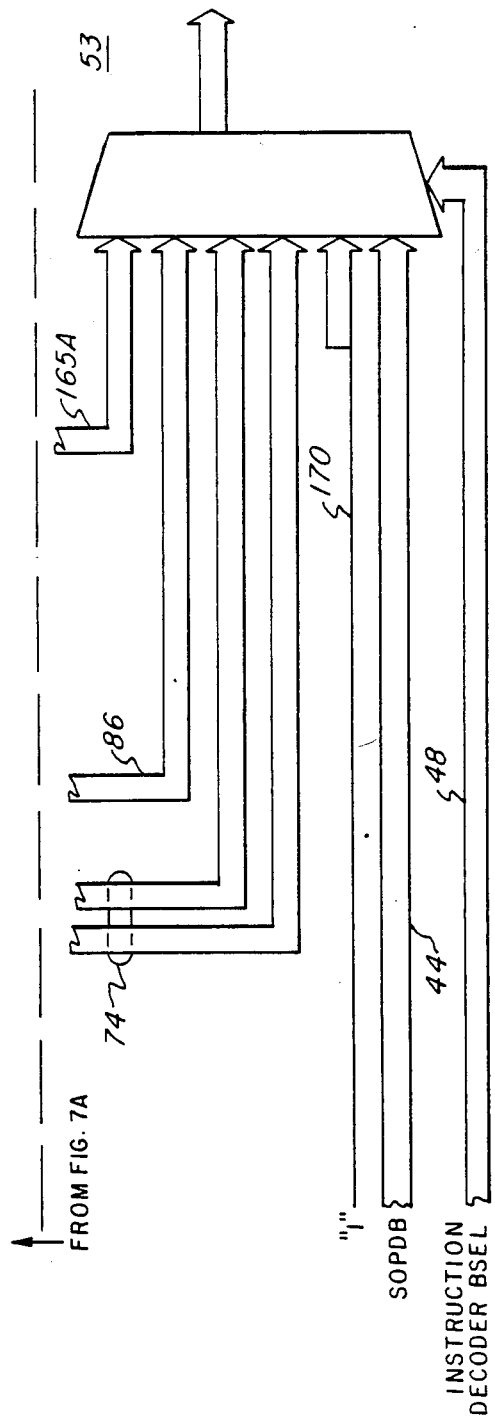

FIG. 7 is a block diagram of the operand selector 53. The operand selector 53 includes an A selector/multiplexer 161 and a B selector/multiplexer 163. The A selector/multiplexer 161 selects one of the signals that are applied to it for application to the arithmetic logic unit 55, multiply/divide unit 57 or memory address register 61 via its output which is designated by the mnemonic, OPDA, and is present on data bus 32. The A selector/multiplexer 161 selects either the output of the scratch pad memory which is represented by the mnemonic, SOPDA, and is present on data bus 38; the output of the address pointer 69 which is present on data bus 28; the output of the instruction word counter 85, which is represented by the mnemonic, ILQ, and is present on data bus 14; the output of the status register 79 which is represented by the mnemonic, STQ, which is present on data bus 40, where STQ refers to the complete status register that is contained within the status register 79 and is a portion of the data bus 40; the output of the iteration counter 71 which is represented by the mnemonic, ICQ, and is present on the data bus 30; the output of the data I/O port 59 which is represented by a mnemonic, TOTDBQ, and is present on data bus 86; the output of the memory register 61 that is present on data bus 60 and is represented by the mnemonics, MARMQ and MARLQ; and the output of the multiply/divide unit 57 which is present on data bus 74 and is represented by the mnemonic, MDMQ and MDLQ; a logic zero bias that is present on data bus 168; the output of the temporary register 63 via data bus 12; and a byte reversal of the output of the temporary register 63 that is present on the data bus 12 with the mnemonic, TRQ, at point 165. The A selector/multiplexer 161 is controlled by the A selector signals that are present on data bus 48 from the secondary instruction decoder which is represented by the mnemonic, ASEL. The B selector/- multiplexer 163 selects either the TRQ signal that is present on data bus 12, the TOTDBQ signal, the MDLQ signal, a logic one bias signal that is present on data bus 170, and the output of the scratch pad memory that is present on data bus 44. The B selector/multiplexer is controlled by the B selector signals which are represented by the mnemonic BSEL which is present on data bus 48 and is decoded by the secondary instruction decoder 83C.

Figure 8A:
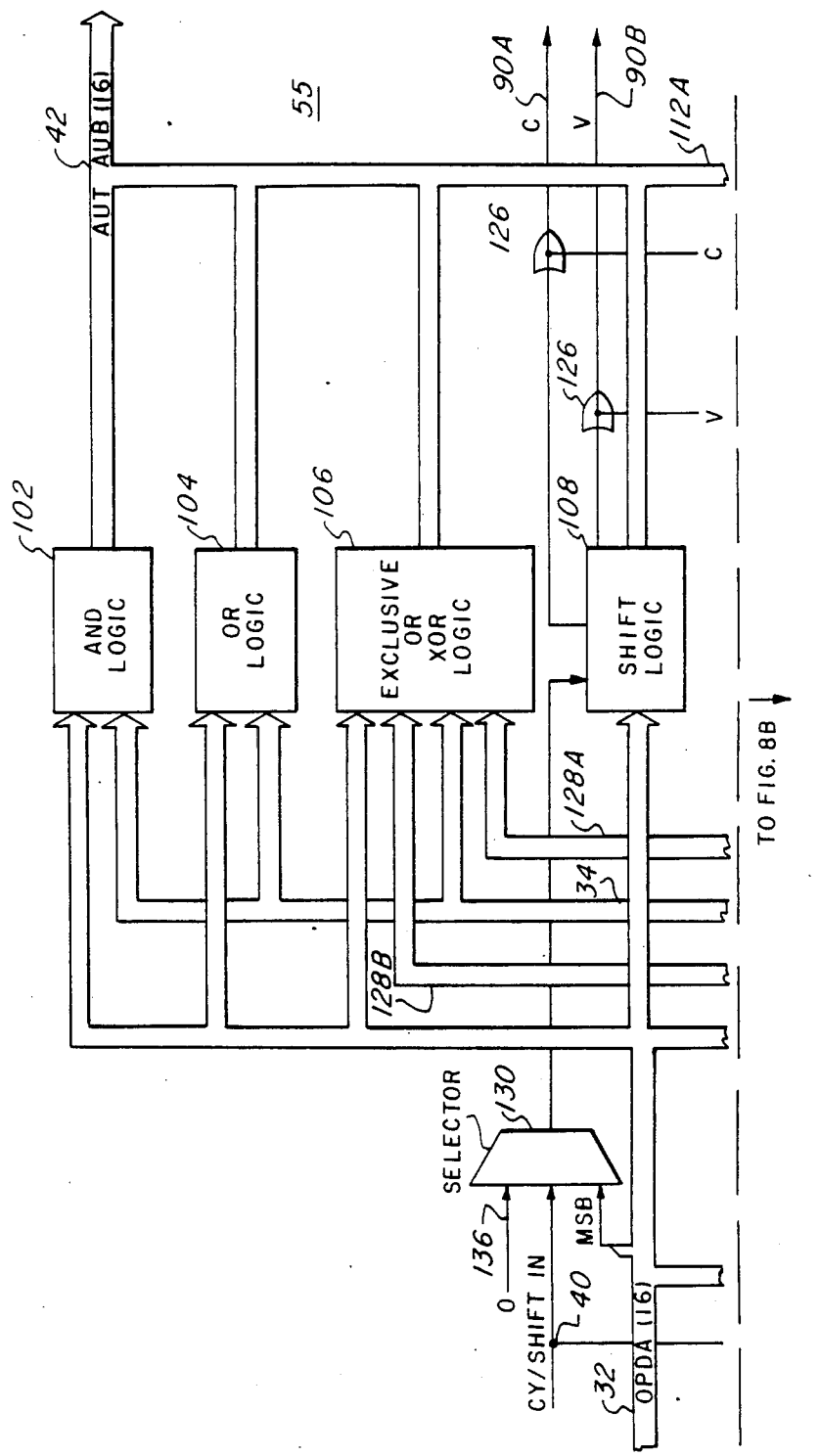
FIGS. 8A and 8B are a block diagram of the Arithmetic Logic Unit of FIG. 2.
Figure 8B:
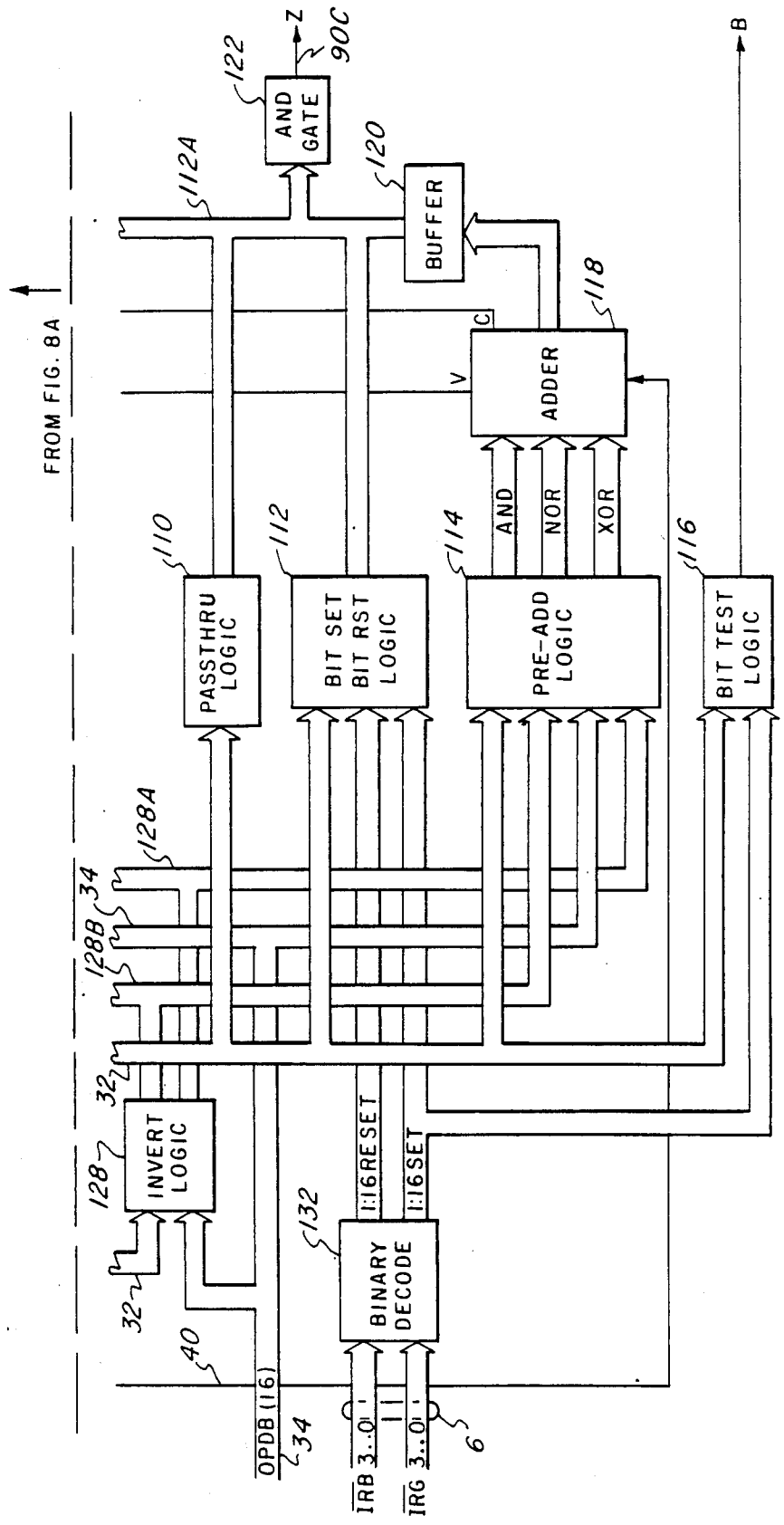

FIG. 8, to which reference should now be made, is a block diagram of the arithmetic logic unit 55. The carry 40 from the status register 179 is brought in to a selector 130, which selects either the most significant bits on the output of the operand selector A side OPDA that is present on data bus 32, or the carry-out from the arith/logic status register 77 of FIG. 5 which is denoted as C, or a logic zero bias 136. The output of the selector is used as an input to the shift logic circuit 108 which provides, during shift operations, an output on data bus 42, as well as an indication of a carry of data bus 90A or an overflow condition on data bus 90B. AND LOGIC 102 combines the output of the A side of the operand selector 53 with the output on the B side of the operand selector 53 that is present on data bus 42 to provide the combination of the two sides; OR LOGIC 104 logically OR's the two sides of the operand selector 53; exclusive OR logic 106 exclusively or's the two sides of the operand selector 53. It should be noted that to perform the exclusive "OR" function, that the two sides needs to be logically inverted which is done by the invert logic 128. Pass through logic passes through the A side output of the operand selector 53 which is applied thereto by data bus 32 to the output data bus 42. Bit set and bit reset logic 112 is used to set (1) or reset (0) one bit of the A side operand. The bit to be set or reset is contained in the instruction and decoded by the binary decoder 132 which also decodes which bit is to be tested by the bit test logic 116 which tests the data that is present on data bus 32 and applies the result to the bit status register 79. A pre-add logic 114 performs AND, NOR, and exclusive OR operations on the data that is present on both sides of the operand selector 53 and applies these functions to an adder 118 which indicates the overflow conditions and carry condition, the output to which is applied to a buffer 120. And gate 122 combines the signals that are present on data bus 42 to indicate a zero condition on status line 90C. The test, of course, is provided on status line 90D.

Figure 9A:
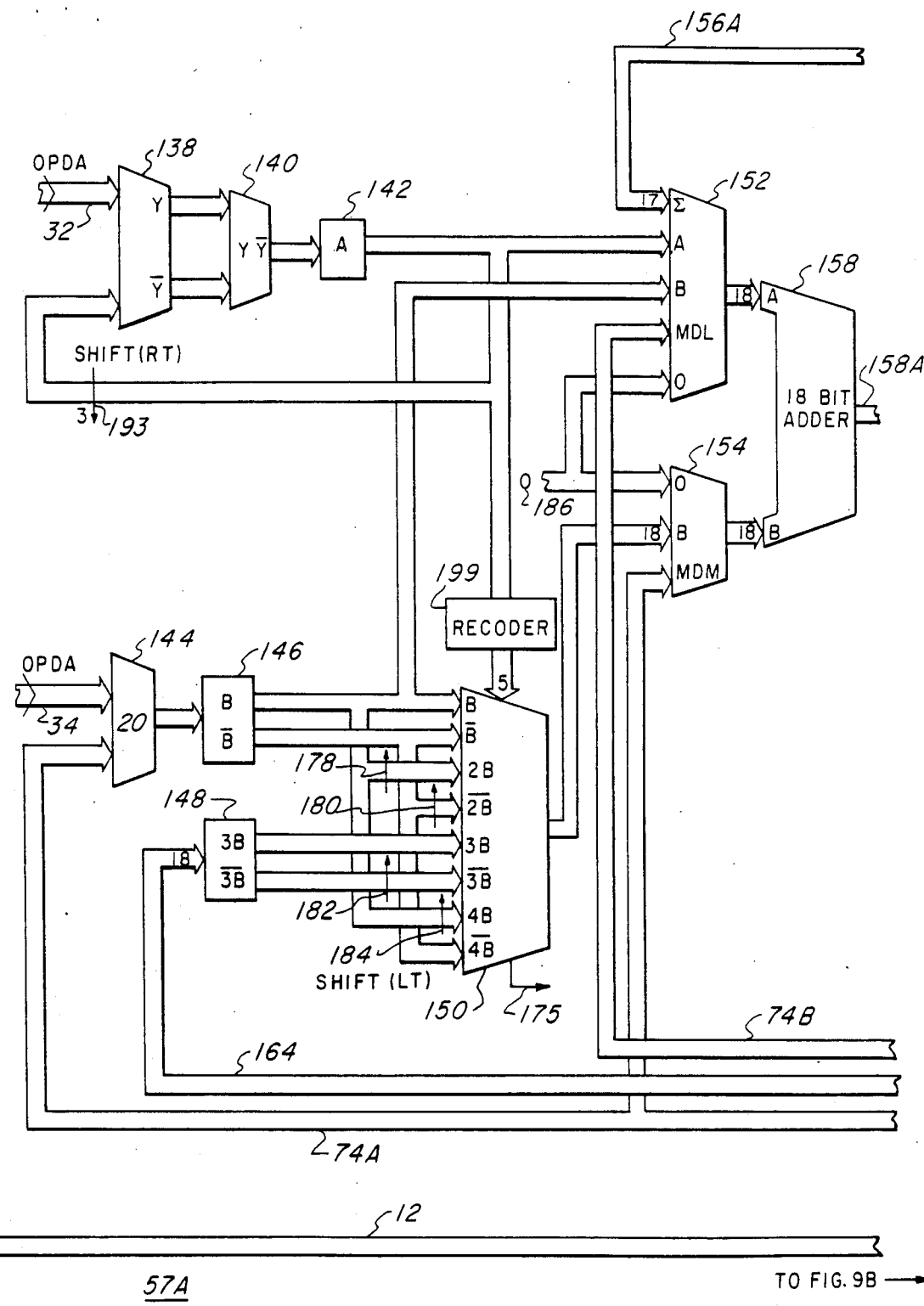
FIGS. 9A and 9b are a block diagram of the mutiply divide logic of FIG. 2.
Figure 9B:
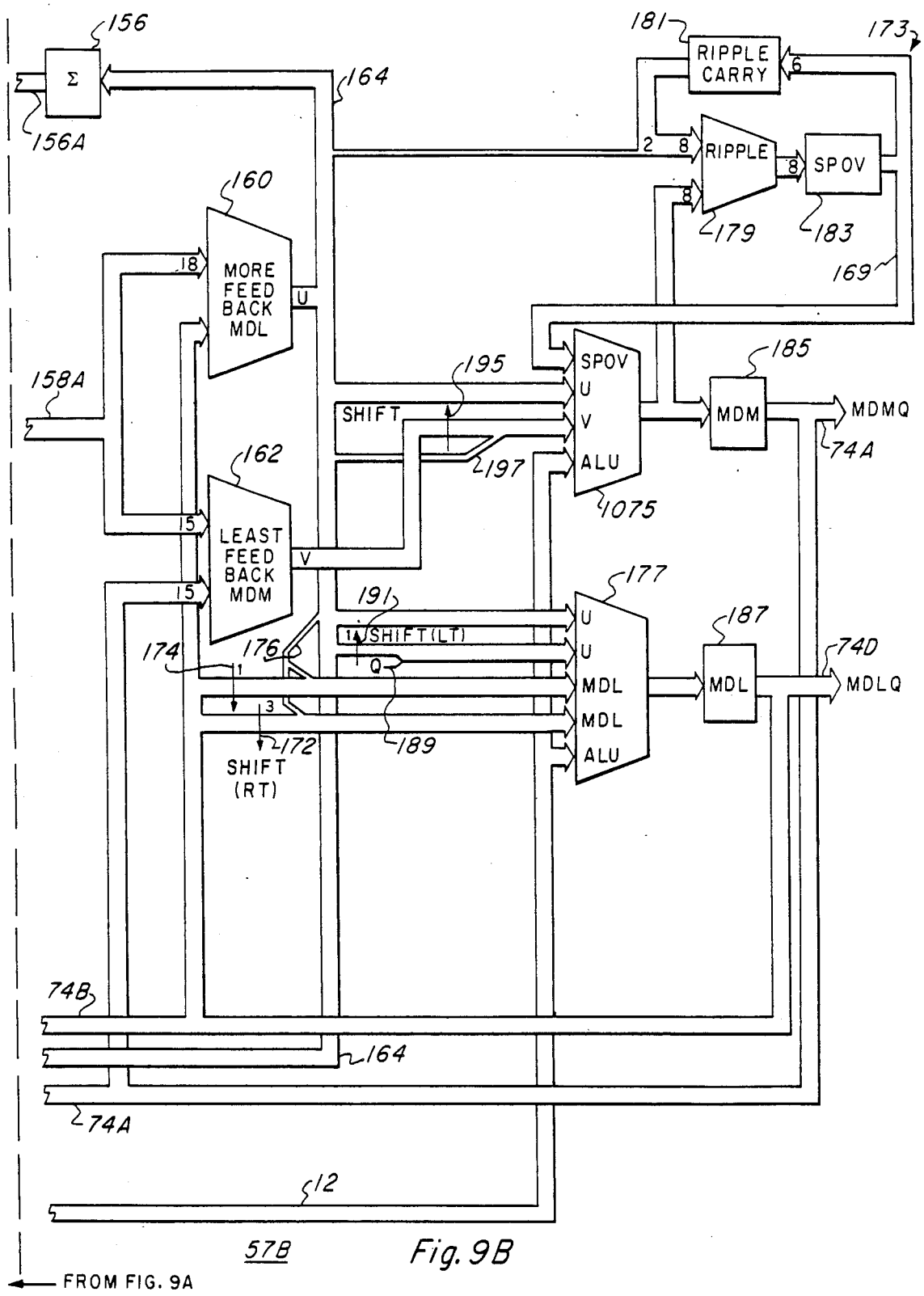

In FIG. 9, there is illustrated a block diagram of the multiply/divide unit 57 in which the A output of the operand selector and the B output of the operand selector are applied to the multiply/divide unit 57 by data bus 32 and 34 respectively. The A output of the operand selector 53 is applied to a first selector 138 which provides both a Y output and a $\overline{Y}$ output, the output of which is applied to a Y.$\overline{Y}$ selector 140. The Y to the first selector 138 is the output of an A register 143 which provides for the shifting of the three most significant bits out of the data word at point 193. The output of the Y.$\overline{Y}$ selector 140 is applied to an A register 142 for application to the third selector 152. As will be discussed later, the multiply/divide circuit of FIG. 9 implements a Booth's algorithm for performing the multiplication and addition. This algorithm, as traditionally implemented, requires the shifting of the data bits that are contained within the data word that comprises the multiplicand, either towards the least significant side, referred to herein as the right side, or the most significant side, referred to herein as the left side. As part of the implementation of the Booth's algorithm, a recorder 199 recodes the data word that is on the output of the A register 142 into a select code and applies it to a preselector 150. Depending on the output of the recorder 199, a B selector 150 selects either the B output, which is defined as B side from the operand selector 153 as applied to a second selector 144, and provides to a B complement register 146 either the B or the $\overline{B}$. The B is defined as the most significant output of the multiply/divider and is present on the data bus 74A and is fed back to the input of the second selector 144. The selector 150 may also select the 2B output which is defined as 1 bit shift left at point 178 of the B output or the 2B output which is defined as a 1 shift to the left of the $\overline{B}$ output; or a 3B output and its complement as provided by register 148. The 3B output and its complement is the output signal that is present on data bus 164 which will be defined later but is applied to the 3B, 3B register 148 for application to the B selector 150. The B selector 150 can either select additionally the 4B which is defined as the B output of register 146 after being shifted two bits to the left at bit shift point 182, or the 4B output which at point 184 is a 2 bit left shift and is applied to the $\overline{B}$ output of the register 146. The output of the B selector 150 is applied to a fourth selector 154 which selects either its output on data bus 74A which is the most significant side of the multiply/divide output, or a zero bias signal that is present at 186, or the output of the B selector 150 for application to an 18 bit adder 158. The 18 bit adder 158 sums the output of the fourth selector 154 with the output of a third selector 152. The third selector 152, of course, represents the A side of the operand selector, and the fourth selector represents the B side of the operand selector. The third selector provides either the A output of the A register 142, the B output of the B, $\overline{B}$ register 146; the output of the low side of the multiply/divider that is present on data bus 74B; a zero bias as provided at zero bias 186, or the output from the summation register 156 which is the output of the more feedback selector 160, which either selects the output of the 18 bit adder 158 or the output of the least significant side of the multiply/divider that is present on data point 74B for application back to the third selector 152 via a summation register 156.

The output of the 18 bit adder 158 is applied to a more feedback selector 160 and a least feedback selector 162. The more feedback selector 160 selects either the output from the least significant side of the multiply/divide circuit that is present on data bus 74B or the output of the 18 bit adder 178 for application to the summing register 156, the more selector 175 or the 3B/3B register 148. The output of the least feedback selector 162 selects either the output form the most significant side of the multiply/divide circuit of the output of the 18 bit adder for application to the more selector 1075, after being shifted to the left one bit at point 195 and combined with a bit by the combining circuit 197 which combines a single bit from the more feedback selector 160 output as is present on conductor 164 with the output of the least feedback selector 162 after being shifted one bit to the left at point 195. The more selector 1075 selects one of four outputs for application to the MDM register 185 which holds on data bus 74A the most significant bits of the output of the multiply/divide unit 57. The selections include the output from a spillover circuit 188; the output from the more feedback selector 160; the output from the least feedback circuit 162 after being modified by a shift 195 and a combination 197 or the output from the temporary register 63 that is present on data bus 12 and applied to the more selector 1075. The least selector 177 selects one of five inputs for application to the MDL register 187 which holds the least significant data bits on data bus 74B. The output of the least selector 177 includes the output from the more feedback selector 160; the output from the more feedback selector 160 after being modified at point 191 by a one bit shift left, and combined with a logic zero at 189; a first least significant output that was shifted to the right at point 174 and combined with a bit from the more feedback selector 160 at point 176; and a second least significant feedback that has been shifted three bits to the right at point 172 and combined with three bits from the more feedback selector 160 via data bus 176 and also the output from the temporary register 63 which is supplied to the least significant selector 177. An overflow condition is indicated by a fault that is applied to the fault detector 173. The overflow condition is detected by a spillover circuit 188 which includes a selector 179 which selects two bits from the output of the more feedback circuits 160 and 1075 that are combined with the output of a ripple carry circuit 181 or the output from the more selector 175. The output of the ripple selector 179 is applied to a SPOV register 183 which will indicate via data bus 169 to a fault detector 173 the case of a spillover. A key factor circuit is completed by applying the outputs from SPOV register 183 to the ripple carry 181 and also to an input in the more selector 1075.

FIG. 10 is a block diagram of the memory address register 61 and the data I/O port 59. The initial instruction decoder 83c checks the data format to determine the mode of operation, either word or byte mode bit. When the byte mode bit is set by the process of program, the logical address is in a most significant memory register MARM 78 and in a least significant register 76 which is denoted as MARL as byte addresses and transactions with the data memory are performed with data bytes, rather than with data words. When the word/byte bit is reset, the logical address in the MARM register 78 and the MARL register 76 are used as 16 bit word addresses and transactions with the data memory are performed with 16 bit words. It should be noted that memory references are always in 16 bit words regardless of word or byte mode. But in the byte mode, only one byte is read or written from the address 16 bit word. The address is provided to the memory by a conductor 4 after being selected by an address mode selector 80 which selects one of four inputs for application to a three state buffer 82 which connects the selective address to an external memory of FIG. 1 via data bus 4. It should be noted that data bus 4 is a 16 bit conductor.

When in the byte mode, since the values in MARM and MARL represent a byte address, the output address must be effectively shifted 1 bit to the right so as to represent a word address. This is done by the B inputs to the address mode selector 80. MARM is output using only the most significant 15 bits of Buss 32. The least significant bit of MARM becomes the most significant bit of MARL, with MARL being shifted one bit to the right. The least significant bit of MARL is used in conjunction of the byte selector 94 and 88 to control the I/O at the proper byte.

The address mode selector 80, of course, is controlled by the word/byte signal, a conductor that is part of data bundle 46.

The data I/O port interfaces data to the high speed processor 10 by a data bus 6. For incoming data, a Schmitt trigger input 92 filters the data and applies it of a byte selector 94 as well as to an AND gate 95 that is controlled by the word byte signal 46. The byte selector selects either a first or second byte whereas the AND gate 95 passes a byte through to create the total data bits that are present on data bundle 86 and is applied to the operand selector 53 of FIG. 1. The output is applied by the output of the operand selector 53 via data bundle 32 to a byte selector 88 that is controlled by the word/byte signal that is decoded by the initial decoder 83c and to a three state buffer 86 for application to the data bus 6 and the attached peripherals that are illustrated within FIG. 1.

Figure 11:
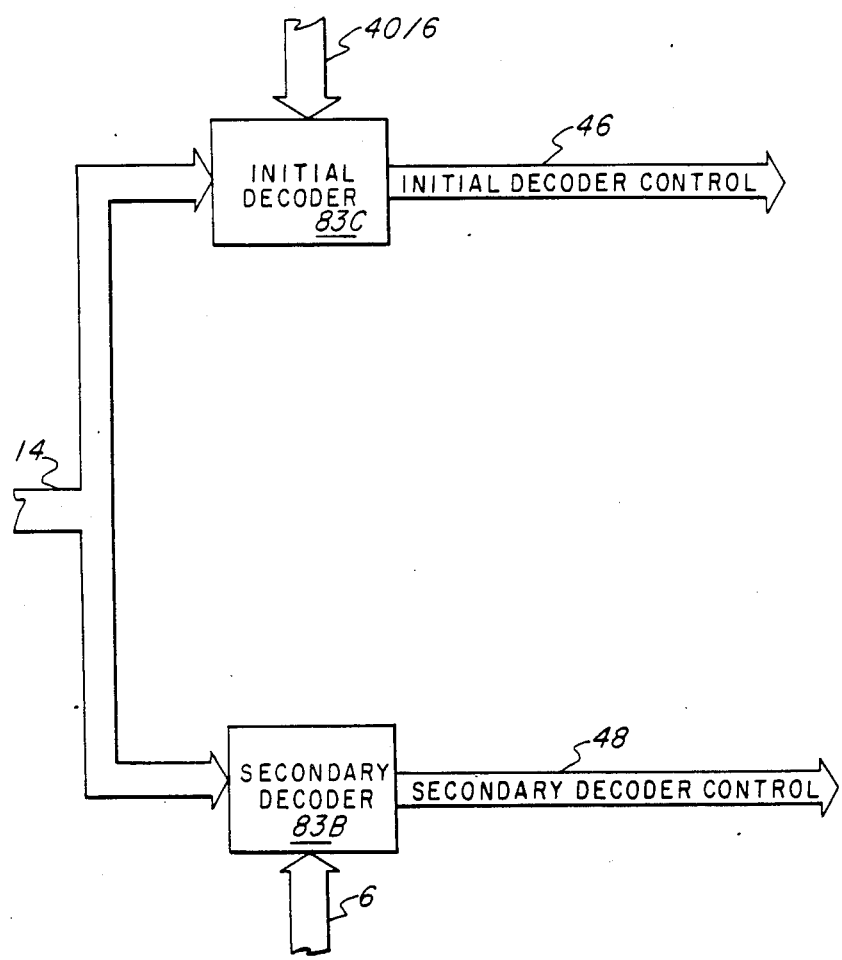
FIG. 11 is a block diagram of the two sections of the instruction decode logic of FIG. 2.

FIG. 11 is a block diagram of the initial decoder array 83c and a secondary decoder 83b. The decoders are decoding arrays which decode the instruction words for the appropriate signals and applies them to the output data busses 46 and 48 respectively. The status bits and control bits are applied via data bus 40 and 6 to the initial decoder 83c and control bits are applied to the secondary decoder 83b.

The picosequencer logic 83a is a state machine that upon given commands performs as stated operations, therefore FIG. 12 is a state diagram of the state machine that comprises the picosequencer logic 83a.

The picosequencer logic generates sequences necessary to implement three sequences of logic plus a calibrate logic. These include the hold sequence, the CONSTANT and GOSUB sequence, and the RETURNS, RETURN and LOAD-IN sequence. The end block follows the calibrate sequence which is executed at state 0 indicated in FIG. 12 at 319 and provides the capabilities of implementing the calibration of self time oscillators. This embodiment, although not shown implemented in the embodiment of FIGS. 1 and 2, enables the high speed processor 10 to be used with complex communication systems which require accurate timekeeping capabilities and thus periodic calibration of the self time oscillators used to generate the time keeping function is required and is calibrated during the sequence represented by block 319; following block 319 the sequence ends at end point 311.

The next path that is used is the hold sequence is utilized in bus arbitration and is represented in the pin assignments contained within Table III as a request and is asserted when the high speed processor 10 is waiting for access to the data memory address phase. During this period of time the picosequencer logic 83a will read the scratchpad memory at block 301 and will refresh the scratchpad memory at block 303 by writing into the scratchpad memory and increment the refresh counter; the sequencer next goes to decision block 305 where it loops until the "grant release" signal is asserted so that the high speed processor 10 may have access to the data bus for the data memory addressed space. Following the receipt of the "grant release" signal, the picosequencer proceeds via line 309 to the end block 311.

The picosequencer additionally is called upon to provide the logic states for handling of two word instructions. These include the CONSTANT, the GOSUB, and the RETURN RS, RETURN, and the load instruction word instructions. The GOSUB or called subroutine instruction and the constant instruction which means load a scratchpad memory with a constant, essentially is implemented at block 313 by addressing the program counter and progressing to the wait block 323 until the instruction ready signal referred to in FIG. 3 is received. Additionally, for the return from a subroutine instruction and also the RETURN RS which means to restore status, and the load instruction word instructions are initiated at block 317 where the picosequencer logic causes the high speed processor 10 to wait until the I-READY signal is received at block 323 and the program counter at block 321 is loaded with the contents from a scratchpad memory. Simultaneously with the execution of the sequence that begins with block 313 or 317, a request for an instruction word is generated at block 315. The picosequencer 83A proceeds to wait for the instruction ready signal at block 323, as illustrated by waveform 147 of FIG. 3. For the path that begins with the arrow 337, the picosequencer 83A causes the high speed processor 10 to proceed to state number 9 at block 339 which requires the loading of the program counter at 339. At state number 10 the microprocessor 10 waits for the I-READY signal that is represented by Waveform 147 of FIG. 3. This occurs at block 341. The results are loaded at block 342, state 11, and the high speed processor 10 proceeds to state 14 at block 333 and outputs a new value for the program counter, then proceeds to the end block 311. Line 335 is taken for the GOSUB instructions, the read instructions and the constant instructions. For the read instruction words and the constant command line 329 is taken where at block 332, state 12, the program count adder, PC adder 119 of FIG. 4 is loaded into the program counter. In which case the picosequencer proceeds to state 14 at block 333. For GOSUB routines at state 8 the vectors are implemented at block 331, a new value for the program counter is output at block 333, and then at block 343, state 15, the program counter address is latched in and the high speed processor proceeds to state end.

Figure 13:
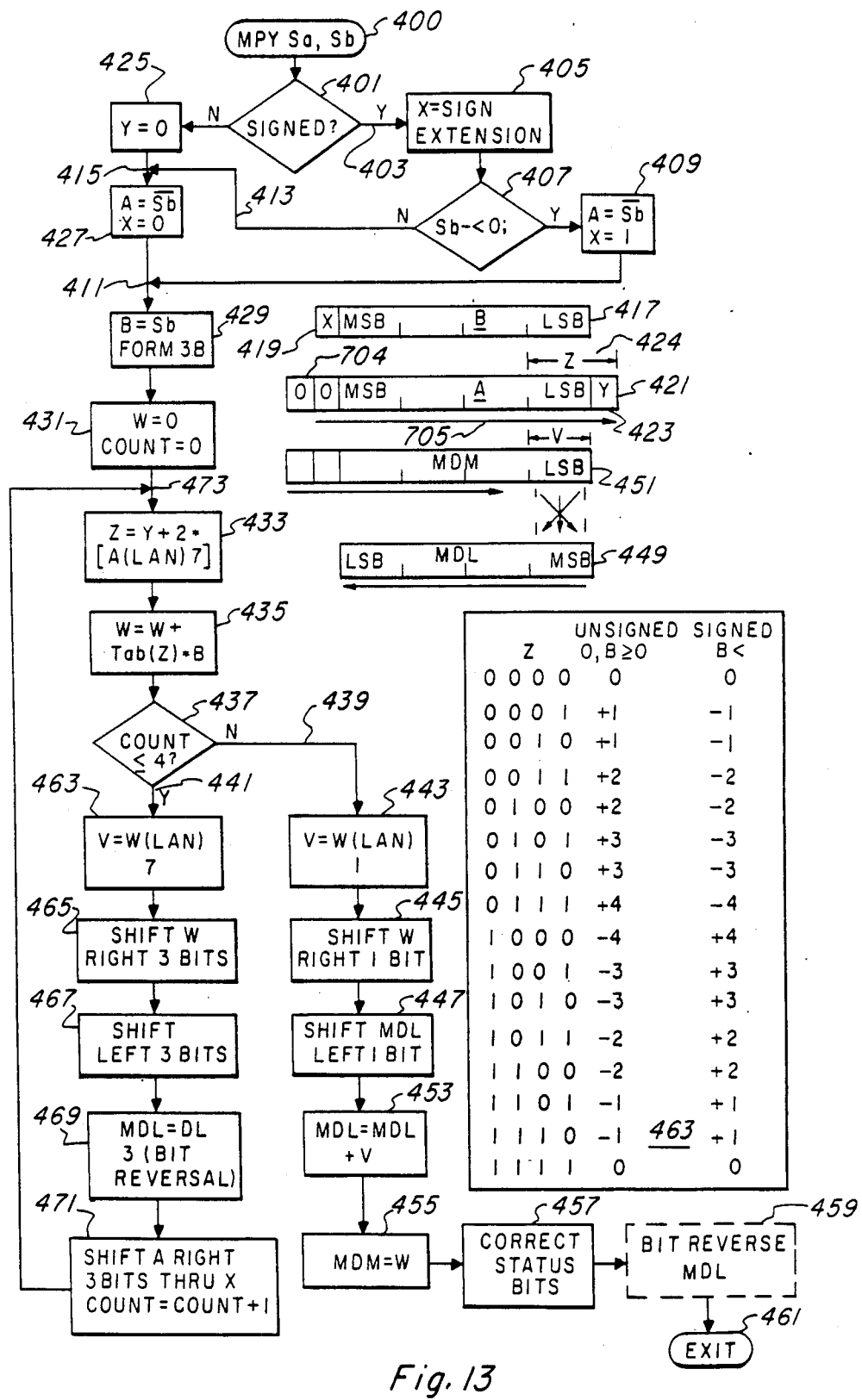
FIG. 13 is a flow diagram of the multiply operation of the multiply/divide circuit according to the invention.

In FIG. 13, to which reference should now be made, there is shown a flow diagram of the multiply operation and reference should be made in conjunction with the block diagram of FIG. 9 of the multiply/divide unit 57 and additionally reference to FIG. 2 is deemed to be helpful. Upon entry to a multiply or a multiply/add operation, two 16 bit words as in the embodiment of FIG. 13, are presented in parallel to the multiply/divide hardware to the data bus 32 and 34 of FIG. 9, (assuming the multiply/divide logic 57 is idle). At that time the multiply/divide unit 57 is marked as busy and acquires the two operands. At block 400 the multiply/divide unit is instructed to multiply the contents of the scratchpad A memory 75 with the contents of the scratchpad B memory 77. Argument A on data bus 32 is applied via the multiplexer 152 of FIG. 9 to the A port of the, embodiment of FIG. 9, 18 bit adder 158. The multiplexer 152 can select either the argument from the scratchpad A memory 75, the scratchpad B memory 77, or the output of the MDL register 187 which is applied to the A port or the output of the 18 bit adder 154 which is from the scratchpad B memory 77 or the output of the MDM register. At block 401 a determination is made to see if the operation is to be signed or unsigned. If signed, then line 403 is taken to implement the function of X is set equal to sign extension at block 405. Block 407 checks to see if the contents of the scratchpad B memory 77 is greater than zero. If the answer is greater than zero, then block 409 is implemented which says B equals to the complement of the contents of the scratchpad B memory 77 that is applied via data bus 34 to the multiply/divide unit 57. Y data bits 421 is set equal to a logic 1 and the unit at point 411 rejoins the multiply operation as if it were an unsigned operation. If at decision block 407 the contents of the scratchpad B memory 177, Sb, is less than zero, then line 413 is taken to point 415 where the unsigned operation is indicated. The data word in the embodiment of FIG. 9 is represented by block 2, 9 and 13 diagram 417 for the contents out of the B register which with the most significant bit at point 419 being the aforementioned extended signed bit. Similarly, the output of the scratchpad A memory as applied on data bus 32 is represented by block diagram 421 which shows the Y bit at point 423. The values of the X bits and the Y bits are helpful in implementing the multiply/divide operation and in particular, the Booth algorithm. Returning to block 400, and in particular to block 401 when there is an unsigned operation, then the "no" line is taken to block 425 where the Y bit at 419 is set to zero and the B wordform represented by wordform 421 is set to equal the contents of the scratchpad A memory 77 and the Y bit 423 is set equal to zero at block 427.

In form B word 419 the value 3B is formed by presenting to the B port of the adder 158 the value B and to the A port of the adder the value 2B which is B shifted left one bit. The carry in to the adder is zero. The output of the adder is 3B and is sent to a temporary holding register 148 which is part of the steps represented by node 402 of FIG. 14. Also note that the complement of 3B can be stored also.

Both signed and unsigned operations are the same as block 429 where the A word 424 is set equal to the contents of the scratchpad A memory in the form just described. At block 431 W which is represented by word diagram 451 is set equal to zero, as well as count which represents the number of iterations that the multiply unit must implement to perform the multiplication and in the case of the multiply algorithm there are essentially six add cycles to implement the basic multiply operation. At block 431 when the operation is simply multiply and not multiply/add, then W is set equal to zero and the MDM register 185 and the MDL register 187 as well as the spillover register 183 are set to zero. In the embodiment discussed, there is a 3 bit Booth algorithm which requires the evaluation of 3B for later use. This means that B must be gated to one adder input and 2B gated to the other adder input. The adder, 158 output which is 18 bits, is stored into a set of latches or holding registers for later use, 156, and 148 of FIG. 9. Two B is is defined as the value B shifted left one bit which is implemented by hardware at point 78 as indicated in FIG. 9. This of course is handled by the bussing of the data bits during the chip layout. The routing is an 18 bit B which is a 16 bit data word that is applied by data bus 34 and two bit signed extension and is routed into the A port of the 18 bit adder 158; an 18 bit 2B (B shifted left one bit and a low order 0 that is provided at point 186 of FIG. 9 with a one bit sign extension is applied into the B port of the 18 bit adder; the 18 bit output of the adder 158 is stored in the latches 148 which is named of course 3B.

Figure 14A:
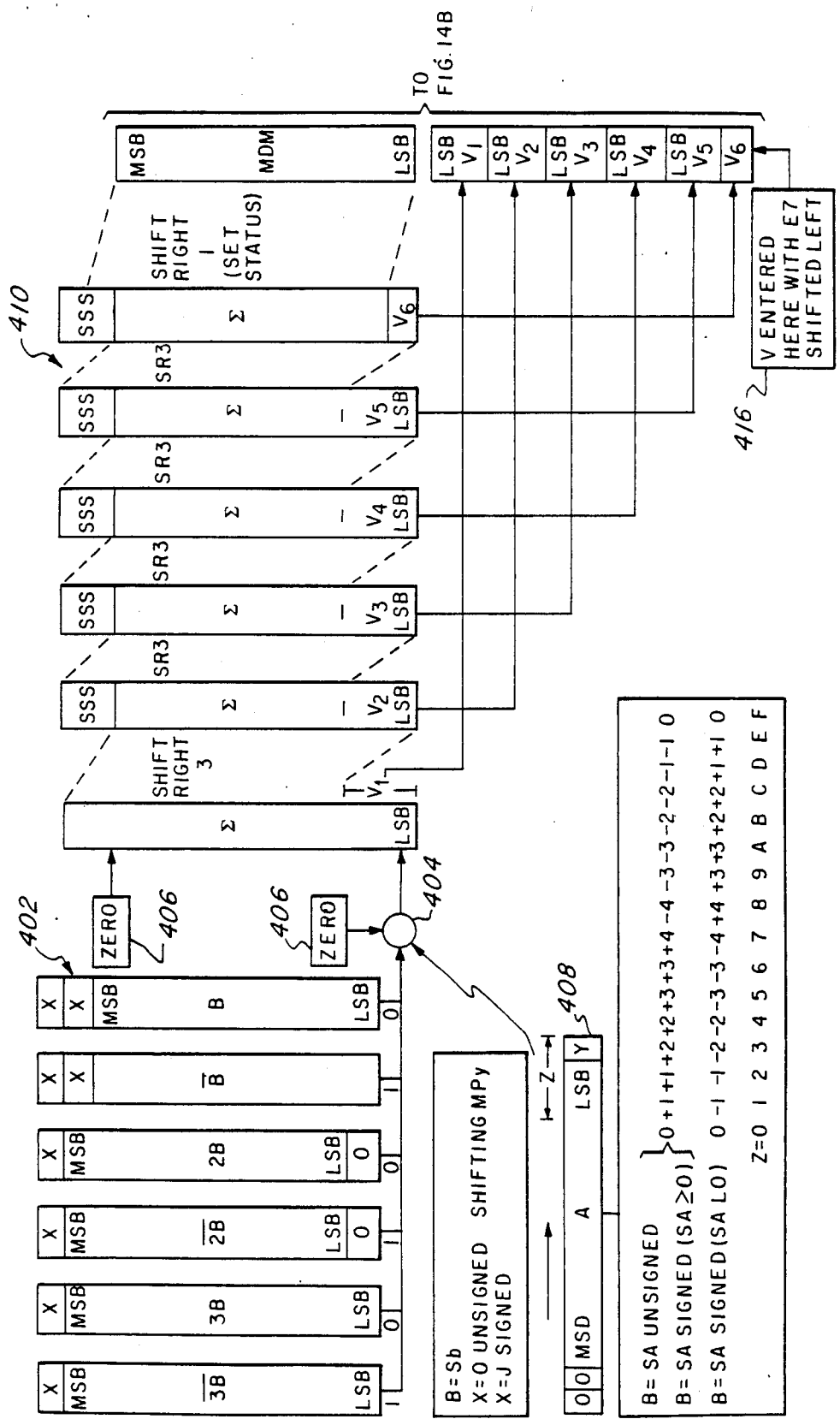
FIG. 14 is a logical block diagram of the multiply operation according to the invention.

For the embodiment of FIGS. 9,13 and 14, a 3 bit Booth algorithm is implemented using the following multiples of B which are applied to the B port of the 18 bit adder. Zero, i.e. .186; + or −1, 18 bits B with 2 bits sign extension; + or −2, 18 bits B shifted left one and a low order zero with one bit sign extension; + or −3 18 bits of B shifted left one bit; and + or −4 which is 18 bits which is B shifted left two with two low order zero bits added thereto. The negative factors are implemented in several ways. Primary way, of course, is use two's complement into the 18 bit adder 158 by presenting the true values of B, 2B, 3B, or 4B to the B port of the adder 158 and changing the operation to a subtract, or by supplying a minus KB where K is equal to 1,2,3, or 4 to the B port of the adder 158 by taking the one's complement of plus KB using inverters and setting the B carry in to a one which is normally a zero, being performing an addition. In the embodiment of FIG. 10, however, the two's complement method was implemented. The argument A becomes a 19 bit value by adding a low order bit called Y 423 of word form 421 and becomes a residue bit in the Booth algorithm and adding two high order zero bits at plus 4. If sign multiply or multiply/add and A is negative, A must be inverted. The following rules are for unsigned multiply and multiply/add operation minus Y equals zero with the use of the true 16 bit output of A which is previously defined. For sign multiply or multiply/add operation, if A is greater than or equal to zero, then 2A is used with Y equal to zero and in the case where A is less than zero, then inverted A (16 bits) is used and Y is equal to 1 or the two's complement of A (16 bits) then Y is equal to zero. Table 463 provides the truth table for the four low order bits represented by Z area 424 in the operation discussed above. The Z bits are continually shifted in the direction as indicated by arrow 705 until all the iterations have been performed an all 16 bits have been shifted past the least significant bit as represented in wordform 421. The initial input to the A port of the adder 158 is the contents of the MDL register 187 with two bits being zeros to obtain the 18 bit value. On subsequent passes the A port will be the previous adder output of the 18 bit adder 158 that has been shifted right 3 bits, one for the last multiply cycle. The input to the B port was discussed above. The adder 158 in the embodiment shown in FIG. 9 must be capable of forming a 19 or more bit result. The output of the adder 158 is represented by two fields, the low bits which are the complementary products that must be placed in correct bits area of the MDL register 187. There are 3 zero bits except for the last bit on the last iteration at which time it is a 1 bit, that goes into the MDL register 187. First the lowest bits 13 through -are the least significant bit, the next three 10 to 12 become the second most significant bit, the next three become the third which is the 7 through 9 most significant bits, the fourth which is the next three which is bits 4 through 6, the fifth which is the next three is 1 through 3 and the sixth iteration is the next one with a zero equal to the most significant bit. The remaining bits the next input are the A port of the adder 158 after being shifted right 3 bits. This is done by bus routing as indicated at point 167 of FIG. 9. Of course the final shift is one bit and not three bits being 3 into 16 is equal to 5 plus 1. (Special Note: The adder 158 in the embodiment shown must have at least 18 bits plus carry out or borrow indication.) In the multiply operation the low order 16 adder output bits after the shift right of one bit are gated directly into the MDM register 185 and the next add cycle omitted. For multiply operation the spillover bits are set equal to zero for unsigned and to the sign bits for sign operation.

The operation of these functions is indicated beginning with point 473 of FIG. 13. In particular at block 433 is set to the Y plus 2 times the B (LAN) 7 which is the value Z (424). At block 435 the W word represented by 451 is set equal to W plus table value of Z 424 times the contents of the A register. At decision block 437 the count is checked for being 4 or less. If less than or equal to four, line 439 is taken and if greater than 4, line 441 is taken. Taking line 441 V field 452 is equal to W times (LAN) 1 at block 443 at block 445, the contents of the W register is shifted right one bit. At block 447, the contents of the MDL register 18 that is represented by block diagram 449 is shifted left one bit. At block 453 the MDL register 187 is equal to the contents of the MDL register 187 plus V and at block 455 the contents of the temporary register 61 is loaded with the contents of W and at block 457 the status bits are corrected and block 459 the bit reverses the contents of MDL register 187 is implemented and an exit occurs at block 461. Up until the count is equal to 4, V field 452 is equal to W times (LAN) times 7 at block 463 and the contents of the W register 451 is shifted right three bits at block 465. The function of shifting the MDL register 187 to the left three bits is implemented at block 467 and MDL register 187 is set equal to MDL register 189 plus V (3 bit reversal) at block 469 and at block 471 the contents is shifted right three bits through Y 424 and the count is incremented by one and the multiply circuit 57 moves back to tie point 473. For multiply, the field Z 424 is used to "select" which value of + nA goes to the B port of the adder (404 on FIG. 14). This is the purpose of Table 463 on FIG. 13. It is possible to keep from doing the 3 bits reversal at 469 to gate the 3 bits directly to the correct position in "MDL" so that the 16 bit reversal at 459 is not required. There are 7 adder cycles required, one to form 3A and 16/3=6 for the multiply. If one uses dual adders, then 4 cycles is only required. However, if only one adder is used, 7 cycles are required.

The flow diagram in FIG. 13 and the logic diagram in FIG. 9 can be more readily understood when used in conjunction with FIG. 14. The multiplexer 150 is implemented by blocks 482 and the multiplexing that occurs with blocks 154, 152 and 158 is implemented at the summing device 404 of FIG. 14 which shows the zero 406 and the A register 408 being applied to the correct value from 402 to the adder select.

The sum and shift right is performed by summing devices 175 and 177 which operation is indicated by the blocks 410 and the output is stored in the temporary registers 185 and 187 at blocks 412. The V entered with MDL register 181 is provided as well as the entended range through the spillover register that is indicated by Block 188 of the FIG. 9 is illustrated by blocks 412. V entered is uni direction for both multiply and divide.

Figure 15:
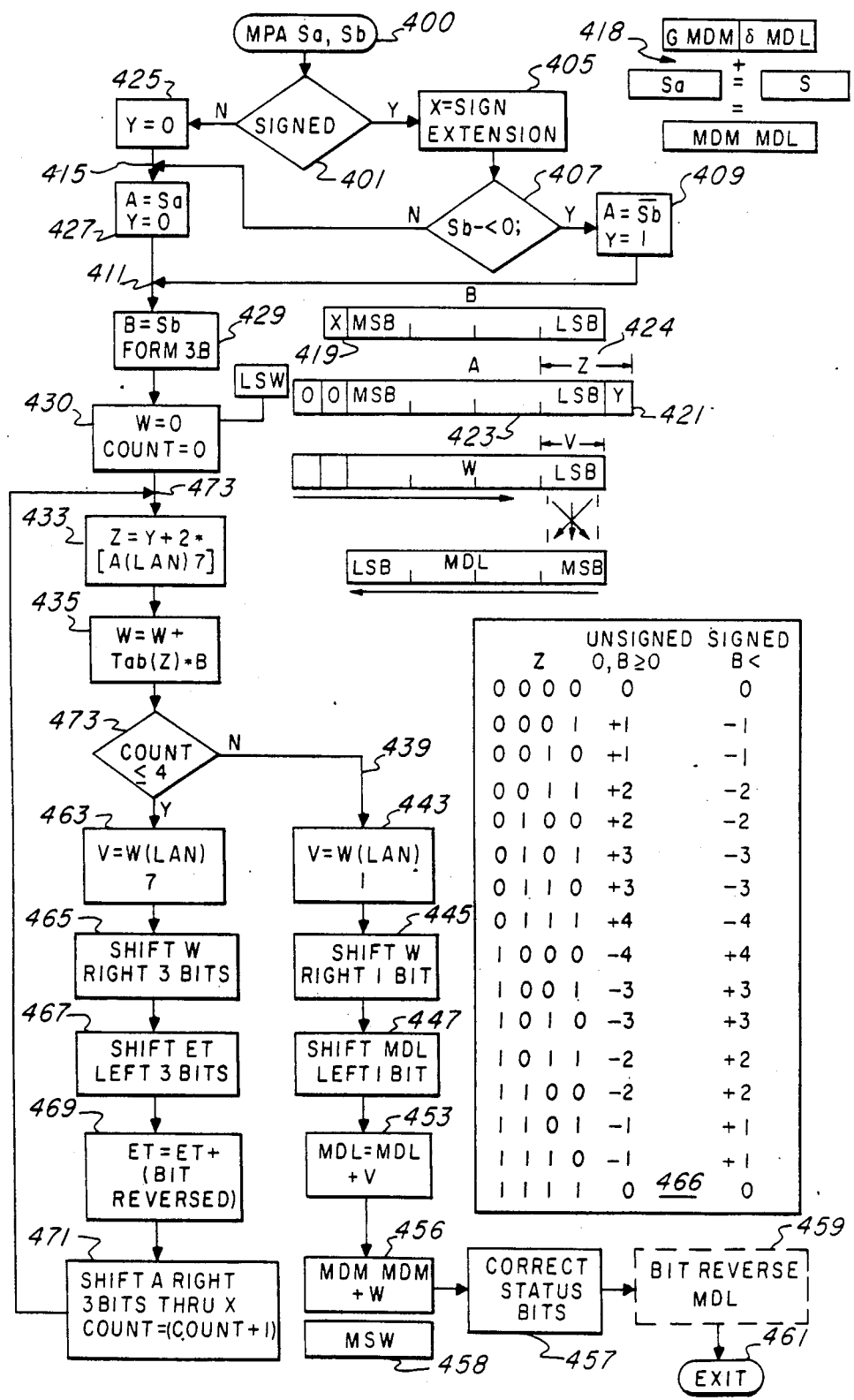
FIG. 15 is a flow diagram of the mutiply/divide operation of the multiply divider according to the invention.

FIG. 15 is very similar to FIG. 13 with the exception that an add operation is additionally provided on the system.

FIG. 15 is a flow diagram of the Boothe multiply and add algorithm which has one more add cycle than the Booth multiply algorithm and the block diagrams are the same with the exception in FIG. 13 block 431 has been replace with block 430 which sets W equal to MDL and the count is equal to zero. Z in both figures is represented as a portion of the A word and is represented by dimension lines 424. It should be noted additionally that block 455 in which the temporary register is stored with W is replaced by the temporary register equal to the MDM register 185 plus W at 456, which is also MSW in MDM register 185. The truth table 463 in FIG. 13 has been replaced by truth table 466 in FIG. 15. Three bits reversed are entered into low end of MDL for shift left (except only one bit and shift one on last MPY iteration.) The final MDL register is bit reversed at 414. However, it is possible to gate V bits directly into MDL without any shifting if one is willing to build in the paths. As 414 shows in FIG. 14, the last bit is MSB and the LSB is in the opposite end.

Figure 16A:
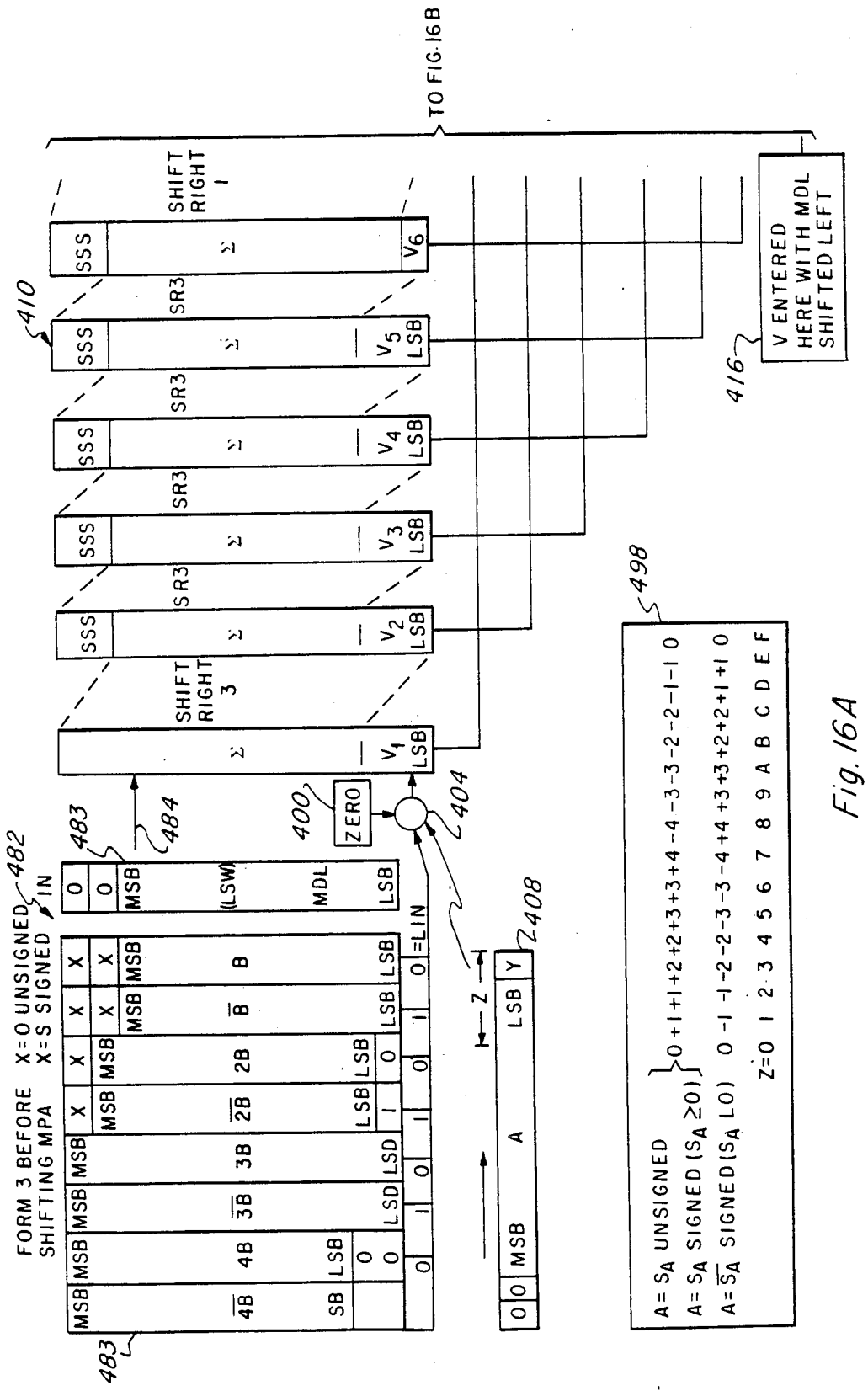
FIG. 16 is a logic block diagram of the multiply add operation according to the invention.
Figure 16B:
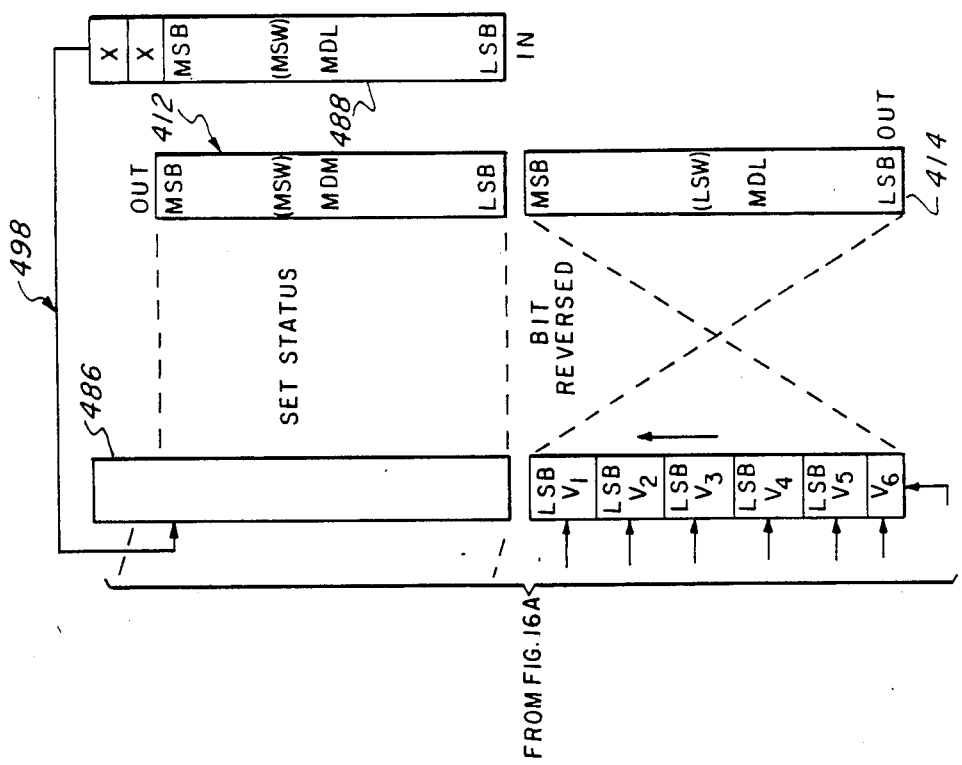

FIG. 16, to which reference should now be made due to the fact block 430 of FIG. 15 provides for loading the W register with MDL, the controls of MDL register 187, and also setting the MDM register 183 equal to the temporary register plus W at block 458. These functions are implemented by the addition of summing of 483 at block area 482 plus rather than zero being added to the sum of shift blocks 410 the output of MDL is applied to the summing block at line 484. Block MDL is represented by 483. The summing of the temporary register plus W represented by block 456 is represented by feedback line 490 connected to summing register 486 from the temporary register 488. This is represented, of course, in FIG. 9 by the operation of the output of the MDM register 185 and the MDL register 187 being applied back into the summing devices 154 and 152 to obtain the function illustrated in block 456. The values for A in FIG. 14 is provided by block 497 and in FIG. 16 by block 498. The A register is represented by wordform 408 which is applied to the summing device 404 in FIG. 16. Excess of MSW 16 bits will go to spillover 183 FIG. 9 for fault detection 173.

Figure 17:
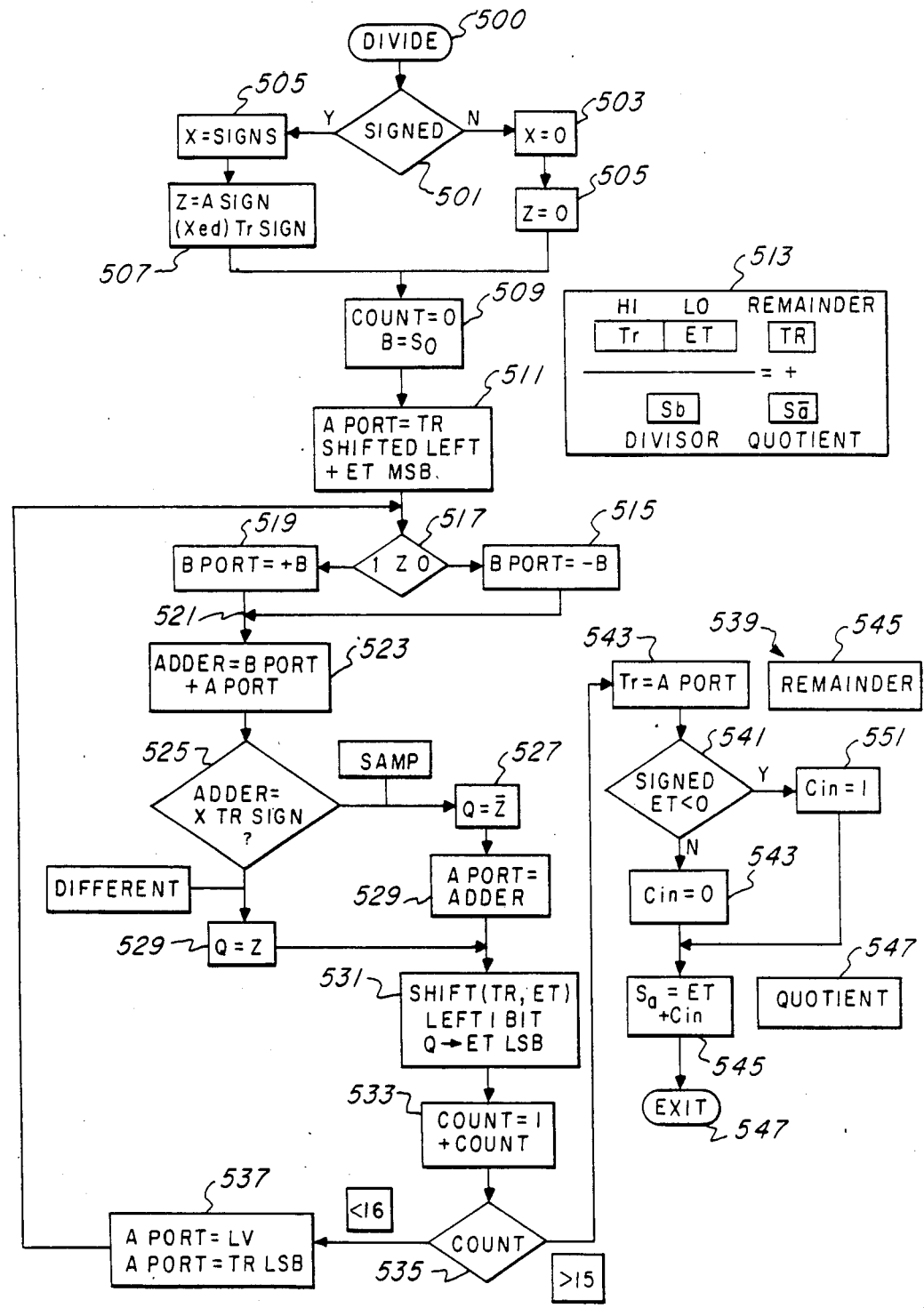
FIG. 17 is a flow diagram of the divide operation according to the invention.
Figure 18:
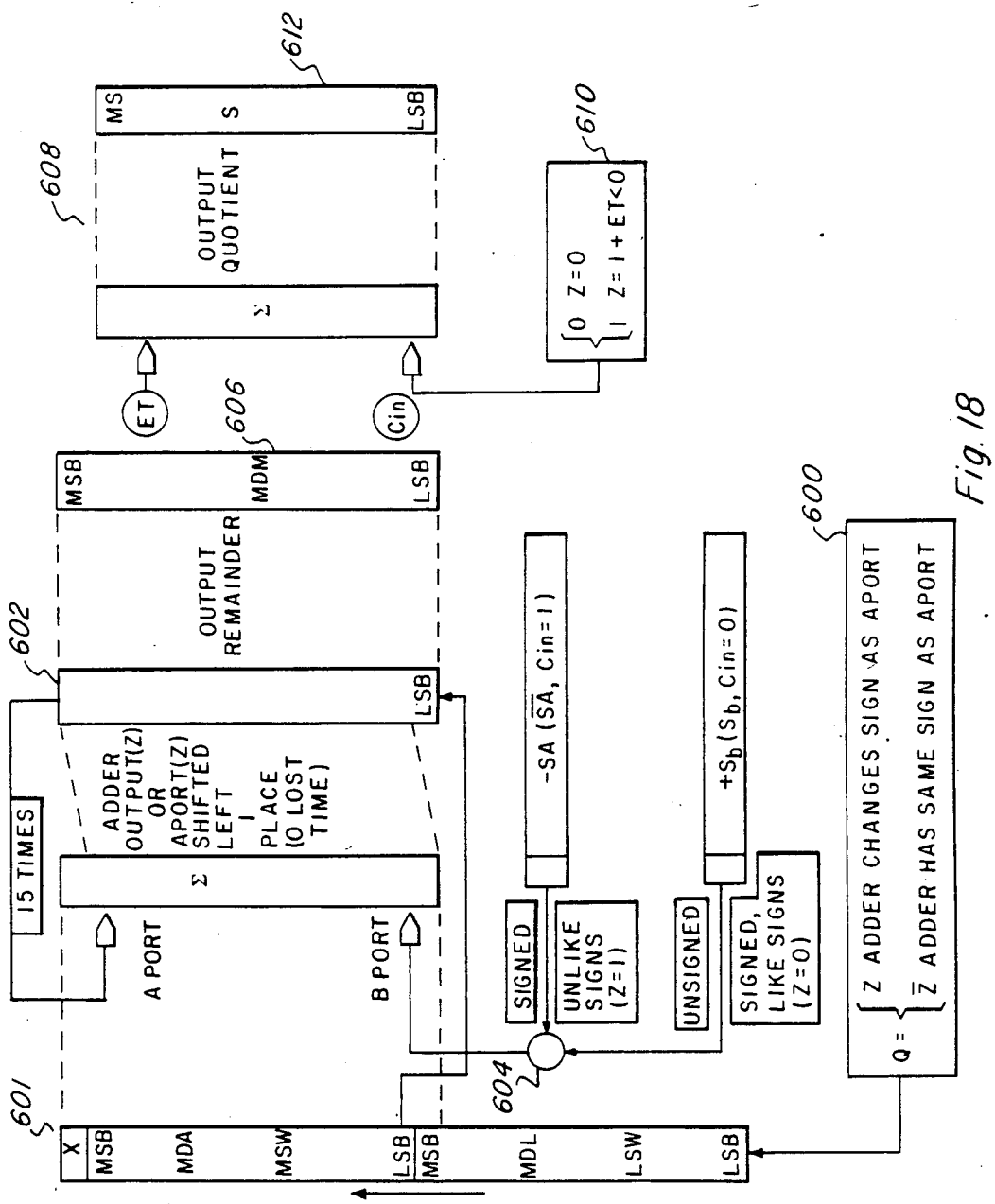
FIG. 18 is a logic block diagram of the divide operation according to the invention.

FIG. 17, to which reference should now be made, is a flow diagram illustrating the divide operation and FIG. 18 is a logical function diagram illustrating the divide operation of FIG. 17. FIGS. 9, 17 and 18 should be referred to simultaneously. The multiply/divider circuit upon entry to divide a 16 bit word, will be presented to the parallel multiply/divide circuit 57 from data bus 32. The argument A (divisor) from the bus that goes into data bus 32 or the A port of the arithmetic logic unit 55 is applied thereto from the scratch pad A or scratchpad B memories 75 and 77 respectively. If the arguement is zero, a signal fault is set by the fault detector 173 regardless of what the numerator may be. This means that a zero devisor will leave the MDM register 185 and the MDL register 187 and the SPOV register 183 intact. Thus, zero/zero will be a fault. The argument B (a numerator) is present in the 32 bit MD registers 185 and 187 along with the SPOV register 183 as the left extension of the MDM register 185. If the numerator is zero, the division is terminated. The quotient is zero (the contents of the MDL register 187) and the remainder is zero (the contents of the MDM register 185).

Sign multiply/divide status bit is examined to determine how to perform the left sign extensions on Argument A and Argument B at the left shifts of the adder 158 output. This occurs at decision block 501. If unsigned, signed extension will be zero at block 503 and if signed, signed extension will propagate the signed bit at block 505. The contents of the SPOV register 183 and the signed bits of the MDM register 185 and the arguement B are examined for possible faults. If the divisor is equal to zero, this is always a fault. If the numerator is equal to zero, the division will terminate and exit. If unsigned, the SPOV register is set equal to zero at block 504 and if the contents of the MDM register 185 is less than the divisor the divide is okay, but if the contents of the MDM register 185 is greater than or equal to the divisor, then a divide fault.

For signed divide operation with the contents of the SPOV register 183 are not all identical to the MDM register's sign, there is a divide fault. If the SPOV is in agreement with MDM's sign bit, then under these conditions, the nif contents of the MDM register 185 and the divisor signs are alike, thus the absolute value of two times the MDM is less than the absolute value of the divisor, then it is an okay operation. If the contents of the absolute value of two times the contents of the MDM register 185 is equal to or greater than the absolute value of the divisor, then there is a fault indicated by the fault detector 173. Additionally, if the contents of the MDM register 185 and the divisor signs are opposite, then the absolute value of two times the contents of the MDM register 185 is less than or equal to the absolute value of the divisor that's okay or if the absolute value of the MDM register 185 is greater than the absolute value of the divisor, there is a fault indication. It should be noted that two times the contents of the MDM register means shift left the contents of the MDM register 185 one bit and insert the most significant bit of the contents of the MDL register 187 into the vacant bit position. In case of fault, the rest of the divide operation can be aborted, leaving the contents of the MDM registers 185 and 187 intact and the status bit is set.

Z is defined as a divide fault insignificant bit for insertion into the quotient. A significant bit is the complement of Z. Unsigned Z equals zero. Signed Z is equal to the contents of the MDM register sign exclusive or with the divisor sign.

The divide operation disclosed in FIGS. 17 and 18 is a restoring type of divide. The restoring add cycle, however, is not performed but rather there is a direct path through the adder input of the 18 bit adder 185 and is gated around or straight through the adder as if these results were the adder output. Also, through the summer 156. The setting of the Z bit for the sign bit occurs at block 507. Count is set equal to zero at block 509 and B is equal to the output of the scratchpad B memory 185. The A port of the adder 185 uses the contents of the MDM register after the MD registers, the combination of MDM 185 and MDL 187, have been shifted left one bit. Other times the adder output, after it has been shifted left one bit places the most significant bit of the MDL register 187 into the vacant position and shift the MDL register 187 one bit to the left. This is implemented by loading the MDM register 185 with the contents of the A port at block 511. At block 517 a decision is made to see if Z is equal to Zero or one. If equal to zero, then at block 515 the B port of adder 158 is equal to a minus B. If Z is equal to 1, then the B port of adder F is equal with a plus B at block 519 and the loop comes together at node point 521. The adder V8 is loaded at block 523 and at decision block 525 a decision is made whether the sign of the adder is equal to the X sign that is stored in the temporary register. If it is the same, then Q at block 527 is set to a minus MDL, (the contents of the MDL register 187 is referred to as MDL). X, if different than Q is set equal to Z at block 529. Following setting Q equal to minus Z, the A port of adder 158 is equal to the contents of the adder 188 at block 529.

The divisor is substracted from the other values from the input of the adder. Substraction is done by two's complements and add with carry in equal to zero or using one's complement and add with carry in equal to one. Unsigned subtraction is performed by subtracting the true divisor from the A port of adder 158 value and for signed operation, the numerator sign is X.R with the divisor sign. Like operation for the sign operation is the subtraction of the true divisor; an unlike operation is subtraction of the two's complements divisor or add true divisor. The numerator's input sign is compared to the adder's output sign, which was discussed before block 525. This difference value Z will be inserted into the least significant bit of the MDL 187 and also what value to use as the adder output value is determined. If the same sign the least significant bit is equal to Z bar (use adder output) at block 525 and if different sign the least significant bit is equal to Z in block 528. The adder "output" is circulated back from 602 FIG. 18 to become the adder input to port A. (Use pass through or restored value) The contents of the MDL register 187 is then shifted left one bit except on the last cycle of the 16 bit cycle. The above steps are repeated as indicated at block 531 where the left bit shift the count is incremented at block 533 and if it is less than 16 at block 535 the A port of adder 158 again is loaded with the MDM register 185 times the A port of adder 158 plus the MDM register 185 in block 537.

Reaching a count of greater than 15 after 16 add cycles has been accomplished, the remainder is the answer. The answer is now gated with the output of the MDM register 187 and is carry/bar is applied to the SPOV register 183 as a final remainder. If the remainder is not zero, the contents of the SPOV register 183 and the MDM register 185 most significant bit should agree with the original sign bit of the numerator or else there is a fault indicated by the fault detector 173. One final add cycle at point 539 is implemented to fix up the quotient in the MDL register 187. If it is unsigned, this cycle is omitted at block 541 where the temporary register is stored with the contents of the A port at block 543 to obtain the remainder of block 545. If unsigned, one cycle is omitted so consequently the carry in at block 543 is set equal to zero and then the status scratchpad A register is loaded with ET plus the carry in at block 545 and exit from the divide operation at block 547. Notice that block 545 is the quotient indicated by block 549. If signed, then set the carry in to one at block 551 so that it may be added to the contents of MDL register 187 and loaded into the scratchpad A register at block 545. It should be noted that at this point the final quotient is now in the MDL register 187.

The upper add bits along with the carry out bits are placed in the spillover register 183. If the spillover register 183 is not all signed by a zero for unsigned and projected sign for signed, then the multiple/divide fault status is detected by the fault detector 173 and is flagged for and error. The projected sign for signed operation is the original numerator sign. The final contents of the SPOV register 183 and the MDM register 185 most significant bits are examined to see if they are alike or not. If unalike, there is a fault detected by the fault detector.

The multiply/divider 57 is idle until further operation. Any instructions that involve the multiply/divide section is inhibited. This section is already busy and a wait until idle before the new operation can resume.

Any arithmetic logic unit 55 referenced to the MDM register 185 or the MDL register 187 are another value for the multiply/multiply add or division operation will gate the correct value to the fault status output on conductor 175. Any corrective action must be taken by the software.

There is one instruction that is used when the multiply work or divide work is to be performed via software. This is SR MD,16 which is shift right of the full 32 bit MD register 185 16 bits. This performs the following operation:

1. The contents of the MDM register 185 is gated to the MDL register 187.

2. Copy the contents of the SPOV register 183 into the MDM register 185 using the sign extension rule previously discussed. Also included is the shift right or left of the MDM register 185 or the MD register 187. This uses the arithmetic logic unit shifter and are not part of the multiply/divide operation.

In the embodiment shown in FIG. 9, the MDM register 185 is a 16 bit register, the MDL register is a 16 bit register with shift left one bit capability. The divisor B is 16 bits, the bar is one complements of these which is obtained by gating 16 bit A through a set of inverters and setting the carry in to the A port of the adder 158. The SPOV register 183 may be either nibble or byte to catch a carry out for later use or to detect faults. This does not have to be a full adder, just a ripple through carry type borrowed from the subtract. Z is a minus bit that is used or its complements to insert into the least significant bit of the register 187 for quotient generation. The adder output is obtained by shifting left one or zero bits. Pass through path is optionally selected as the adder restore output. Division is an integral division. As such, division can overflow regardless of whether the operation is signed or unsigned. Therefore the fault detector 173 detects a fault. The division instruction requires a 16 add cycle. One final add cycle is required to complete the quotient for the division. Thus, for the total division 17 add cycles are distinct from the computer cycles because of the asynchronous operation of the multiply/divide operation.

In FIG. 18 at block 600, the two arguments to be added are applied to the MDM registers 185 and 187 which are represented by the block 601. The contents of the registers is some 16 times that area 602 after the contents of the SA register for signed operation or the SB register for unsigned operation are summed by summing device 604 and applied to the summing block 602 at the B port. The output remainder is stored in the temporary register block 606. If Z is equal to zero or Z is equal to one, then the output quotients are determined by summing block 608 with the summation being stored at block 612.

Having described the invention in connection with a specific embodiment thereof, it is to be understood that further modifications may now suggest themselves to those skilled in the art and it is intended to cover such modifications as fall with the scope of the appended claims.

TABLE I

REGISTER MNEMONICS

DB or MEM — 16-bit external data bus
IC — Iteration counter
IW — Instruction word
IT1 — Interval timers
IT2
MARM — More significant 16 bits of data memory address
MARL — Less significant 16 bits of data memory address
MD — Multiply/divide register
MDM — More significant 16 bits of MD
MDL — Less significant 16 bits of MD
PAGE — Scratchpad page register
PREC — Mutiprecision register
PTR — Pointer
TR — Temp register
TRM — More significant byte of TR

TABLE I-continued
REGISTER MNEMONICS
TRL — Less significant byte of TR

TABLE II
INSTRUCTION SUMMARY BY FUNCTION

This Table summarizes the instruction set of the High Speed Processor. The instructions are grouped by function (eg. ADD, SHIFT), and within these groups they are ordered by instruction format. The summary is given in the following form:
(MNEMONIC): Assembler mnemonic

- Op: Hexadecimal op. K indicates 2-word instruction. Description block defines use of second word.
- L/A: Indicates if instruction is logic or arithmetic mode dependent (dependent on bit 9 of status). Blank indicates instruction is independent of mode bit.
- St: Indicates which bits of the status register are updated by the instruction.
  - Z = Zero
  - C = Carry
  - V = Overflow
  - T = Test
- Ctl: Indicates which bits of the status register effect execution of the instruction.
- Func.: Basic function of operation.
- Desc: Further description of operation, if required.

Especially note the IO (I/O space select) bit and the BM (Byte mode select) bit in the Ctl section. These bits affect the results of the execution of an instruction if the data bus (DB) is an instruction operand. Refer back to an earlier section of this paragraph for a detail description of the effects.

ADD INSTRUCTIONS. Add instructions perform 2's complement addition of 16-bit numbers, with one exception:
* During multiple precision operations, the carry out of a 16-bit sub-sum becomes a carry in to the next sub-sum. Status bits are not valid until the end of the operation.

3-REGISTER ADD. The two instructions are identical with respect to source operands, but differ in result destination.
Op: 2zyx    Ax = By + Az
    6zyx    Bx = By + Az
L/A: Arith: St: ZCV: Ctl:
Func: Add contents of two scratchpad registers, store result in a third register.

2-REGISTER ADD. The 2-register add instructions use registers for one operand and the result. The other operand is implied in the instruction.
Op: 04zy    Az = Ay + DB
    05zy    Bz = Ay + DB
    0Czy    Az = By + DB
    0Dzy    Bz = By + DB
L/A: Arith: St: ZCV: Ctl: IO BM
Func: Add contents of a scratchpad registers and the data bus. Store the result in a second register.
Op: 44zy    Az = Ay + TR
    45zy    Bz = AY + TR
    4Czy    Az = By + TR
    4Dzy    Bz = By + TR
L/A: Arith: St.: ZCV: Ctl:
Func: Add contents of a scratchpad register and the temp reg. Store the result in a second register.

SINGLE-REGISTER ADD. Single-register add instructions use a single register in one operand. The destination is either the same register as the source operand or the temp register. The other operand is implied in the instruction.
Op: 00Cz    Az = Az + MDM
    00Dz    Az = Az + MDL
    08Cz    Bz = Bz + MDM
    08Dz    Bz = Bz + MDL
L/A: St: ZCV: Ctl:
Func: Add contents of a scratchpad register and a half of the multiply/divide register.
Op: 1A2z kkkk    Az = Az + kkkk
    1AAz kkkk    Bz = Bz + kkkk
L/A: Arith: St: ZCV: Ctl:
Func: Add contents of a scratchpad register to a 16-bit constant from the second word of the instruction.
Op: 017z    TR = Az + DB
    097z    TR = Bz + DB
L/A: Arith: St: ZCV: Ctl: IO BM
Func: Add contents of a scratchpad register and the data bus. Store the result in the T register.

IMPLICIT ADD. Implicit add instructions use the temp register as an operand and destination. The other operand is implied in the instruction.
Op: 1221    TR = TR + DB
L/A: St.: ZCV Ctl: IO BM
Func: Add contents of the temp register to the DB and store the result in the temp register.
Op: 122F    TR = TR + IC
L/A: St: ZCV: Ctl:
Func: Add contents of the temp register to the iteration counter and store the result in the temp register.

LOGICAL 'AND' INSTRUCTIONS. AND instructions perform bit-by-bit logical AND of corresponding bits in two 16-bit operands.
The Z status bit will be set if the result of the operation is zero. Otherwise the Z bit will be reset. The C and V status bits are reset.

3-REGISTER AND. The two instructions are identical with respect to source operands, but differ in result destination.
Op: 2zyx    Ax = By AND Az
    6ztx    Bx = By AND Az
L/A: Logic: St: ZCV: Ctl:
Func: AND contents of two scratchpad registers, store result in a third register.

2-REGISTER AND. The 2-register AND instructions use registers for one operand and the result. The other operand is implied in the instruction.
Op: 04zy    Az = Ay AND DB
    05zy    Bx = Ay AND DB
    0Czy    Az = By AND DB
    0Dzy    Bz = By AND DB
L/A: Logic: St: ZCV: Ctl: IO BM
Func: AND contents of a scratchpad registers and the data bus. Store the result in a second register.
Op: 44zy    Az = AY AND TR
    45zy    Bz = Ay AND TR
    4Czy    Az = By AND TR
    4Dzy    Bz = By AND TR
L/A: Logic: St: ZCV Ctl:
Func: AND contents of a scratchpad register and the temp reg. Store the result in a second register.

SINGLE-REGISTER AND. Single-register AND instructions use a single register as one operand. The destination is either the same register as the source operand or the temp register. The other operand is implied in the instruction.
Op: 1A2z kkkk    Az = Az AND kkkk
    1AAz kkkk    Bz = Bz AND kkkk
L/A: Logic: St: ZCV Ctl:
Func. AND contents of a scratchpad register to a 16-bit constant from the second word of the instruction.
Op: 017z    TR = Az AND DB
    097z    TR = Bz AND DB
L/A: Logic: St: ZCV Ctl: IO BM
Func: Add content a of a scratchpad register and the data bus. Store the result in the T register.

BIT MANIPULATION INSTRUCTIONS. The bit manipulation instructions provide the means for setting, resetting, and testing individual bits in scratchpad and discrete processor registers.

SCRATCHPAD BIT INSTRUCTIONS.
Op: 14zy    SBIT Az(y)
    15zy    RBIT Az(y)
    1Czy    SBIT Bz(y)
    1Dzy    RBIT Bz(y)
L/A: st: Ctl:
Func: Set or Reset bit 'y' of the indicated scratchpad register.
Op: 16zy    TBIT Az (y)
    1Ezy    TBIT Bz (y)
L/A: St: T Ctl:
Func: Test bit 'y' of the indicated scratchpad register. Copy

TABLE II-continued
INSTRUCTION SUMMARY BY FUNCTION the state of the tested bit to the T status bit.
Op: 118z      TR = SBIT(DB,z)
     119z      TR = SBIT(MARL,z)
     11Az      SBIT ST(z)
     11Bz      SBIT TR(z)
     11Cz      SBIT IC(z)
     11Dz      SBIT PTR(z)
     11Ez      SBIT MDM(z)
     11Fz      SBIT MDL(z)
     198z      TR = RBIT(DB,z)
     199z      TR = RBIT(MARL,z)
     19Az      RBIT ST(z)
     19Bz      RBIT TR(z)
     19Cz      RBIT IC(z)
     19Dz      RBIT PTR(z)
     19Ez      RBIT MDM(z)
     19Fz      RBIT MDL(z)
L/A: St: Ctl: IO **
Func: Set or Reset bit 'z' of the indicated register.
Desc: For the case of DB and MARL, the indicated bit is set or reset and the result is put in the temp reg. DB or MARL are not changed.
Op: 190z      TBIT DB(z)
     191z      TBIT MARL(z)
     192z      TBIT ST(z)
     193z      TBIT TR(z)
     194z      TBIT IC(z)
     195z      TBIT PTR(z)
     196z      TBIT MDM(z)
     197z      TBIT MDL(z)
L/A: St: T: Ctl: IO **
Func: test bit 'z' of the indicated register. Copy the state of the tested bit to the status reg T bit.

COMPARE INSTRUCTIONS. The comparison instructions perform a subtraction, discard the result, and update the status bits.
Op: 100z      DB — Az **
     101z      MARL — Az
     102z      ST — Az
     103z      TR — Az
     104z      IC — Az
     105z      PTR — Az
     106z      MDM — Az
     107z      MDL — Az
     108z      DB — Bz
     109z      MARL — Bz
     10Az      ST — Bz
     10Bz      TR — Bz
     10Cz      IC — Bz
     10Dz      PTR — Bz
     10Ez      MDM — Bz
     10Fz      MDL — Bz
L/A: St: ZCV: Ctl: IO BM **
Func: Perform a subtraction and update status bits.

INCREMENT AND DECREMENT INSTRUCTIONS. The increment and decrement instructions change the value of a 16-bit 2's complement integer by one.

SCRATCHPAD REGISTER INCREMENT AND DECREMENT.
Op: 004z      INC Az
     006z      DEC Az
     084z      INC Bz
     086z      DEC Bz
L/A: St: ZCV: Ctl:
Func: Increment or decrement the addressed scratchpad register by one.
Op: 1206      INC A(IC)
     1207      INC B(IC)
     120E      DEC B(IC)
     120F      DEC B(IC)
     1216      INC A(PTR)
     1217      INC B(PTR)
     121E      DEC B(PTR)
     121F      DEC B(PTR)
L/A: St: ZCV: Ctl:
Func: Increment or decrement the indirectly addressed scratchpad register by one.

MARL INCREMENT AND DECREMENT. The content of the addressed scratchpad register are copied to MARL. The register value is then incremented or decremented and written back to the scratchpad. The instructions also define BYTE or WORD state of the BM status bit.
Op: 008z      MARL = Az+, BYTE
     009z      MARL = Az+, WORD
     00Az      MARL = Az−, BYTE
     00Bz      MARL = Az−, WORD
     088z      MARL = Bz+, BYTE
     089z      MARL = Bz+, WORD
     08Az      MARL = Bz−, BYTE
     08Bz      MARL = Bz−, WORD
L/A: St: ZCV, BM: Ctl:
Func: Increment or decrement MARL and also the scratchpad operand register by one.

MARM INCREMENT AND DECREMENT. The MARM increment and decrement instructions are used in the maintenance of the 32-bit data memory address space. In most applications, the instruction immediately preceeding this instruction will be a bump of MARL, which copies the state of the adder carry to the C bit in the status register. These instructions add (or subtract) zero and the carry bit. Thus, if there was a carry (or borrow) out during the MARL instruction, MARM will also be bumped. These instructions also copy the result back to the scratchpad operand register.
Op: 005z      MARM = Az + 0
     007z      MARM = Az − 0
     085z      MARM = Bz + 0
     087z      MARM = Bz − 0
L/A: St: ZCV: Ctl:
Func: Increment or decrement MARM and also the scratchpad operand register by one.

SINGLE-REGISTER SUBTRACT. Single register subtract instructions use a single register as one operand destination is either the same register as the source operand the temp register. The other operand is implied in instruction.
Op: 00Ez      Az = Az − MDM
     00Fz      Az = Az − MDL
     08Ez      Bz = Bz − MDM
     08Fz      Bz = Bz − MDL
L/A: St: ZCV: Ctl:
Func: Subtract contents of half the multiply/divide register from a scratchpad register.
Op: 1A3z kkkk      Az = kkkk − Az
     1ABz kkkk      Bz = kkkk − Bz
L/A: Arith. St: ZCV: CTl:
Func: Subtract contents of a scratchpad register from a 16-bit constant in a second word of the instruction.

IMPLICIT SUBTRACT. The implicit register subtract instruction uses the temp register as an operand and destination. The other operand is implied in the instruction.
Op: 1223      TR = TR − DB
L/A: St: ZCV: Ctl: 10 BM
Func: Subtract the DB for the content of the temp reg and store the result in the temp register.
'XOR' INSTRUCTIONS. XOR instructions performs a bit-by-bit XOR of corresponding bits in two 16-bit operands.
The Z status bit will be set if the result of the operation is zero. Otherwise the Z bit will be reset. The C and V status bits are reset.

3-REGISTER 'XOR'
Op: 5zyx      Bx = By XOR Az
L/A: Logic: St: ZCV: Ctl:
Func: XzoR contents of two scratch pad registers, store result in a third register.

2-REGISTER 'XOR'. The 2 register XOR instructions use register for one operand and the result. The other operand is implied in the instruction.
OP: 06zy      Az = DB XOR Ay
     07zy      Bz = DB XOR Ay
     0Ezy      Az = DB XOR By
     0Fzy      Bz = DB XOR By
L/A: Logic St: ZCV: Ctl: 10 BM
Func: XOR contents of a scratchpad register and the data bus. Store the result in a second register.
Op: 46zy      Az = Ay XOR TR
     47zy      Bz = Ay XOR TR
     4Ezy      Az = By XOR TR
     4Fzy      Bz = By XOR TR
L/A: Logic St: ZCV: Ctl:

TABLE II-continued
INSTRUCTION SUMMARY BY FUNCTION

Func: XOR contents of a scratchpad registers and the temp reg. Store the result in a second register.

UNCLASSIFIED INSTRUCTIONS
Op: 1243     TRAP
L/A: St: Ctl:
Func: Perform a trap to dedicated location ???? The trap is executed in the same manner as a subroutine call.
Op: 1235     DISINT
L/A: St: Ctl:
Func: Disable the external interrupt pin from causing an interrupt.

TABLE III
HSP PIN ASSIGNMENTS

The High Speed Processor, in the embodiment of FIGS. 1 and 2, is an 84 pin device. Details of physical pin assignments are to be determined.

HSP PIN DESCRIPTION

| SIGNAL | PIN | I/O | DESCRIPTION |
|---|---|---|---|
| | | | Power and ancillary functions |
| Vcc | 1 | IN | Supply voltage ( +5V nominal) |
| Vcc2 | 2 | IN | Supply voltage ( +5V nominal) |
| Vss | 3 | IN | Ground voltage |
| CAP | 4 | | Substrate capacitor. A .1uF capacitor should be connected between this pin and ground. |
| X1 | 5 | IN | Crystal input for clock. Other side of crystal is connected to ground. Also for external oscillator. This clock is used for the internal timers only; it does not control the main processing logic. |
| | | | Instruction memory |
| IAS | 6 | OUT | Instruction Address strobe. When asserted the instruction memory address on PCA (15 to 0) is valid. The processor is commencing a write or read cycle to the instruction memory. The data is transferred on bus IW(15 to 0) on a read cycle and bus (15 to 0)) on a write cycle. |
| ITACK | 7 | IN | Instruction memory transfer acknowledge. Asserted by the instruction memory when either valid read data is available or the write cycle is complete. |
| PCA15 | x | OUT | Program counter address PCA15(msb) |
| PCA14 | x | OUT | through to PCA0(1sb). This bus is |
| PCA13 | x | OUT | permanently active. This bus is used to |
| PCA12 | x | OUT | address the memory space that contains |
| PCA11 | x | OUT | the processor instructions. |
| PCA10 | x | OUT | |
| PCA9 | x | OUT | |
| PCA8 | x | OUT | |
| PCA7 | x | OUT | |
| PCA6 | x | OUT | |
| PCA5 | x | OUT | |
| PCA4 | x | OUT | |
| PCA3 | x | OUT | |
| PCA2 | x | OUT | |
| PCA1 | x | OUT | |
| PCA0 | x | OUT | |
| IW15 | x | IN | Instruction memory data bus IW15 (msb) |
| IW14 | x | IN | to IW0(lsb). On a read cycle, the instruc- |
| IW13 | x | IN | tion word is read through this bus. |
| IW12 | x | IN | |
| IW11 | x | IN | |
| IW10 | x | IN | |
| IW9 | x | IN | |
| IW8 | x | IN | |
| IW7 | x | IN | |
| IW6 | x | IN | |
| IW5 | x | IN | |
| IW4 | x | IN | |
| IW3 | x | IN | |
| IW2 | x | IN | |
| IW1 | x | IN | |
| IW0 | x | IN | |
| | | | Data Memory |

TABLE III-continued

| SIGNAL | PIN | I/O | DESCRIPTION |
|---|---|---|---|
| | | | (These signals are tristated when BUSY/ is not asserted) |
| IO/MEM | 8 | | IO, Memory. This signal selects between the 64K byte I/O space and 8 Gbyte memory space available in the data memory address space. |
| AS | 9 | OUT | Address strobe. When asserted, the address on bus MA15(msb) to MA0(1sb) is valid and a write or read cycle is in progress. |
| R/W | 10 | | Read/Write. Asserted at the same time as AS/ and indicates the direction of the data transfer. |
| UDS | 11 | OUT | Upper and Lower Data strobes. The |
| LDS | 12 | OUT | Upper and Lower Data strobes are asserted to indicate that the most and least bytes, respectively, of the data memory are to be written or read. In the write cycle UDS/ and LDS/ are delayed to allow this signal to be used to gate WE/ onto static RAMS. |
| HIMA/IW | 13 | OUT | High order Mem. Address, Instruction write. If asserted while AS/ is negated then the processor is presenting address bits MA31(msb) to MA16(1sb) on the address lines MA15(msb) to MA0(1sb). This extended address should be externally latched. If HIMA/IW is asserted while AS/ is asserted, then the data word from the data memory space is being transferred to the instruction memory space on the bus D(15 to 0). This signal is used to determine whether an instruction memory cycle is write or read. |
| DTACK | 14 | IN | Data Transfer Acknowledge. The peripheral or memory at address MA(15 to 0) or memory responds to AS/ by asserting DTACK/ when either valid read data is available or the write cycle is complete. DTACK/ should not be negated until either AS/, UDS/ or LDS have been negated. |
| MA15 | x | OUT | Data memory address bus MA15(msb) |
| MA14 | x | OUT | through to MA0(1sb). This bus is used to |
| MA13 | x | OUT | address the 8 Gbyte data memory space. |
| MA12 | x | OUT | The extended memory address. MA32 to |
| MA11 | x | OUT | MA17 is also loaded into its external latch |
| MA10 | x | OUT | when HIMA is asserted. |
| MA9 | x | OUT | |
| MA8 | x | OUT | |
| MA7 | x | OUT | |
| MA6 | x | OUT | |
| MA5 | x | OUT | |
| MA4 | x | OUT | |
| MA3 | x | OUT | |
| MA2 | x | OUT | |
| MA1 | x | OUT | |
| MA0 | x | OUT | |
| D15 | | I/O | Data memory data bus D15 (msb) to |
| D14 | | I/O | D0(1sb). Data is transferred to and from the |
| D13 | | I/O | data memory on this bidirectional bus. |
| D12 | | I/O | Data to be written into the instruction |
| D11 | | I/O | memory is also transferred on this bus. |
| D10 | | I/O | |
| D9 | | I/O | |
| D8 | | I/O | |
| D7 | | I/O | |
| D6 | | I/O | |
| D5 | | I/O | |
| D4 | | I/O | |
| D3 | | I/O | |
| D2 | | I/O | |
| D1 | | I/O | |
| D0 | | I/O | |
| | | | Interrupts |
| RESET /TEST | 15 | IN | Reset/Test is a multi-function input. When active low, the control signals go to their inactive state, the program counter is cleared. When Reset/Test is taken above 15v, the processor operates in a test mode for |

TABLE III-continued

| | | | |
|---|---|---|---|
| INTA | 16 | IN | Interrupt A and Interrupt B. These two lines are multiplexed to provide two maskable interrupts and one non-maskable interrupt (NMI). INTA may also be tested directly using a single instruction. |
| INTB | 17 | IN | |

Bus Arbitration

| | | | |
|---|---|---|---|
| REQ | 18 | OUT | Request. REQ/ is asserted by the processor when it is waiting to access the data memory address space. REQ/ is negated when GR/REL/ is asserted. |
| GR/REL | 19 | IN | Grant/Release. If Grant/Release is asserted while REQ/ is asserted then the processor will become bus master for the data memory address space. If Grant/Release is asserted while Busy busy is asserted, the processor will relinquish control of the data memory address space at some convenient time and negate Busy. |
| BUSY | 20 | OUT | Busy. Busy indicates to other potential bus masters that this processor is bus master. Busy is asserted before its tristated data memory bus drivers are enabled. Busy is negated after the bus drivers have been disabled. |

Note 1. The above bus arbitration control pins are used to control access to part or all of the data memory address space. The instruction memory address space is totally unaffected.

MARL TO TR INCREMENT AND DECREMENT.
Op: 1220  TR = MARL + 1
    1222  TR = MARL − 1
L/A: St: ZCV: Ctl:
Func: Increment or decrement the content of MARL and put the result in the temp register. The content of MARL is not changed.

REGISTER INCREMENT AND DECREMENT.
Op: 1224   INC IC
    1225   INC PTR
    1226   DEC IC
    1227   DEC PTR
L/A: St: ZCV: Ctl:
Func: Increment or decrement IC or PTR.

MOVE INSTRUCTIONS.
The move instructions copy an operand from one location to another.

SCRATCH PAD TO SCRATCHPAD MOVE. These instructions copy the content on one scratchpad register to another.
Op: 40zy   Az = Ay
    41zy   Bz = Ay
    48zy   Az = By
    49zy   Bz = By
L/A: St: ZCV: Ctl:
Func: Copy operand to destination. Note that status is updated.
Op: 014z   A(IC) = Az
    015z   B(IC) = Az
    094z   A(IC) = Bz
    095z   B(IC) = Bz
L/A: St: Ctl:
Func: Copy operand to destination indirect by IC.
Op: 1A4z   Az = A(IC)
    1A5z   Az = A(IC)
    1ACz   Bz = A(IC)
    1ADz   Bz = B(IC)
L/A: St: Ctl:
Func: Copy operand indirect by IC to destination.

DISCRETE REGISTER TO SCRATCHPAD MOVE. These instructions move the content of a discrete-processor register to a scratchpad register. Note that if the source operand is PTR, the upper 8 bits of the 16-bit operand is zero.
Op: 180z   Az = DB **
    181z   Az = MARL
    182z   Az = ST
    183z   Az = TR
    184z   Az − IC
    185z   Ax = PTR
    186z   Az = MDM
    187z   Az = MDL
    188z   Bz = DB
    189z   Bz = MARL
    18Az   Bz = ST
    18Bz   Bz = TR
    18Cz   Bz = IC
    18Dz   Bz = PTR
    18Ez   Bz = MDM
    18Fz   Bz = MDL
    1A6z   Az = MARM
    1AEz   Bz = MARM
L/A: St: Ctl: IO BM **
Func: Copy discrete register to scratchpad register
Desc: Control bit dependencies are only for instructions marked with '**'
Op: 120C   A(IC) = TR
    120D   B(IC) = TR
    121C   A(PTR) = TR
    121D   B(PTR) = TR
L/A: St: Ctl:
Func: Copy TR indirect to scratchpad register.
Op: 1208   A(IC) = IW(TR)
    1209   B(IC) = IW(TR)
    1218   A(PTR) = IW(TR)
    1218   B(PTR) = IW(TR)
L/A: St: Ctl:
Func: Copy the instruction memory word addressed indirectly by the temp register to an indirectly addressed location in scratchpad. Also load TR with the addressed IW.
Op: 1A0z   Az = IW(TR)
    1A8z   Bz = IW(TR)
L/A: St: Ctl:
Func: Copy the instruction memory word addressed indirectly by the temp register to a scratchpad register. Also load TR with the addressed IW.

LOAD SCRATCHPAD WITH CONSTANT INSTRUCTIONS.
These instructions load a scratchpad register with a constant.
Op: 1A1z kkkk Az = kkkk
    1A9z kkkk Bz = kkkk
L/A: St: Ctl:
Func: Copy the second 16-bit word of the instruction to a scratchpad register.
Op: 120A kkkk A(IC) = kkkk
    120B kkkk B(IC) = kkkk
    121A kkkk A(PTR) = kkkk
    121B kkkk B(PTR) = kkkk
L/A: St: Ctl:
Func: Copy the second 16-bit word of the instruction to an indirectly addressed location in scratchpad.

SCRATCHPAD TO DISCRETE REGISTER MOVE. These instructions move the content of a scratchpad register to a discrete processor register. There are exceptions to the general case:
* If the destination is the external data bus, the destination will be either an I/O register or a data memory location, dependent upon the state of the IO status bit. If the BM bit is in the BYTE mode, the operand is the lower byte of the scratchpad register.
*If the destination is MARL, either MARL or the I/O address register will be loaded externally, dependent upon the state of the IO status bit.
* If the destination is MARM, bit 15 of MARM (sign) will also be copied into the spillover register. The MD fault bit will also be cleared.
Op: 016z   MEM = Az **
    018z   MARM = Az **
    019z   MARL = Az
    01Az   ST = Az
    01Bz   TR = Az
    01Cz   IC = Az
    01Dz   PTR = Az
    01Ez   MDM = Az
    01Fz   MDL = Az
    096z   MEM = Bz **
    098z   MARM = Bz **
    099z   MARL = Bz
    09Az   ST = Bz
    09Bz   TR = Bz
    09Cz   IC = Bz
    09Dz   PTR = Bz
    09Ez   MDM = Bz
    09Fz   MDL = Bz

TABLE III-continued

L/A: St: Ctl: IO BM **
Func: Copy the content of the addressed scratchpad register to the indicated discrete register.
Desc: Control bit dependencies are only for instructions marked with '**'.

Op: 1202    TR = A(IC)
    1203    TR = B(IC)
    1212    TR = A(PTR)
    1213    TR = B(PTR)
L/A: St: Ctl:
Func: Copy the content of the indirectly addressed scratchpad register to the temp register.

Op: 010z    TRL = Az
    011z    TRM = Az
    090z    TRL = Bz
    091z    TRM = Bz
L/A: St: Ctl:
Func: Copy the Lower or Upper byte of an addressed scratchpad register to the corresponding byte of temp reg.

Op: 012z    IT1 = Az
    013z    IT2 = Az
    092z    IT1 = Bz
    093z    IT2 = Bz
L/A: Ct: Ctl:
Func: Copy the content of the addressed scratchpad register to interval timer 1 or 2.

LOAD REGISTER WIFH CONSTANT INSTRUCTIONS. These instructions load registers with 4- or 8-bit constants contained in a single-word instruction or with the second word of 2-word instructions.

Op: 1238 kkkk    MARL = kkkk
    1239 kkkk    IC = kkkk
    123A kkkk    MARM = kkkk
    123B kkkk    PTR = kkkk
L/A: St: Ctl:
Func: Load the indicated register with the 16-bit constant from the second instruction word.

Op: 13kk    TRM = kk
    1Bkk    TRL = kk
L/A: St: Ctl:
Func: Load the More or Less significant half of the temp register with an 8-bit constant.

Op: 126K    PREC = k
    127k    PAGE = k **
L/A: St: PAGE** Ctl:
Func: load the instruction speed, multiprecision, or scratchpad page register with a 4-bit constant.

UNCLASSIFIED MOVE INSTRUCTIONS. These instructions perform data movements between various registers.

Op: 1237    SWAP TRM, TRL
L/A: St: Ctl:
Func: Exchange bytes in the temp register.

Op: 1228    MARL = DB
    1229    IC = DB
    122D    TR = DB
L/A: St: Ctl: IO BM
Func: Load the indicated register from the data bus.

Op: 122A    MARL = TR
    122C    TR = MARL
L/A: St: Ctl:
Func: Move data between MARL and the temp register.

Op: 122E    TR = 0
L/A: St: Ctl:
Func: Clear the temp register.

Op: 122B    MEM = TR
L/A: St: Ctl: IO BM
Func: Copy the content of the temp reg to the data bus.
Desc: The destination is either an I/O register or data memory. If the BM bit indicates BYTE mode, the operand is the lower byte of the temp register.

Op: 122B    IW(TR) = DB
L/A: St: Ctl:
Func: Copy the content of the data bus indirect through the temp register to the instruction memory.

MULTIPLY/DIVIDE INSTRUCTIONS. All multiply instructions use the MDM/MDL registers as destination and the divide instructions use them as dividend source. All operations are effected by the Signed Multiply (SM) status bit. When the bit is set, operands and result are handled as 2's complement integers. If the bit is not set, they are handled as unsigned numbers. If an overflow occurs or if division by zero is attempted, the MD status bit will be set.

MULTIPLY INSTRUCTIONS These instructions perform simple multiplication.

Op: 17zy    Az * By
L/A: St: MD Ctl: SM
Func: Multiply the two scratchpad operands and store the result in MDM/MDL.

Op: 128z    Az * DB
    12Cz    Bz * DB
L/A: St: MD Ctl: SM IO BM
Func: Multiply scratchpad operand by DB oontent and store result in MDM/MDL.

MULTIPLY AND ACCUMULATE INSTRUCTIONS. These instructions multiply the two operands, add to the current content of MDM/MDL, and store the result back in MDM/MDL.

Op: 1Fzy    Az *+ By
L/A: St: MD Ctl: SM
Func: Multiply the two scratchpad operands and accumulate into MDM/MDL.

Op: 129z    Az *+ DB
    12Dz    Bz *+ DB
L/A: St: MD Ctl: SM IO BM
Func: Multiply scratchpad operand by DB content and accumulate into MDM/MDL.

OpL 1204    A(IC) *+ DB
    1205    B(IC) *+ DB
    1214    A(PTR) *+ DB
    1215    B(PTR) *+ DB
L/A: St: MD Ctl: SM IO BM
Func: Multiply the indirectly addressed scratchpad operand by the content of DB and accumulate into MDM/MDL.

DIVIDE INSTRUCTIONS

Op: 12Az    MD / Az
    12Ez    MD / Bz
L/A: St: MD Ctl: SM
Func: Divide MDM/MDL by the scratchpad operand. Store the quotient in MDL and the remainder in MDM.

LOGICAL 'OR' INSTRUCTIONS. OR instructions performs a bit-by bit OR of corresponding bits in two 16-bit operands. The Z status bit will be set if the result of the operation is zero. Otherwise the Z bit will be reset. The C and V status bits are reset.

3-REGISTER 'OR' The two instructions are identical with respect to source operands, but differ in result destination.

Op: 3zyx    Ax = Az OR By
    7zyx    Bx = Az OR By
L/A: Logic St: ZCV: Ctl:
Func: OR contents of two scratchpad registers, store in a third register.

2-REGISTER 'OR' The 2-register OR instructions use registers for one operand and the result. The other operand is implied in the instruction.

Op: 02zy    Az = Ay OR DB
    03zy    Bz = Ay OR DB
    0Azy    Az = By OR DB
    0Bzy    Bz = By OR DB
L/A: Logic St: ZCV: Ctl: IO BM
Func: OR contents of a scratchpad register and the data bus. Store the result in a second register.

Op: 42zy    Az = Ay OR TR
    43zy    Bz = Ay OR TR
    4Azy    Az = By OR TR
    4Bzy    Bz = By OR TR
L/A: Logic St: ZCV: Ctl:
Func: OR contents of a scratchpad register and the temp reg. Store the result in a second register.

SINGLE-REGISTER 'OR' .Single-register OR instructions use a single register as one operand. The desitination is the same register as the source operand. The other operand is implied in the instruction.

Op: 1A3z kkkk    Az = Az OR kkkk
    1ABz kkkk    Bz = Bz OR kkkk
L/A: Logic St: ZCV: Ctl:
Func: OR contents of a scratchpad register with a 16-bit from the second word of the instruction.

TABLE III-continued

PROGRAM CONTROL INSTRUCTIONS. The program control instructions modify the sequence of instruction executed by loading a value into the program counter.

SUBROUTINE CALL INSTRUCTIONS. The pointer is incremented and the current content of the PC and ST registers are pushed onto a stack in the scratchpad, at the location defined by the PTR. The PC value is loaded into scratchpad A, and the status is loaded into scratchpad B. The PC is loaded from the indicated source and instruction execution continues from the new PC address.
Op: 1230      JUMPSUB TR
L/A: St: Ctl:
Func: Perform a subroutine call to the location in TR.
Op: 1231 zzzz GOSUB zzzz
L/A: St: Ctl:
Func: Perform a subroutine call to the address defined by the second word of the instruction.
Op: Bddd      SGOSUB ddd
L/A: St: Ctl:
Func: Perform a subroutine call. The lower 12 bits of the instruction are treated as as 2's complement displacement, which is added to the current value of the PC to become the target address.

SUBROUTINE RETURN INSTRUCTIONS. The value in sratchpad A indirectly addressed by the pointer is loaded into the program counter. The return with status instruction copies the value in scratchpad B into the status register. Following the read of the scratchpads, the pointer is decremented. Instruction execution continues from the value loaded into the PC.
Op: 1232      RETURN
L/A: St: Ctl:
Func: Perform a subroutine return without restoring ST.
Op: 1233      RETURNST
L/A: St: All bits Ctl:
Func: Perform a subroutine return and restore ST.

16-BIT BRANCH INSTRUCTION. This instruction allows a branch to any location in the 64K word address space.
Op: 1234      JUMP TR
L/A: St: Ctl:
Func: Perform a jump to the location in the temp reg.

12-BIT BRANCH INSTRUCTIONS. These instructions treat the lower 12 bits of the instruction as a 2's complement displacement, which is added to the current value of the PC to become the target address.
Op: 8ddd      BRANCH ddd
L/A: St: Ctl:
Func: Perform an unconditional jump relative to the current value of the PC.
Op: 9ddd      BRDIC ddd
L/A: St: Ctl:
Func: Decrement the IC. If the result is zero, perform a jump relative to the current value of the PC. If the result is non-zero, continue from the current PC.
Op: Addd      BRPER ddd
L/A: St: Ctl:
Func: Test the external peripheral test pin. If asserted, perform a jump relative to the current value of the PC. Otherwise, continue from the current PC.

10-BIT BRANCH INSTRUCTIONS. All the 10-bit branch instructions are conditional upon a test. Each branch can be indicated by the test result being either true (status bit asserted) or false (status bit not aaserted). If taken, the branch is relative to the current value of the PC.
Op: C0dd      BZ dd
     C4dd      BC dd
     C8dd      BT dd
     CCdd      BMD dd
     D0dd      BV dd
L/A: St: Ctl:
Func: Perform a relative branch if the corresponding status bit is set.
Op: E0dd      BNZ dd
     E4dd      BNC dd
     E8dd      BNT dd
     ECdd      BNMD dd
     F0dd      BNV dd
L/A: St: Ctl:
Func: Perform a relative branch if the corresponding status bit is not set.

Op: D4dd      BZAIC dd
     F4dd      BFZAIC dd
L/A: St: ZCV: CTl:
Func: BZAIC:
Test the Z bit and decrement the IC. If Z is set and IC = 0, then perform a relative branch. Update status based on the decrement of IC. BFZAIC:
Inverse of BZAIC
     D8dd      BCAIC dd
     F8dd      BFCAIC dd
L/A: St: ZCV: Ctl:
Func: BZAIC: Test the C bit and decrement the IC. If C is set and IC = 0, then perform a relative branch. Update status based on the decrement of IC.
BFCATC: Inverse of BCAIC.
Op: DCdd      BZC dd
     FCdd      BFZC dd
L/A: St: Ctl:
Func: BZC: Perform a relative branch if the Z or C bit is set.
     BFZC: Inverse of BZC SHIFT INSTRUCTIONS. The shift instructions shift an operand by one bit position. The bit shifted out is loaded into the carry bit so it may be tested or for use in a multiple precision shift operation. In a mulitiple precision shift, the bit which normally would be vacated is instead loaded from the carry bit, which in turn was loaded on the previous instruction.
A 16-bit shift of MDM/MDL is also provided.

LOGICAL SCRATCHPAD REGISTER SHIFTS.
Op: 002z      SRL Az
     082z      SRL Bz
L/A: Logic: St: ZCV: Ctl:
Func: Perform a right shift of a scratchpad register, and set the C status bit equal to the bit shifted from the register.
Desc: The Z status bit is set if the shifted result is zero. A zero is loaded into bit 15, unless a muliltiple precision shift is being performed. In that case, the C status bit is shifted into the position.
Op: 003z      SLC Az
     083z      SLC Bz
L/A: Logic: ST: ZCV: Ctl:
Func: Perform a left shift of the operand and copy the bit shifted out of the operand (bit 15) into the vacated position (bit 00). Copy the shifted bit to the C status bit. The Z status bit is set if the operand is zero.

ARITHMETIC SCRATCHPAD REGISTER SHIFTS.
Op: 002z      SRA Az
     082z      SRA Bz
L/A: Arith: St: ZCV: Ctl:
FUNC: Perform a right shift of a scratchpad register, and set the C status bit equal to the bit shifted from the register.
DESC: The Z status bit is set to zero if the shifted result is zero, and the V bit is reset. The value of the sign prior to the shift (bit 15) is copied back into bit 15.
Op: 003z      SLA Az
     083z      SLA Bz
L/A: Arith: St: ZCV: Ctl:
FUNC: perform a left shift of the scratchpad register, and set the C status bit equal to the bit shifted from the register. Set bit 00 to zero.
DESC: The Z status bit is set to zero if the shifted result is zero. The V bit is set if the shift caused the state of the sign (bit 15) to change.

MULTIPLY/DIVIDE REGISTER SHIFTS
Op: 123C      SL MDM
     123D      SL MDL
     123E      SR MDM
     123F      SR MDL
L/A: Logic: St: ZCV: Ctl:
Func: Perform a logical shift of the indicated operand and set the C status bit equal to the bit shifted from the register.
Desc: The vacated bit position is set to zero. The Z status bit is set if the shifted result is zero.
Op: 123C      SL MDM
     123D      SL MDL
L/A: Arith: St: ZCV: Ctl:
Func: Perform an arithmetic shift of the indicated operand and set the C status bit equal to the bit shifted from the register.
Desc: The vacated bit position is set to zero. The Z status bit

TABLE III-continued is set if the shifted result is zero. The V bit is set if the shift
caused the state of the sign (bit 15) to change.
Op: 123E    SR MDM
      123F    SR MDL
L/A: Arith: St: ZCV: Ctl:
Func: perform an arithmetic shift of the indicated operand and
set the C status bit equal to the bit shifted from the register.
Desc: The Z status bit is set to zero if the shifted result is zero,
and the V bit is reset. The value of the sign prior to the shift (bit
15) is copied back into bit 15.
Op: 1236    SR MD, 16
L/A: St: Ctl:
Func: Shift SPILLOVER/MDM/MDL right arithmetically by 16.

SUBTRACT INSTRUCTIONS. Subtract instructions performs
2's complement subtraction of 16-bit numbers, with one exception:
* During multiple precision operations, the carry out of a 16-bit
sub-difference becomes a carry in to the next sub-difference.
Status bits are not valid until the end of the operation.

3-REGISTER SUBTRACT. The two instructions are identical
with respect to source operands, but differ in result destination.
Op: 3zyx    Ax = Az − By
     5zyx    Bx = By − Az
     7zyx    Bz = Az − By
L/A: Arith: St: ZCV: Ctl:
Func: Subtract contents of two scratchpad registers, store result
in a third register.

2-REGISTER SUBTRACT. The 2-register subtract instructions
use registers for one operand and the result. The other operand
is implied in the instruction.
Op: 02zy    Az = Ay − DB
     03zy    Bz = Ay − DB
     06zy    Az = DB − Ay
     07zy    Bz = DB − Ay
     0Azy    Az = By − DB
     0Bzy    Bz = By − DB
     0Ezy    Az = DB − By
     0Fzy    Bz = DB − By
L/A: Arith: St: ZCV: CTI: 10 BM
Func: Subtract contents of a scratchpad register and the data bus.
Store the result in a second register.
Op: 42zy    Az = Ay − TR
     43zy    Bz = Ay − TR
     46zy    Az = TR − Ay
     47zy    Bz = TR − Ay
     4Azy    Az = By − TR
     4Bzy    Bz = By − TR
     4Ezy    Az = TR − By
     4Fzy    Bz = TR − By
L/A: Arith: St: ZCV: Ctl:
Func: Subtract contents of a scratchpad registers and the temp reg.
Store the result in a second register.

What is claimed is:

1. A multiply and divide unit for a high speed processor for performing a programmed mathematical operation on a first argument with a second argument to obtain a result thereby, the multiply and divide unit being responsive to a programmed instruction applied to the high speed processor and comprises:
    operation means for controlling a mathematical operation to be performed on the first and second arguments as instructed by the program instructions;
    first output register for registering a first part of the result of the mathematical operation;
    second output register for registering a second part of the result of the mathematical operation;
    A means for obtaining an A word from the first argument;
    first B means for obtaining a first B word and a first B compliment from the second argument and the first part;
    second B means for obtaining a second B word and a second B compliment word from the first B word;
    third B means for obtaining a third B word and a third B compliment word from a U word;
    fourth B means for obtaining obtaining a fourth B word and a fourth B word compliment from the first B word;
    recoder means for performing a Booth recode on the A word to obtain a Booth recoded A word;
    B selector means responsive to the Booth recoded A word for selecting a B word from the first B word, first B word compliment, second B word, second B word compliment, third B word, third B word compliment, forth B word, and fourth B word compliment;
    first selector means for selecting an A argument from the A word, the first B word, the second part, or a zero word;
    second selector means for selecting a B argument from the zero word, the B word, and the first part;
    adder means for adding the A argument and B argument to obtain a first summation word;
    more selector means for selecting the U word from the first summation word and the second part;
    least selector means for selecting a V word from the first summation word or the first part;
    modification means for modifying the V word to obtain a modified V word and includes a shift means for replacing a predetermined number of bits in the V word with a first logic state;
    first part selector means operatively connected to the first output register for selecting the first part from the U word and the modified V word;
    second part selector means operatively connected to the operations means for providing to the second part to the second output register selected from the U word, a modified U word, a first modified second part, and a second modified second part; and
    data bus for applying the zero word to the first and second selectors.

2. The multiply and divide unit according to claim 1 wherein the A means comprises:
    means means for selecting the A word from the first argument and a compliment of the first argument;
    means for obtaining the compliment of the first argument including means for shifting a predetermined number of bits of the A word in a first direction.

3. The multiply and divide unit according to claim 1 wherein the first B means comprises:
    first B selector means for selecting the first B word from the first part or the second argument; and
    register means for obtaining a compliment of the B word.

4. The multiply and divide unit according to claim 3 wherein the second B means comprises:
    means for shifting the first B word a second predetermined number of bits in a second direction to obtain the second B word thereby; and
    means for shifting the first B compliment word the second predetermined number of in the second direction to obtain the second B compliment word thereby.

5. The multiply and divide unit according to claim 3 wherein the fourth B means comprises:
    means for shifting the first B word a third predetermined number of bits in a second direction to obtain the fourth B word thereby; and
    means for shifting the first B compliment word the third predetermined number of in the second direction to obtain the forth B compliment word thereby.

6. The multiply and divide unit accordinbg to claim 1 further comprising:
    register means operatively connected to the first part selector for registering over flow conditions of the first output register.

* * * * *